United States Patent
Vessey et al.

(10) Patent No.: US 7,571,440 B2
(45) Date of Patent: Aug. 4, 2009

(54) SYSTEM AND METHOD FOR EMULATING NETWORK COMMUNICATIONS BETWEEN PARTITIONS OF A COMPUTER SYSTEM

(75) Inventors: Bruce Alan Vessey, Downingtown, PA (US); Michael G. Dobbins, Audubon, PA (US); David Lapin, West Chester, PA (US); Sue Lapin, legal representative, West Chester, PA (US); Ted W. Hinaman, Boyertown, PA (US); Hans C. Mikkelsen, Afton, MN (US); Charles R. Caldarale, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 399 days.

(21) Appl. No.: 09/923,175

(22) Filed: Aug. 6, 2001

(65) Prior Publication Data

US 2003/0037178 A1 Feb. 20, 2003

Related U.S. Application Data

(60) Division of application No. 09/215,424, filed on Dec. 18, 1998, now Pat. No. 6,314,501, and a continuation-in-part of application No. 09/215,424, filed on Dec. 18, 1998, now Pat. No. 6,314,501, which is a continuation-in-part of application No. 09/120,797, filed on Jul. 23, 1998, now abandoned.

(60) Provisional application No. 60/223,654, filed on Aug. 7, 2000.

(51) Int. Cl.
G06F 9/44 (2006.01)
G06F 15/167 (2006.01)

(52) U.S. Cl. ................................ 719/312; 709/213

(58) Field of Classification Search ......... 709/200–253; 711/147–153; 719/311–315, 321–332; 718/106; 703/23–28; 370/395.53
See application file for complete search history.

(56) References Cited

U.S. PATENT DOCUMENTS

| 3,641,505 A | 2/1972 | Artz et al. | 340/172.5 |
| 3,768,074 A | 10/1973 | Sharp et al. | 340/172.5 |
| 3,812,469 A | 5/1974 | Hauck et al. | 340/172.5 |

(Continued)

FOREIGN PATENT DOCUMENTS

EP 0 444 376 A1 9/1991

(Continued)

*Primary Examiner*—Meng-Ai An
*Assistant Examiner*—Charles E Anya
(74) *Attorney, Agent, or Firm*—Robert P. Marley; Nathan Cass

(57) ABSTRACT

A system and method of emulating network communications between applications executing in different partitions of a partitionable computer system is provided. A connection is established between a first partition and a second partition of a computer system, through a memory region of the computer system shared by both the first partition and the second partition. The connection emulates a network connection. A network message is transmitted from a first application in the first partition using a network application interface and intended for transmission to a second application in the second partition. The network message transmitted by the first application is transmitted to the second application via the connection established through the shared memory region.

34 Claims, 38 Drawing Sheets

U.S. PATENT DOCUMENTS

| | | | |
|---|---|---|---|
| 4,000,485 A | 12/1976 | Barlow et al. | 340/172.5 |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,392,196 A | 7/1983 | Glenn et al. | 364/200 |
| 4,441,155 A | 4/1984 | Fletcher et al. | 364/200 |
| 4,464,717 A | 8/1984 | Keeley et al. | 364/200 |
| 4,466,059 A | 8/1984 | Bastian et al. | 364/200 |
| 4,488,217 A | 12/1984 | Binder et al. | 364/200 |
| 4,562,536 A | 12/1985 | Keeley et al. | 364/200 |
| 4,564,903 A | 1/1986 | Guyette et al. | 364/300 |
| 4,586,133 A | 4/1986 | Steckler | 364/200 |
| 4,667,288 A | 5/1987 | Keeley et al. | 364/200 |
| 4,686,621 A | 8/1987 | Keeley et al. | 364/200 |
| 4,843,541 A | 6/1989 | Bean et al. | 364/200 |
| 4,875,155 A | 10/1989 | Iskiyan et al. | 364/200 |
| 4,929,940 A | 5/1990 | Franaszek et al. | 340/825.02 |
| 4,967,414 A | 10/1990 | Lusch et al. | 371/51.1 |
| 5,016,167 A | 5/1991 | Nguyen et al. | 364/200 |
| 5,047,920 A | 9/1991 | Funabashi | 364/200 |
| 5,060,136 A | 10/1991 | Furney et al. | 364/200 |
| 5,067,071 A | 11/1991 | Schanin et al. | 395/275 |
| 5,117,350 A | 5/1992 | Parrish et al. | 395/425 |
| 5,123,094 A | 6/1992 | MacDougall | 395/375 |
| 5,123,101 A | 6/1992 | Sindhu | 395/400 |
| 5,136,714 A | 8/1992 | Braudaway et al. | 710/260 |
| 5,142,676 A | 8/1992 | Fried et al. | 395/425 |
| 5,142,683 A | 8/1992 | Burkhardt, Jr. et al. | 395/725 |
| 5,233,701 A | 8/1993 | Nakata | 395/425 |
| 5,237,670 A | 8/1993 | Wakerly | 395/425 |
| 5,251,308 A | 10/1993 | Frank et al. | 395/425 |
| 5,257,361 A | 10/1993 | Doi et al. | 395/425 |
| 5,276,884 A | 1/1994 | Mohan et al. | 395/700 |
| 5,276,896 A * | 1/1994 | Rimmer et al. | 709/216 |
| 5,297,269 A | 3/1994 | Donaldson et al. | 395/425 |
| 5,327,538 A | 7/1994 | Hamaguchi et al. | 395/325 |
| 5,375,219 A | 12/1994 | Okabe | 711/147 |
| 5,392,409 A | 2/1995 | Umeno et al. | 709/1 |
| 5,392,416 A | 2/1995 | Doi et al. | 395/425 |
| 5,408,629 A | 4/1995 | Tsuchiya et al. | 395/425 |
| 5,418,913 A | 5/1995 | Fujimoto | 709/213 |
| 5,426,748 A | 6/1995 | Brenza et al. | 711/203 |
| 5,446,841 A | 8/1995 | Kitano et al. | 709/213 |
| 5,465,336 A | 11/1995 | Imai et al. | 395/375 |
| 5,490,280 A | 2/1996 | Gupta et al. | 395/800 |
| 5,497,472 A | 3/1996 | Yammamoto et al. | 395/427 |
| 5,499,354 A | 3/1996 | Aschoff et al. | 395/456 |
| 5,504,874 A | 4/1996 | Galles et al. | 395/472 |
| 5,530,837 A | 6/1996 | Williams et al. | 395/434 |
| 5,537,569 A | 7/1996 | Masubuchi | 395/448 |
| 5,555,399 A | 9/1996 | Waldron et al. | 711/159 |
| 5,559,970 A | 9/1996 | Sharma | 395/312 |
| 5,568,633 A | 10/1996 | Boudou et al. | 395/468 |
| 5,581,725 A | 12/1996 | Nakayama | 395/449 |
| 5,590,301 A | 12/1996 | Guenthner et al. | 395/412 |
| 5,619,471 A | 4/1997 | Nunziata | 365/230.03 |
| 5,652,861 A | 7/1997 | Mayo et al. | 395/484 |
| 5,652,885 A * | 7/1997 | Reed et al. | 713/1 |
| 5,687,013 A | 11/1997 | Henmi | 359/117 |
| 5,687,342 A | 11/1997 | Kass | 395/411 |
| 5,689,713 A | 11/1997 | Normoyle et al. | 395/736 |
| 5,717,897 A | 2/1998 | McCrory | 395/468 |
| 5,717,942 A | 2/1998 | Haupt et al. | 395/800 |
| 5,727,179 A | 3/1998 | Dei | 711/206 |
| 5,805,867 A * | 9/1998 | Kodaira | 703/21 |
| 5,809,539 A | 9/1998 | Sakakibara et al. | 711/151 |
| 5,825,890 A * | 10/1998 | Elgamal et al. | 713/151 |
| 5,842,226 A | 11/1998 | Barton et al. | 711/203 |
| 5,870,589 A * | 2/1999 | Alexander et al. | 703/23 |
| 5,894,566 A * | 4/1999 | Croslin | 703/21 |
| 5,935,212 A * | 8/1999 | Kalajan et al. | 709/228 |
| 5,940,870 A | 8/1999 | Chi et al. | 711/206 |
| 5,991,820 A * | 11/1999 | Dean | 719/312 |
| 6,092,166 A | 7/2000 | Bobak et al. | 711/169 |
| 6,134,619 A | 10/2000 | Futral et al. | 710/112 |
| 6,366,947 B1 * | 4/2002 | Kavner | 709/203 |
| 6,658,469 B1 * | 12/2003 | Massa et al. | 709/224 |

FOREIGN PATENT DOCUMENTS

| | | |
|---|---|---|
| EP | 0 752 667 A | 1/1997 |
| WO | WO 95/25306 | 9/1995 |
| WO | WO 96/35172 | 7/1996 |
| WO | WO 98/43168 | 10/1998 |
| WO | WO 00/36509 | 6/2000 |
| WO | WO 00/36513 | 6/2000 |

* cited by examiner

A MORE DETAILED LOOK AT THE DEQUEUED_OFFSETS
AND THE MESSAGE QUEUES IS SHOWN BELOW:

|   | 0       31 | 32<br>63 | | | |
|---|---|---|---|---|---|
| 0 | RESERVED | NODE_OS_ID<br>(EXAMPLES FOLLOW) | | | |
|   |   | 2<br>X | 2<br>P<br>N | S<br>C<br>I<br>T | O<br>M<br>U<br>N |
| 1-2 | RESERVED | NODE MAC ADDRESS<br>(12 HEX DIGITS WITH 2 DIGITS PER BYTE) | | | |
| 3-7 | RESERVED | RESERVED | | | |
|   |   | 32       39 | 40       47 | 48<br>63 | |
| 0 | RESERVED | RESET_OK | RESERVED | DEQUEUED_OFFSET<br>FOR NODE 0 | |
| 1 | RESERVED | RESET_OK | RESERVED | DEQUEUED_OFFSET<br>FOR NODE 0 | |
| 2 | RESERVED | RESET_OK | RESERVED | DEQUEUED_OFFSET<br>FOR NODE 0 | |
|   |   | ⋮ | | | |
| 7 | RESERVED | RESET_OK | RESERVED | DEQUEUED_OFFSET<br>FOR NODE 0 | |
| START OF OUTPUT QUEUE TO NODE 0 | | | | | |
| 0 | RESERVED | NEED_RESET | RESERVED | ENQUEUED_OFFSET<br>FOR NODE 0 | |

1412 → (points to table)
1610 — NODE_OS_ID row
1612 — NODE MAC ADDRESS row
P/O NODE-NODE QUEUE 1510a

*Figure 16A*

| | | | | |
|---|---|---|---|---|
| 1 | RESERVED | MESSAGE BUFFER OFFSET | | |
| 2 | RESERVED | MESSAGE BUFFER OFFSET | | |
| | | ● ● ● | | |
| 511 | RESERVED | MESSAGE BUFFER OFFSET | | |

} P/O NODE-TO-NODE QUEUE 1510a

| | | | | |
|---|---|---|---|---|
| START OF OUTPUT QUEUE TO NODE 1 | | | | |
| 0 | RESERVED | NEED_RESET | RESERVED | ENQUEUED_OFFSET FOR NODE 1 |
| 1 | RESERVED | MESSAGE BUFFER OFFSET | | |
| 2 | RESERVED | MESSAGE BUFFER OFFSET | | |
| | | ● ● ● | | |
| 511 | RESERVED | MESSAGE BUFFER OFFSET | | |

● ● ●

| | | | | |
|---|---|---|---|---|
| START OF OUTPUT QUEUE TO NODE 7 | | | | |
| 0 | RESERVED | NEED_RESET | RESERVED | ENQUEUED_OFFSET FOR NODE 7 |
| 1 | RESERVED | MESSAGE BUFFER OFFSET | | |
| 2 | RESERVED | MESSAGE BUFFER OFFSET | | |
| | | ● ● ● | | |
| 511 | RESERVED | MESSAGE BUFFER OFFSET | | |

} 1510

} 1510n

NODE_OS_ID IS A 4 CHARACTER STRING WITH ONE OF THE FOLLOWING VALUES:
- 'OS22' - OS2200 ARCHITECTURE
- 'MCP' - A-SERIES ARCHITECTURE
- 'UNIX' - INTEL ARCHITECTURE WITH A UNIX OPERATING SYSTEM
- 'NT' - INTEL ARCHITECTURE WITH MICROSOFT WINDOWS NT OPERATING SYSTEM

| 0 | 0          RESERVED          31 | 32          WORD LENGTH OF BUFFER          63 | |
|---|---|---|---|
| 1 | RESERVED | WORD LENGTH OF HEADER | |
| 2 | RESERVED | 32          47  BYTE SKIP COUNT | 48          63  BYTE TRANSFER COUNT |
| 3 | RESERVED | BYTE SKIP COUNT | BYTE TRANSFER COUNT |
| n | RESERVED | BYTE SKIP COUNT | BYTE TRANSFER COUNT |
| m | RESERVED | MESSAGE | |
|   | RESERVED | | |
|   | RESERVED | | |
|   | RESERVED | | |
|   | RESERVED | | |
|   | RESERVED | | |
| b-1 | RESERVED | MESSAGE | |

Rows 0–n: 1710
Rows m–(b-1): 1712

*Figure 17*

| INPUT QUEUE HEADER CONTENTS |
|---|
| INPUT QUEUES POINTER |
| NUMBER OF INPUT QUEUES |
| INPUT QUEUE LENGTH |
| INPUT QUEUE SIGNAL SIZE |
| MAX NUMBER OF SIGNALS IN INPUT QUEUE |

*Figure 29*

SYSTEM AND METHOD FOR EMULATING NETWORK COMMUNICATIONS BETWEEN PARTITIONS OF A COMPUTER SYSTEM

CROSS-REFERENCE TO OTHER APPLICATIONS

The present application is a divisional and continuation-in-part of U.S. patent application Ser. No. 09/215,424, entitled "Computer System and Methods for Operating Multiple Systems in Different Partitions of the Computer System and for Allowing the Different Partitions to Communicate with one another through Shared Memory," filed Dec. 18, 1998, now U.S. Pat. No. 6,314,501 which is a continuation-in-part of U.S. patent application Ser. No. 09/120,797, filed Jul. 23, 1998, now abandoned entitled "Computer System and Method for Operating Multiple Operating Systems on the Computer System and for Allowing the Multiple Operating Systems to Communicate with One Another Through Shared Memory," which are both incorporated herein by reference in their entirety.

The present application also claims priority of U.S. provisional patent application Ser. No. 60/223,654, entitled "System and Method for Providing Shared Memory Services to Emulate Network Communications between Partitions in Servers Configured with Multiple Partitions", filed Aug. 7, 2000, and hereby incorporated by reference in its entirety.

This application is related to patent application Ser. No. 09/215,408, filed Dec. 18, 1998, entitled "A Memory Address Translation System and Method for a Memory Having Multiple Storage Units", which is also incorporated herein by reference in its entirety.

The following U.S. patent applications have a common assignee and contain some common disclosure.

"A Directory-Based Cache Coherency System," Ser. No. 08/965,004, Filed Nov. 5, 1997.

"Split Lock Operation To Provide Exclusive Access To Memory During Non-Atomic Operations," Ser. No. 08/964,623, Filed Nov. 5, 1997, now U.S. Pat. No. 6,092,156.

"Message Flow Protocol for Avoiding Deadlocks," Ser. No. 08/964,606, Filed Nov. 5, 1997, now U.S. Pat. No. 6,014,709.

"Memory Optimization State," Ser. No. 08/964,626, Filed Nov. 5,1997, now U.S. Pat. No. 6,052,760.

"System and Method For Providing Speculative Arbitration For Transferring Data," Ser. No. 08/964,630, Filed Nov. 5, 1997, now U.S. Pat. No. 6,049,845.

"High Performance Modular Memory System with Crossbar Connection," Ser. No. 09/001,592, Filed Dec. 31, 1997.

"Programmable Address Translation System," Ser. No. 09/001,390, Filed Dec. 31, 1997.

"High-Speed Memory Storage Unit for a Multiprocessor System Having Integrated Directory and Data Storage Subsystem," Ser. No. 09/001,588, Filed Dec. 31, 1997.

"Directory Based Cache Coherency System Supporting Multiple Instruction Processor and Input/Output Caches," Ser. No. 09/001,598, Filed Dec. 31, 1997.

"Bidirectional Interface Distributed Control Mechanism," Ser. No. 09/096,624, Filed Jun. 12, 1998.

"Source Synchronous Transfer Scheme," Ser. No. 09/097,287, Filed Jun. 12, 1998.

"Queuing Architecture for Use in a Data Processing System Having Independently-Operative Data & Address Interfaces," Ser. No. 09/096,822, Filed Jun. 12, 1998.

The above cited U.S. patent applications are incorporated herein by reference in their entireties.

COPYRIGHT AND TRADEMARK NOTICES

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

Unix is a registered trademark of The Open Group. SCO and Unixware are registered trademarks of The Santa Cruz Operation, Inc. Microsoft, Windows, Windows NT and/or other Microsoft products referenced herein are either trademarks or registered trademarks of Microsoft Corporation. Intel, Pentium, Pentium II Xeon, Merced and/or other Intel products referenced herein are either trademarks or registered trademarks of Intel Corporation.

FIELD OF THE INVENTION

The present invention generally relates to the field of multiprocessor environments having a shared memory. More particularly, the present invention relates to a system and method for emulating network communications between partitions of a computer system.

BACKGROUND

As the demand for computer system processing capacity grows, partitionable computer systems have emerged as an alternative to providing multiple computer systems to meet this demand. In a partitionable computer system, the computer system's resources are divided into a plurality of separate and independent environments called partitions. Each partition can be configured to support an instance of a specific operating system, along with applications serviced by that operating system.

An application executing within a particular partition of a partitionable computer system may communicate with applications executing on other computer systems via, for example, a computer network. Computer networks enable physically separated computer systems to exchange commands and messages by providing communication links and protocols between the computer systems that facilitate such exchange. The communication links may be direct-wired or wireless, and suitable network protocols, such as Transmission Control Protocol/Internet Protocol (TCP/IP), provide structure and organization for these communications.

Because it may be necessary for an application executing in one partition of a partitionable computer system to communicate with another application executing in a different partition of that same computer system, there is a need for a system and method that enables applications in different partitions of a partitionable computer system to communicate with each other. It would be particularly advantageous if these applications could continue to communicate with each other using standard networking application interfaces, as they do when communicating with an application on another computer system, but without the need for an external computer network connection between the partitions. The present invention satisfies this need.

SUMMARY OF THE INVENTION

The present invention is directed to a system and method for emulating network communications between partitions of a computer system. The present invention allows applications in different partitions of a computer system to communicate using standard networking application programming interfaces, but without the need for an external network connection between the partitions. The present invention takes advantage of the shared memory resources of a partitionable computer system to emulate network communications through a region of memory shared by one or more partitions.

A method of the present invention comprises the steps of:

receiving a request made by a first application on a first partition to establish a type of network connection with a second application on a second partition and to send a message to the second application via the network connection, the request being made by the first application in accordance with an application programming interface (API) associated with the requested type of network connection;

establishing a connection between the first partition and the second partition of the computer system through a memory region of the computer system shared by both the first partition and the second partition, wherein the connection emulates the requested type of network connection; and sending the message to the second application via the connection established through the shared memory region, whereby the connection established through the shared memory region appears to the first and second applications as the requested type of network connection.

A computer system according to the present invention comprises a plurality of processing modules and a main memory to which each of the processing modules is connected. Groups of one or more processing modules are configured as separate partitions within the computer system, and each partition operates under the control of a separate operating system. The main memory has at least one shared memory region defined therein to which at least two different partitions have shared access. The computer system further comprises program code executing on each of at least a first partition and a second partition of the computer system. The program code establishes a connection between a first application on the first partition of the computer system and a second application on the second partition of the computer system through the shared memory region, wherein the connection through the shared memory region emulates a type of network connection requested by one of the applications in accordance with an application programming interface (API) associated with the requested type of network connection.

Other features of the present invention will become evident hereinafter.

BRIEF DESCRIPTION OF THE FIGURES

The invention is best understood by reference to the figures wherein references with like reference numbers indicate identical or functionally similar elements. In addition, the leftmost digits refer to the figure in which the reference first appears in the accompanying drawings in which:

FIG. 16A illustrates exemplary information that can be included in a node output queue data structure, in accordance with the first embodiment;

FIG. 16B illustrates exemplary information that can be included in a node output queue data structure, in accordance with the first embodiment;

FIG. 17 illustrates an exemplary message data structure, in accordance with the first embodiment;

FIG. 29 illustrates the contents of an Input Queue Header in accordance with the alternate embodiment illustrated in FIG. 19;

DETAILED DESCRIPTION OF THE INVENTION

Table of Contents

Figure 1:
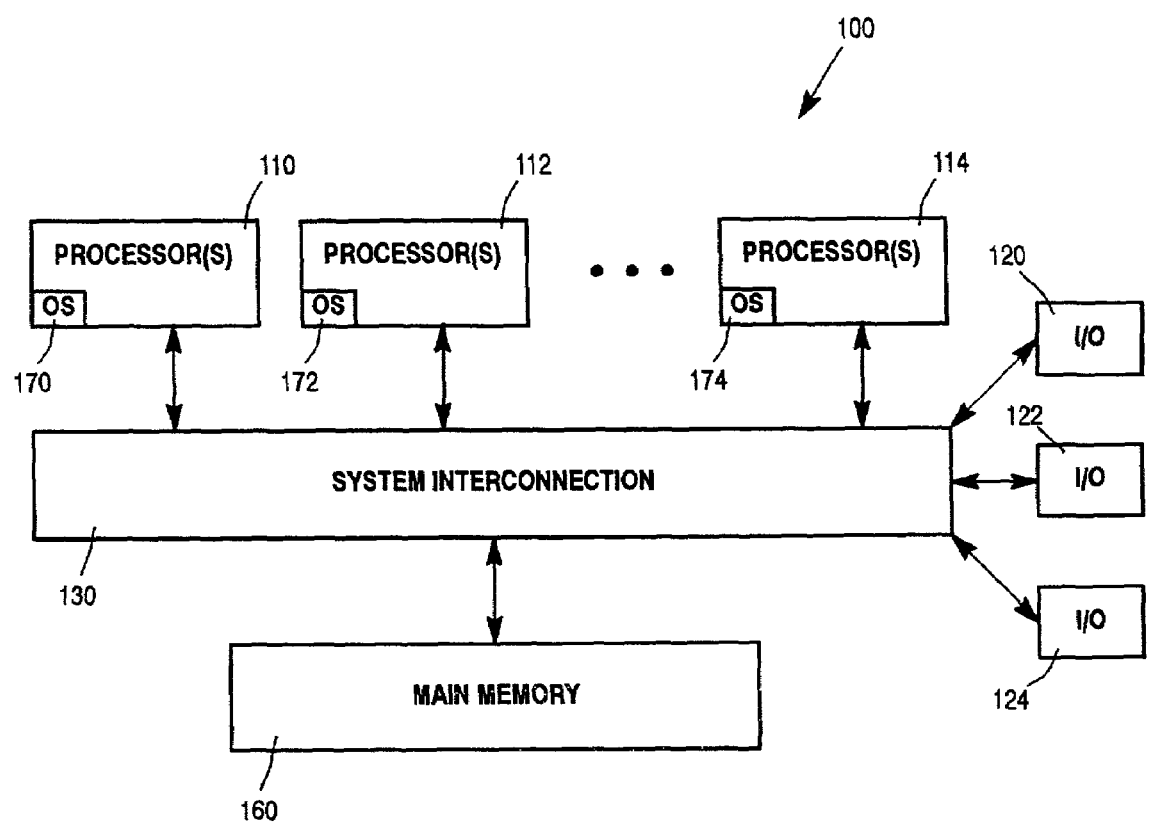
FIG. 1 is a block diagram of a computing environment in which the present invention may be employed.

I. Overview
II. Exemplary Computer System Platform
   A. Memory Windows (Relocation and Reclamation)
   B. Interleaving and Stacking of Memory (Translation)
   C. Initialization at Boot Time
III. Methods for Managing the Global Shared Memory (Inter-Partition Communications)
   A. Polling For Inter-Partition Communications
   B. Interrupt-Driven Shared Memory Communications
      1. Shared Memory Layout
      2. Free Page List
      3. Client Directory Table
      4. Shared Memory Page Types
      5. Control Structure Header
      6. Allocation Structure
      7. Signals
      8. Input Queues and Input Queue Header
      9. Inter-Processor Interrupt Mechanism
      10. The Core Services API
      11. Interfaces Supplied by Clients
      12. Exemplary Operation
      13. Other Functions
IV. A Shared Memory Device Driver
V. Systems for Emulating Network Communications Between Partitions of a Computer System to Maintain an Appearance of Communications by Wire
VI. Conclusions I. Overview The present invention is directed to a system and method for emulating network communications between partitions of a server or computer system. The present invention allows applications in different partitions of a computer system to communicate using standard networking application interfaces, but without the need for an external network connection between the partitions. The present invention takes advantage of the shared memory resources of a partitionable computer system to emulate network communications through a region of memory shared by one or more partitions.

As used herein, the terms "computer system" and "server" both refer to hardware, including electronic and mechanical components, and to software, including application programs and operating systems. Generally, operating systems include instructions and data that a computer manipulates in order to perform its tasks. The hardware provides the basic computing resources. The software defines the ways in which these resources are used to solve the computing problems of users.

As used herein, the term "operating system" refers to the program code that controls and coordinates the use of the hardware among the various application programs for various users. The operating system is the first program code loaded into the main memory of a computer system after the computer system is turned on. The central core of the operating system resides in the memory space at all times. As used herein, the term "operating system address" means the physical address space (memory and I/O) of a processor of a computer system and is the address space of a conventional computer system as viewed from the perspective of an operating system executing on that computer system.

As used herein, the term "computer architecture" refers to the structure and behavior of a computer, as viewed by a user. It concerns the specifications of the various functional modules, such as processors and memories, and structuring them together into a computer system. The computer architecture is implemented utilizing hardware.

As used herein, the term "memory storage unit" refers to a memory space capable of storing information. Each memory storage unit includes a plurality of memory storage units, sometimes referred to as banks of DRAM (Dynamic Random Access Memory). As used herein, the term "memory storage unit address" refers to an address location as viewed from the perspective of the computer system.

As used herein, the term "partition" refers to one or more processing module(s) that are under the control of a single instance of an operating system. The term "partition" is used herein to refer, in whole or in part, to the processing modules(s) of the partition, the operating system executing on the partition, any exclusive memory window assigned to the partition, other clients or application programs executing on the partition, or any combination thereof.

As used herein, the terms "partitionable server," "partitionable computer system," and the like refer to computer system in which it is possible to create or define partitions.

As used herein, the term "processing module" means a plurality of processors operating cooperatively. As exemplified below, Pods and sub-Pods are both examples of processing modules. One or more Pods or sub-Pods (i. e., one or more processing modules) may be defined as a partition within the computer system.

As used herein, the term "program code" means a set of instructions that, when executed by a machine, such as a computer system or processor, causes the computer system or processor to perform some operation. Recognizing, however, that some operations or functionality in a computer system may be hard-coded, in the form of circuitry that performs the operation or function, or may be performed by a combination of executable instructions and circuitry, the term "program code" also includes such circuitry or combination of executable instructions and circuitry.

II. Computer System Platform

FIG. 1 illustrates an exemplary computer system in which the present invention maybe implemented. The computer system comprises processor modules 110, 112, and 114. Processor modules 110, 112 and 114 are of comparable compatibility. However, it is contemplated that heterogeneous processors and/or operating systems may co-exist. Each processor module 110, 112 and 114 is self-contained. The processor modules 110, 112 and 114 can each include a plurality of processors. Two or more of processor modules 110, 112 and 114 share access to main (or global) memory 160 and/or to I/O devices 120, 122, and 124, typically through a system interconnection mechanism, such as system interconnection 130. Processor modules 110, 112, and 114 can communicate with each other through main memory 160 (by messages and status information left in common data areas).

One or more processor modules may be configured as a separate partition within the computer system, such that multiple partitions may exist within the computer system, each partition operating under the control of a separate operating system. For example, each processor module 110, 112 and 114 of FIG. 1 can be defined as a separate partition controlled via a separate operating system 170, 172 and 174. Each operating system 170, 172 and 174 views main memory separately as though each is the only entity accessing main memory 160.

A distinction should be made between multi-processor systems and multi-computer systems. A multi-computer system is a system in which computers are interconnected with each other via communication lines to form a computer network. The computers are autonomous and may or may not communicate with each other. Communication among the computers is either via fixed paths or via some message-switching mechanism. On the other hand, a conventional multi-processor system is controlled by one operating system that provides interaction between processors and all the components of the system cooperate in finding a solution to a problem.

Figure 2:
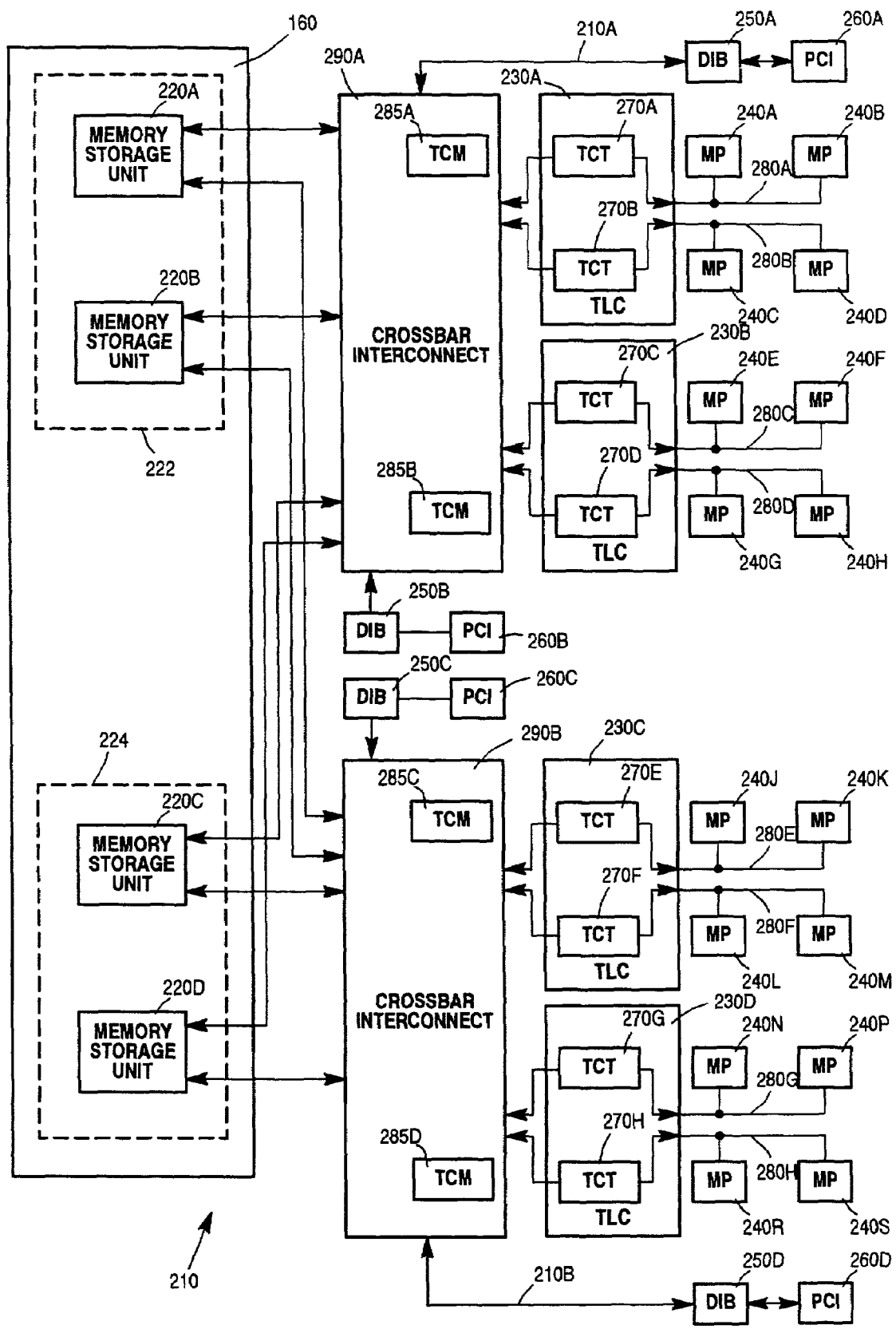
FIG. 2 is a block diagram of an exemplary partitionable server, or computer system, in which the present invention may be employed.

FIG. 2 is a more detailed illustration of one embodiment of the type of exemplary computer system illustrated in FIG. 1. As shown in FIG. 2, the exemplary computer system 200 includes a main memory, illustrated here as main memory 160, and a plurality of processing modules 240 connected to the main memory via respective third level cache modules 230 and crossbar interconnects 290. The processing modules and the main memory are arranged in a symmetrical multi-processing architecture, i. e., processor-to-memory latency is the same for each processing module across all of the main memory.

Main memory 160 is a directory-based memory system and is capable of supporting various memory consistency models such as, for example, memory consistency models employed on UNIX/NT systems. Main memory 160 includes a plurality of memory storage units (MSUs) 220, such as memory storage units 220A, 220B, 220C, and 220D. Preferably, each memory storage unit 220A, 220B, 220C, and 220D includes at least eight gigabytes of memory. Preferably, each memory storage unit 220A, 220B, 220C, and 220D includes sixteen semi-independent banks that share four double-wide data busses and eight unidirectional address busses.

The plurality of third level cache modules 230, such as third level cache modules 230A through 230D, include a plurality of third level cache application specific integrated circuits (or TCTs), such as TCTs 270A through 270H. In the present embodiment, pairs of processors (e.g., 240A and 240B) share a common bus (e.g., 280A) with a single TCT (e.g., 270A) within a given TLC (e.g., 230A). Each TCT 270 performs address relocation, reclamation, and translation for memory addresses issued by the processors to which it is connected, as described more fully below.

Each third level cache module 230A through 230D is connected to a respective plurality of processors (MPs) 240A through 240S. Specifically, in the present embodiment, each TLC 230 is connected to four processors. Each TLC 230 and its respective four processors define a sub-Pod. Further according to the present embodiment, two sub-Pods are connected via a crossbar interconnect (e.g., crossbar interconnect 290A or 290B) to form a Pod. Thus, in the embodiment illustrated in FIG. 2, there are four sub-Pods connected via crossbar interconnects 290A and 290B, respectively, to form two Pods.

Crossbar interconnects 290 interface processors 240, through third level caches 230, with memory storage units 220. Crossbar interconnects 290 employ a crossbar memory approach, whereby a plurality of cross points are placed at intersections between the processors 240 and memory storage units 220. Within the cross point is a switch that determines the path from a processor bus 280 to a memory storage unit 220. Each switch point has control logic to set up the transfer path between a processor 240 and main memory 160. The control logic examines the address that is placed on processor bus 280 to determine whether its particular memory storage unit 220 is being addressed. The control logic also resolves multiple requests for access to the same memory storage unit 220 on a predetermined priority basis. Each crossbar interconnect 290 further comprises a pair of Third-Level-Cache Memory Interface application specific integrated circuits (TCMs) 285, which perform address relocation, reclamation, and translation for memory requests from I/O devices, as described more fully below.

Computer system 200 further includes I/O buses 210A through 210D and a plurality of peripheral component interconnects (PCIs), such as PCIs 260A through 260D that are connected via direct I/O bridges, such as direct I/O bridges (DIB) 250A through 250D.

In operation, memory storage units 220 bi-directionally communicate with third level cache modules 230, through crossbar interconnects 290. Crossbar interconnects 290 bi-directionally communicate with direct I/O bridges 250 via I/O buses 210, and with processors 240 through TCTs 270. Direct I/O bridges 250 bi-directionally communicate with peripheral component interconnects 260.

In the present embodiment, the processors (MPs) 240 may comprise Intel processors (e.g., Pentium Pro, Pentium II Xeon, Merced), Unisys E-mode style processors (used in Unisys A Series and Clearpath HMP NX enterprise servers), or Unisys 2200 style processors (used in Unisys 2200 and Clearpath HMP IX enterprise servers. Preferably, a given sub-Pod employs four processors of the same type. However, it is contemplated that different sub-Pods may employ different types of processors. For example, one sub-Pod may employ four Intel processors, while another sub-Pod may employ four Unisys E-mode style processors. In such a configuration, the sub-Pod that employs Intel processors maybe defined as one partition and may run under the control of an Intel-compatible operating system, such as a version of Unix or Windows NT, while the sub-Pod that employs Unisys E-mode style processors maybe defined as another partition and may run under the control of the Unisys MCP operating system. As yet another alternative, the sub-Pods in two different partitions may both employ Intel processors, but one partition may run under the control of an Intel compatible operating system (e.g. Windows NT), while the other partition may run under the control of the Unisys MCP operating system through emulation of the Unisys A Series computer architecture on the Intel processors in that partition.

Additional details of the architecture of the computer system 200 of FIG. 2 are provided in the foregoing co-pending, commonly assigned applications listed in the section entitled Cross-Reference to Other Applications, each of which is incorporated by reference herein in its entirety.

Figure 28:
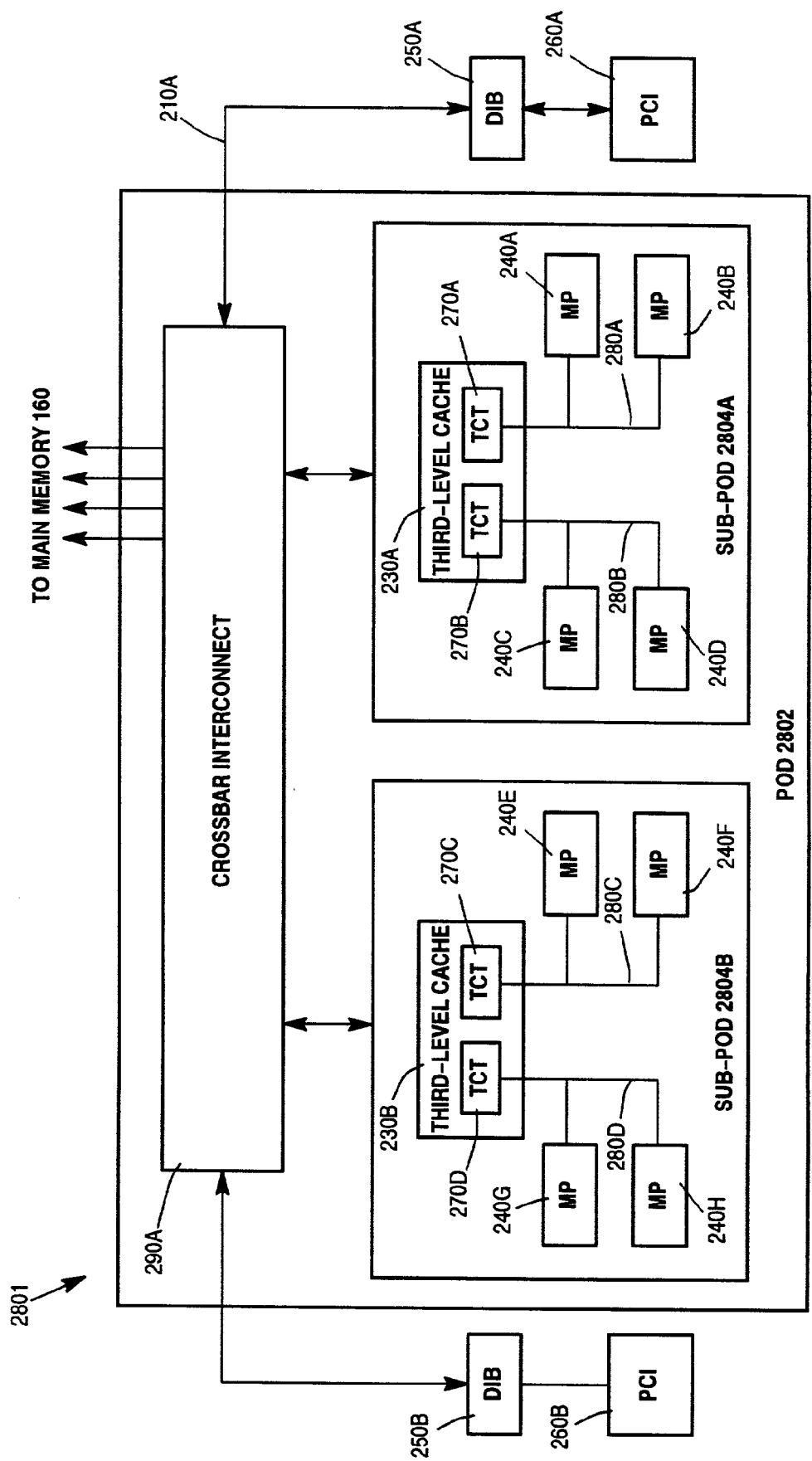
FIG. 28 illustrates further details of the computer system illustrated in FIG. 2.

As mentioned above, computer system 200 is partitionable on Pod and sub-Pod boundaries. In FIG. 28, a portion 2801 of computer system 200 is illustrated including Pod and sub-Pod boundaries. A Pod 2802 includes crossbar interconnect 290A, a first sub-Pod 2804A, and a second sub-Pod 2804B. Sub-Pods 2804A and 2804B are substantially similar to one another. Sub-Pod 2804A, for example, includes third level cache 230A, which includes TCTs 270A and 270B. Sub-Pod 2804 further includes processors 240A-240D. Pod 2802 thus includes two TLCs 230, four TCTs 270, eight processors 240 and a crossbar interconnect 290.

In the present embodiment, a maximum configuration of the computer system 200 includes four Pods 2802, each Pod 2802 including two sub-Pods 2804, as described above. Thus, in the maximum configuration, computer system 200 includes (4 Pods)*(8 processors per Pod)=32 processors. Computer system 200 can be partitioned on any combination of Pod or sub-Pod boundaries. It is understood, however, that other multiprocessing environments and configurations are possible. For example, computer system 200 could be expanded by plugging in more memory storage units 220 and more Pods or sub-Pods.

In an embodiment, Pod 2802 is defined to include direct I/O bridges 250A and 250B. In an embodiment, sub-Pods 2804 and 2806 are defined to include direct I/O bridges 250A and 250B, respectively.

Multiple partitions within the computer system, each of which may comprise one or more Pods or sub-Pods, each operates under the control of a separate operating system. The operating systems executing on the different partitions may be the same or different. For example, two of the operating systems may be different and one operating system does not control or manage the other operating system.

Figure 5:
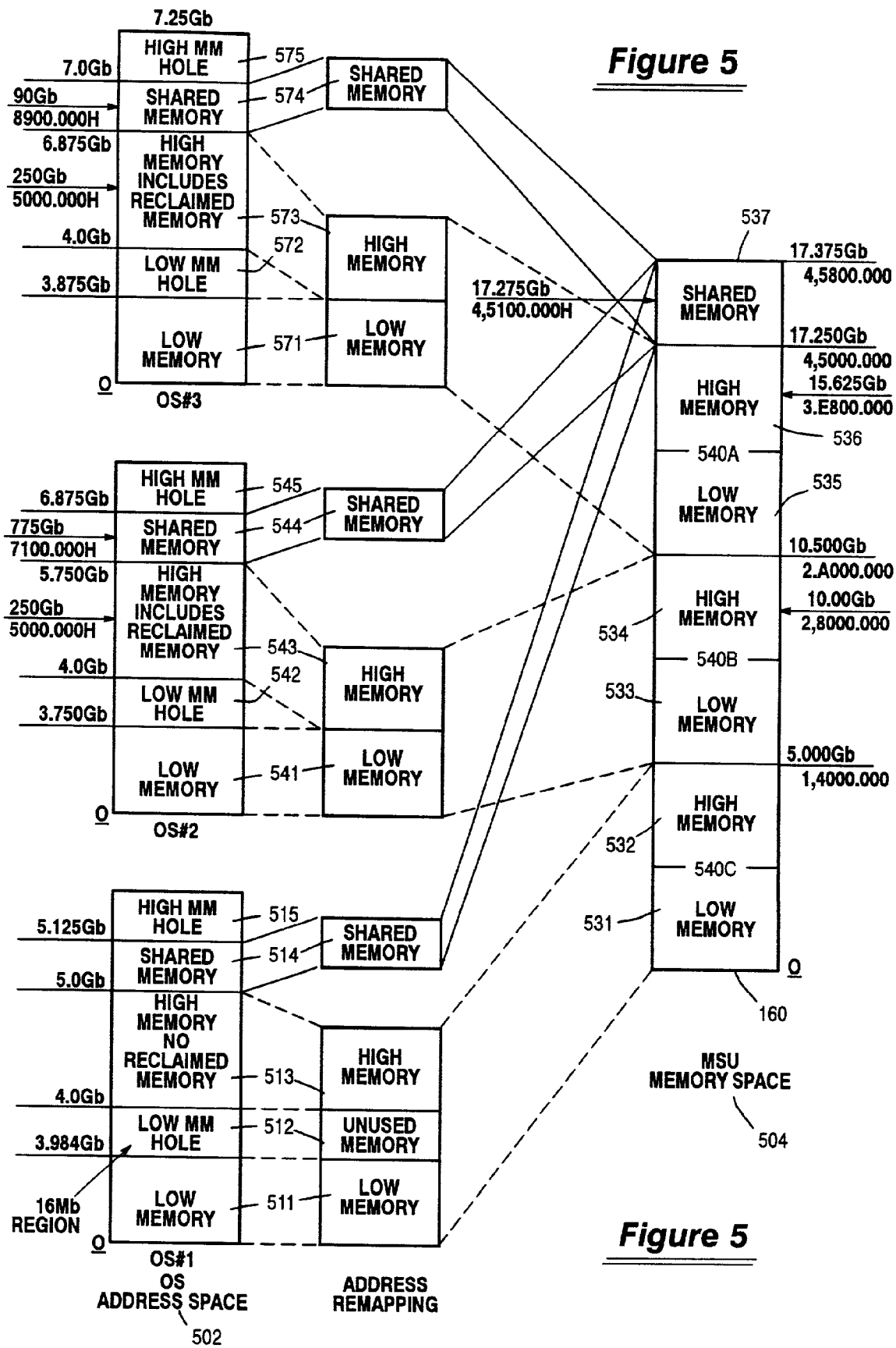
FIG. 5 illustrates a view of memory in an example with three partitions, each having an exclusive memory window and access to one shared window.

FIG. 5 illustrates an exemplary memory configuration that can be generated on the computer system of FIG. 2, in accordance with its partitionability. In this example, each of three operating systems (OS) has its own address space 502 (i.e., the physical address spaces of the respective processing modules on which those operating system execute). The main memory 160 has an address space 504. Three exclusive memory windows 540A, 540B and 540C, one for each operating system (i.e., partition), and one shared memory window 537, which is accessible by all three operating systems 540A, 540B and 540C (i.e., partitions), are defined within the address space 504 of the main memory 160.

For example, OS#1 includes within its address space a low memory window, such as low memory window 511, a low memory hole, such as low memory hole 512, a high memory window, such as high memory window 513, a portion defined as a shared memory window, such as shared memory window 514, and a high memory hole, such as high memory hole 515. Low memory window 511, low memory hole 512, high memory window 513, and high memory hole 515 are exclusive to operating system OS#1. The portion of the address space defined as the shared memory window 514 is intended to be shared.

As used herein, a "high memory hole" refers to memory space in a memory storage unit high address range that is unavailable for storage of data or instructions because the associated address has been assigned to an I/O device. As used herein, a "low memory hole" refers to memory space in a memory storage unit low address range that is unavailable for storage of data or instructions because the associated address has been assigned to an I/O device. As used herein, a "window" is an address range that has an upper limit and a lower limit. Visibility of and access to a window is governed by ownership rights. As used herein, a "shared window" refers to an address range that at least two operating systems own jointly. That is, more than one operating system has visibility and access to a shared window. As used herein, the term "exclusive window" refers to an address range which only one operating system owns. That is, only one operating system may view or access an exclusive window. Data coherency and consistency is maintained among operating systems nonetheless.

The address space of OS#2 and OS#3 have a similar structure as operating system OS#1. For the sake of brevity, these address spaces will not be described in detail.

The address space of many processors consists of both main memory and memory-mapped Input/Output (I/O) addresses. Main memory transactions are directed to the main storage units. I/O transactions are forwarded to the I/O subsystem. Since the I/O addresses access additional memory outside of the main storage, the system could end up with a processor address that references two memory locations. For consistency, one of these memory locations will have to be disabled. Disabling these main storage locations creates a hole in the main memory addressing, and results in memory being left unused. If the I/O memory address space is large, then a significant block of memory is left unusable. If multiple OS partitions are added to the system, then multiple I/O holes are created, resulting in potentially numerous holes scattered across the main memory address space. As illustrated in FIG. 5, low memory holes, such as low memory holes 511, 541, and 571, and high memory holes such as high memory holes 515, 545, and 575, are reclaimed and re-mapped to a contiguous address space, such as is depicted for MSU memory space 504. MSU memory space 504 is a conceptual view of main memory 160. Reclamation is described below in greater detail.

For example, the contiguous address space of MSU address space 504 includes low memory, such as low memory 531, 533, and 535, high memory, such as high memory 532, 534, and 536, and shared memory, such as shared memory 537. Low memory 531 and high memory 532 comprise an exclusive window exclusive to operating system OS#1. Low memory 533 and high memory 534 comprise an exclusive window exclusive to operating system OS#2. Low memory 535 and high memory 536 comprise an exclusive window exclusive to operating system OS#3. There are no memory addressing holes within main memory 160. The contiguous address space of main memory 160 is maintained independent of memory expansion, type of reference translation (described in detail below), or shared memory environment.

A. Memory Windows (Relocation and Reclamation)

A window is an address range bounded by upper and lower (address) limits. Access to and visibility of this space is limited by ownership rights. Two types of windows are provided: exclusive and shared.

Exclusive windows are owned by a single partition/operating system. Every instance of an operating system must operate within the limits of its own window. The address space of this window is not visible, nor accessible to other partitions/operating systems. In a preferred embodiment, all windows begin on a mod 32 MB address boundary. However, other boundaries are contemplated. From an operating systems point of view, particularly off-the-shelf operating systems such as Unix and Windows NT, its address space (i.e., the physical address space of the processor(s) on which it executes) always begins at address zero (i.e., its lower limit is zero), as illustrated in the left hand portion of FIG. 5. From the perspective of main memory 160, the address range begins at a relocation ($R_L$) value. The $R_L$ value is described in detail below. In a preferred embodiment, the upper limit of an exclusive window is set to a base address of a shared window, $S_{Base}^{OS}$.

A shared window is an address range bounded by upper and lower limits, where this space is visible and accessible by more than one operating system (i.e., partition), while each is running within its own exclusive window. The shared window is a common area through which different partitions, including, for example, their operating systems, can communicate and share data. This area also begins on a mod 32 MB address boundary in a preferred embodiment. The shared window can be N×32 MB in size. There are two configuration parameters associated with a shared window. One contains the base address for the portion defined as the shared window within the operating system's address space, $S_{BASE}^{OS}$ (i.e., the base addresses of the portions 514, 544, and 574 for OS#1, OS#2, and OS#3, respectively). The other holds the base address for the corresponding shared area, $S_{BASE}^{MSU}$, within the address space 504 of main memory 160. In a preferred embodiment, the upper limit for each operating system's shared area is the "top of memory" value for that operating system. The lower limit, $S_{BASE}^{OS}$, must be on a mod 32 MB address boundary. If exclusive areas are enabled, the location of shared memory 537 within MSU memory space 504 should be above the respective exclusive windows of all the operating systems that share this area. This last requirement is enforced as a hardware design tradeoff. The shared area is bounded by an upper limit, $T^{OS}$, which is an operating system's top of memory reference from within the operating system's addressing viewpoint. An address above $T^{OS}$ is trapped and never passed to main memory 160. Thus, shared memory 537 is completely bounded.

Figure 10:
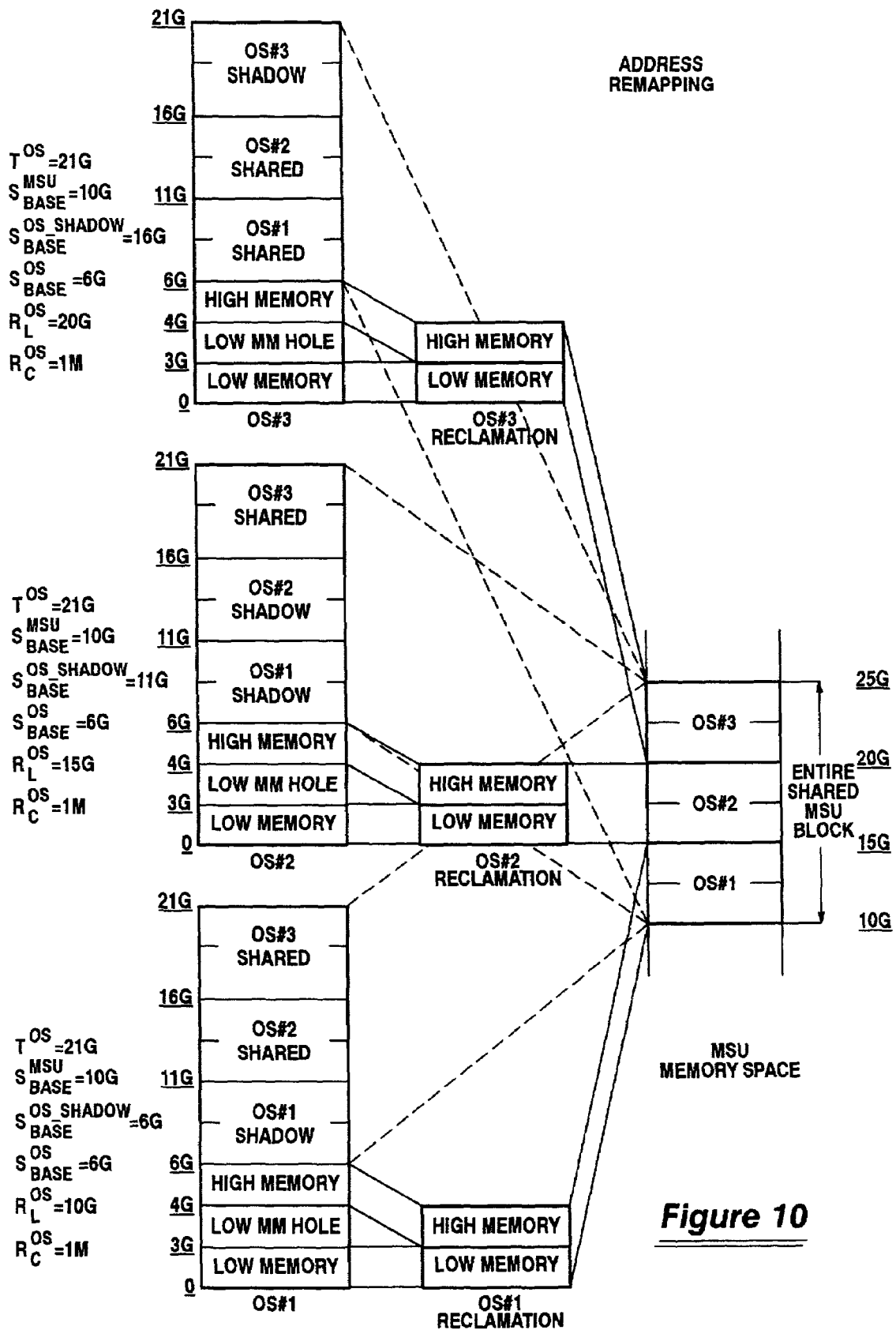
FIG. 10 illustrates a single shared memory window.

In other configurations contemplated herein, each operating system can coexist with the other operating systems in a totally shared space. An example of this is when an entire MSU block is set to shared. In this case, each operating system can be configured to be able to view the other operating system's address space. When configured in this fashion, the burden of maintaining access rights to individual pages of memory is placed upon the cooperating operating systems. The hardware no longer restricts accesses and visibility to individual operating systems. The operating systems must control memory page access rights by processor page control or some other means in order to prevent a process from corrupting memory. This method of operating is used by cooperative operating systems. An operating system can directly read from another operating system's memory page. Also, one operating system instance can load data destined for another operating system directly into the other operating system's data area, bypassing any temporary buffering. FIG. 10 illustrates an example of this type of configuration. Referring to FIG. 10, each operating system is configured in such a fashion that their shared area provides a view of the entire MSU memory, including a copy of its' own operating system instance. This aliased address is referred to henceforth as a shadow address. The address range residing below the shared area within each operating system's view is referred to as a local address.

In the present embodiment, an exclusive window can be associated with a maximum of one shared window. However, in other embodiments, an exclusive window could be associated with more than one shared window. In such a case, there would be separate $S_{BASE}^{MSU}$ and $S_{BASE}^{OS}$ values for each such shared window.

The physical address space of the processing module(s) of each partition (i.e., the address space as viewed by the operating system on that partition) is mapped, or relocated, to the corresponding exclusive memory window assigned to that partition within the address space 504 of the main memory 160. The address space of main memory 160 should be viewed as a single memory block for purposes of discussion. However, a translation function is described below in which addresses are additionally mapped to an individual memory storage unit 220 in order to produce address interleaving across memory storage units 220.

Figure 4:
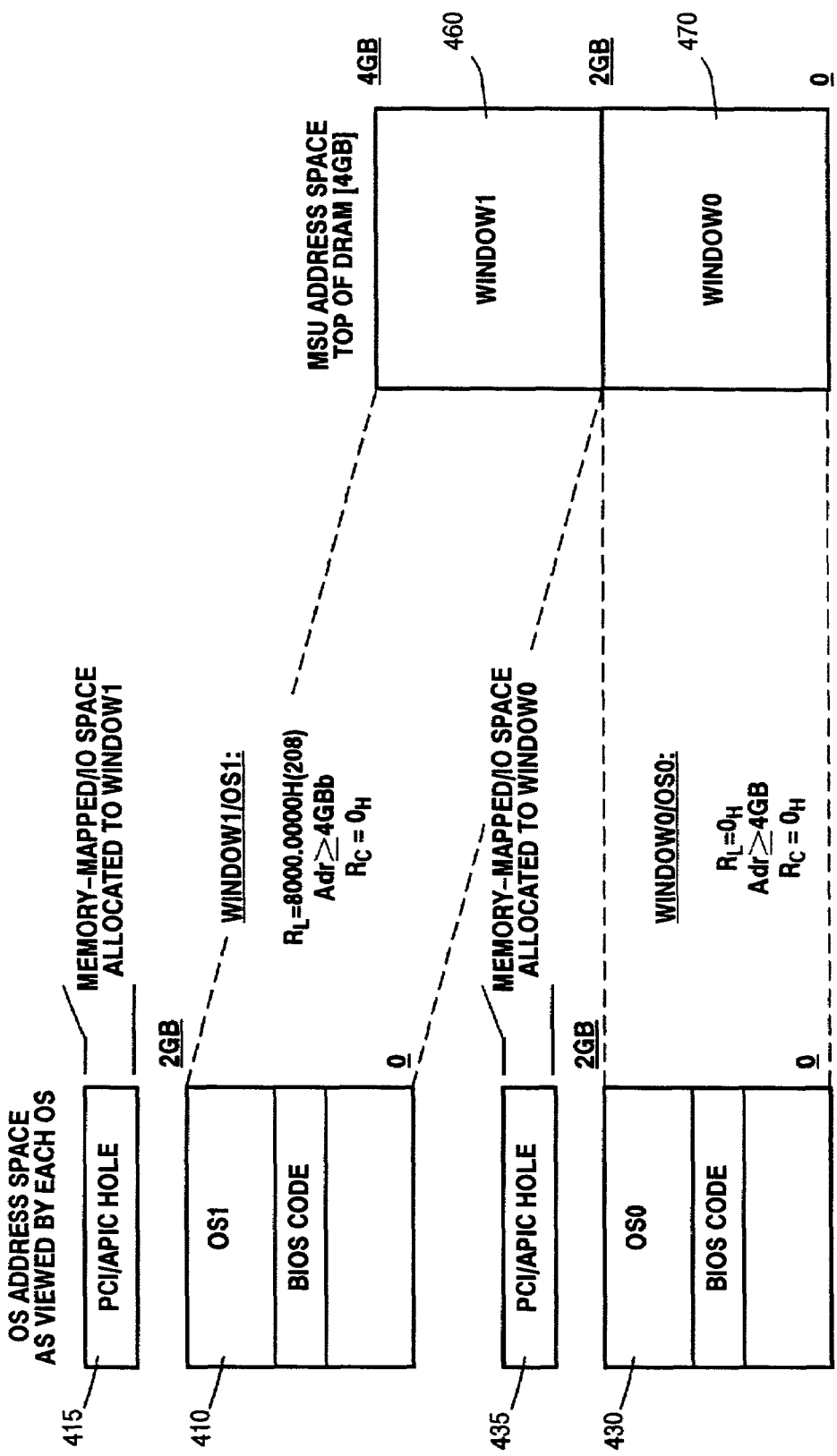
FIG. 4 illustrates a view of memory in an example with two partitions each having an exclusive memory window.

By way of further example, FIG. 4 illustrates a simple system containing two operating systems OS0 and OS1, each occupying 2 GB of memory space within main memory 160. Each operating system address space has its own memory-mapped I/O space 415 and 435. In this example, the holes associated with the memory-mapped I/O do not overlay the DRAM memory area.

At this point, the terms Relocation ($R_L$) and Reclamation $R_C$ can be further described. Relocation is the assignment of a base address to an exclusive memory window. This base address is the starting address (i.e., offset from address zero) for this window in the address space of main memory 160 and must be on a mod 32 MB address boundary. Referring to FIG. 4, the $R_L$ value for operating system window 430 (OS0) is zero since the window starts at the bottom of main memory 160. Operating System window 410 (OS1) has a $R_L$ value of 2 GB, because its physical address zero location has been relocated into the address space of main memory 160 starting at 2 GB.

Reclamation is the re-mapping of the address space within a window in order to reclaim the memory locations that fall behind a memory-mapped I/O address space. If reclamation is not active and a window has memory-mapped I/O assigned where the I/O range falls below the top of memory, a hole is generated in the windows memory address space. In the example of FIG. 4, reclamation is not needed, because the holes associated with the memory-mapped I/O do not overlay the DRAM memory area. However, referring to FIG. 5, reclamation can be performed for low memory holes 512, 542 and 572 (i.e., where the 32 bit memory-mapped I/O devices are mapped). Reclamation can be viewed as increasing the available memory address space above the hole equal to the size of the hole. In a preferred embodiment, reclamation is only performed if the hole size is 128 MB or larger. This is a hardware tradeoff. Also, because of design tradeoffs, only one address hole is reclaimed per operating system instance. However, a computer system can be implemented without enforcing these two design tradeoffs. Reclamation is discussed in more detail below.

Referring again to FIG. 5, all three operating system address spaces OS#1, OS#2 and OS#3 contain memory-mapped I/O overlaying the memory address space. However, the low memory hole 512 of operating system address space OS#1 is smaller than the minimum 128 MB block size, so reclamation is not performed. The low memory hole is reclaimed for the other two operating systems, however, in their exclusive windows 540A and 540B, respectively.

Figure 3:
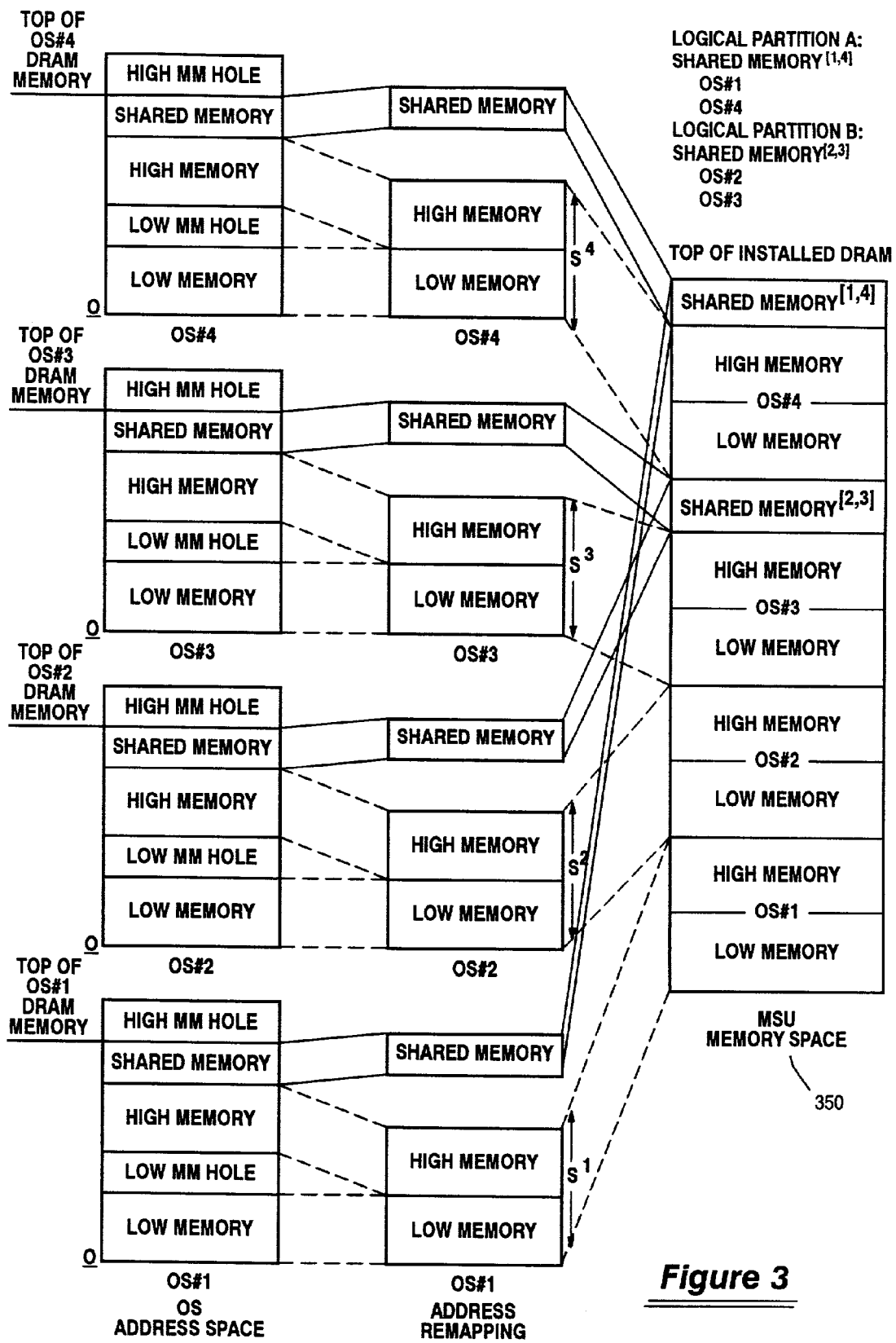
FIG. 3 illustrates a view of memory in an example with four partitions, each having an exclusive memory window and access to two shared windows.

FIG. 3 illustrates another possible configuration containing four operating system windows (or instances). Here OS#1 and OS#4 share a common area, while OS#2 and OS#3 share another. Note that the placement of the individual windows into the address space of main memory 160 is controlled by the $R_L$ variable. FIG. 3 depicts only one of the many possible mappings of these windows into MSU memory space 350.

According to the present embodiment, each operating system window has associated therewith a configuration register that provides a set of configuration parameters: $R_L^{OS}$, $R_C^{OS}$, $S_{BASE}^{OS}$, and $S_{BASE}^{MSU}$. Different window mappings are easily generated simply by changing the operating system windows' configuration parameters.

TABLE A illustrates the configuration register values for each the operating system windows shown in FIG. 5. Reclamation of a memory hole depends on the contents of the configuration register. TABLE A includes a row for each operating system of interest. Relocation field, $R_L^{OS}$, stores the base (or starting) address for the operating system window of interest as relocated in the memory storage unit 220. Reclamation field, $R_C^{OS}$, stores an address range corresponding to the size of the low memory hole in the operating system window of interest. Shared base OS field, $S_{BASE}^{OS}$, stores the base address for the portion of the operating system address space designated as the shared portion. Shared base MSU field, $S_{BASE}^{MSU}$, stores the base address for the shared window 537 within the address space of the memory storage unit memory 220.

location 1.4000.0000$_H$ and includes 5.000 gigabytes of memory space. High memory window 534 begins at address location 2.8000.000$_H$ and includes 10.000 gigabytes for a total of 10.500 gigabytes of memory space in exclusive window 540B. In exclusive window 540A, low memory window 535 begins at address location 2.A000.0000$_H$ and includes 5.125 gigabytes of memory space. High memory window 534 begins at address location 3.E800.000$_H$ and includes 1.625 gigabytes of memory space. When one of the processors of a processing module of a given partition issues an address on its address lines ("the referenced address" or "processor address"), the TCT 270 for that processor adjusts the address for any relocation, reclamation, or shared windowing, as required, to produce the address of the corresponding location in the main memory 160. The values in the various fields of the configuration register (TABLE A) are used during this process. Specifically, if the referenced address is within the portion of the operating system address space designated as the shared window, then the referenced address is offset by the values contained in shared base OS field and shared base MSU fields of the configuration register. If the referenced address is within the high memory window of the operating system's address space, then the referenced address is offset

TABLE A

The Configuration Register Values for the Window Mapping Shown in FIG. 5.

| | Relocation $R_L^{OS}$ | Reclamation $R_C^{OS}$ | Shared Base$^{OS}$ $S_{BASE}^{OS}$ | Shared Base$^{MSU}$ $S_{BASE}^{MSU}$ |
|---|---|---|---|---|
| OS$^{OS\#1}$ | 0.0000.0000$_H$ (0 GB) | 0.0000.0000$_H$ (0 GB) | 1.4000.0000$_H$ (5.000 GB) | 4.5000.0000$_H$ (17.250 GB) Dobbins et. al. |
| OS$^{OS\#2}$ | 1.4000.0000$_H$ (5.000 GB) | 0.1000.0000$_H$ (0.250 GB) | 1.7000.0000$_H$ (5.750 GB) | 4.5000.0000$_H$ (17.250 GB) |
| OS$^{OS\#3}$ | 2.A000.0000$_H$ (10.500 GB) | 0.0800.0000$_H$ (0.125 GB) | 1.B800.0000$_H$ (6.87 GB) | 4.5000.0000$_H$ (17.250 GB) |

In the present embodiment, the TCT 270 for each pair of processors 240 contains the Configuration Register and other registers and logic for performing relocation, reclamation, and translation, as described herein, for addresses issued by the processors interfaced to that TCT. These registers and logic are also replicated in the TCMs 285 of the crossbar interconnects 290, because the TCMs 285 must perform the same relocation, reclamation, and translation on memory requests received from an I/O processor (e.g., PCI card) via a respective DIB 250.

Within the physical address space of the processors of each partition, the TCTs 270 of that partition determine an address range for low memory, high memory, low memory holes, high memory holes, and shared memory. For example, in the address space of operating system OS#3, low memory window 571 begins at address location 0.000$_H$ and includes 3.875 gigabytes of memory space. High memory window 573 begins at address location 1.5000.000$_H$ and includes 5.250 gigabytes of memory space. Low memory hole 572 includes 125 megabytes of unused memory space to be reclaimed. High memory hole 575 includes 250 megabytes of unused memory to be reclaimed.

In performing its windowing function, each TCT 270 further assigns its partition an exclusive memory window within the address space 504 of the main memory 160. Within each exclusive memory window, there is an address range for low memory and for high memory. For example, in exclusive window 540B, low memory window 533 begins at address by the values contained in the relocation and reclamation fields of the configuration register. If the referenced address is within the low memory window of the operating system's address space, then the referenced address is offset by the value contained in the relocation field of the configuration register. As described herein, therefore, the TCTs 270 provide a means for mapping the physical address space of the processors in each partition to the respective exclusive memory windows assigned to each partition, and, more specifically, a means for relocating a reference to a location within the physical address space of the processors on a respective partition to the corresponding location within the exclusive memory window assigned to that partition. As mentioned above, in a similar manner, the TCMs 285 perform any relocation or reclamation required for memory addresses received from an I/O processor (e.g., PCI card) communicating via a DIB and TCM to main memory.

TABLE B illustrates pseudo-code for implementing relocation and reclamation of operating system address spaces (i.e., the physical address spaces of the processors of the different partitions) to their corresponding exclusive memory windows within main memory. Generally, memory-mapped I/O addresses are filtered out by the TCT 270, leaving only references to main memory 160. The remaining addresses are then passed through the algorithm shown in TABLE B, as described in detail below. Finally, the relocated memory reference is passed to main memory 160.

Figure 8:
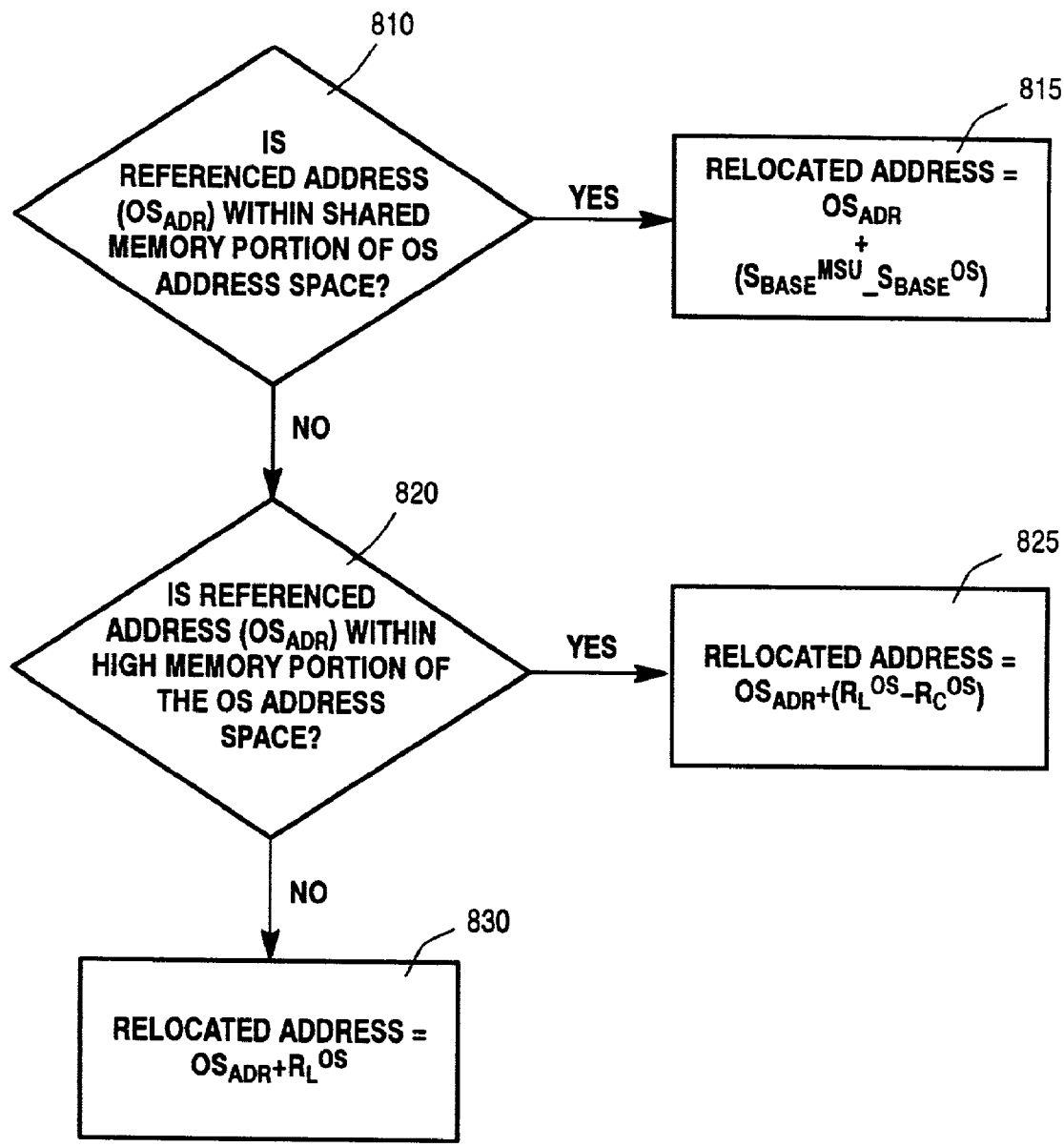
FIG. 8 is a flowchart illustrating a forward windowing algorithm.

TABLE B if $OS^{OS}_{ADR} \in RANGE_{SHAREDMEMORY}$
then $MSU_{ADR} \rightarrow OS^{OS}_{ADR} + [S^{MSU}_{BASE} - S^{OS}_{BASE}]$;
  elseif $OS^{OS}_{ADR} \in RANGE_{HIGHMEMORY}$
  then $MSU_{ADR} \rightarrow OS^{OS}_{ADR} + [R^{OS}_{L} - R^{OS}_{C}]$;
  else /* $OS^{OS}_{ADR} \in RANGE_{LOWMEMORY}$ */
    $MSU_{ADR} \rightarrow OS^{OS}_{ADR} + [R^{OS}_{L}]$;
  endif;

FIG. 8 illustrates a flow chart of the address windowing algorithm. Reference is also made to TABLE A. As shown in step 810, a check is performed to determine whether a reference address (i.e., an address issued by one of the processors of a processing module within a given partition executing a given operating system), $OS_{ADR}$, is within the portion of the operating system's address space designated as the shared memory window. If so, the referenced address is relocated to an address based on the formula: $OS_{ADR} + [S_{BASE}^{MSU} - S_{BASE}^{OS}]$, as shown in step 815. This is referred to as the relocated address, which in turn is used to access main memory 160. The relocated address is the address of the corresponding location in the shared memory window defined within the main memory 160.

Otherwise, a check is performed to determine whether the referenced address is within the high memory portion of the operating system address space (e.g., high memory 513, 543 or 573). This is shown in step 820. If so, the referenced address is relocated to an address based on the formula: $OS_{ADR} + [R_L^{OS} - R_C^{OS}]$, as shown in step 825. The relocated address identifies the corresponding location in the exclusive memory window for the partition.

Otherwise, the algorithm assumes that the referenced address falls within the low memory portion of the operating system address space (e.g., low memory 511, 541 or 571), as shown in step 830. In this case, the referenced address is relocated to an address based on the formula: $OS_{ADR} + [R_L^{OS}]$. Thus, address references within the physical address space of a processor within a partition (i.e., the address space viewed by the operating system) are relocated to their corresponding locations within either the exclusive memory window defined for that partition within main memory or the shared memory window defined within main memory.

Figure 33:
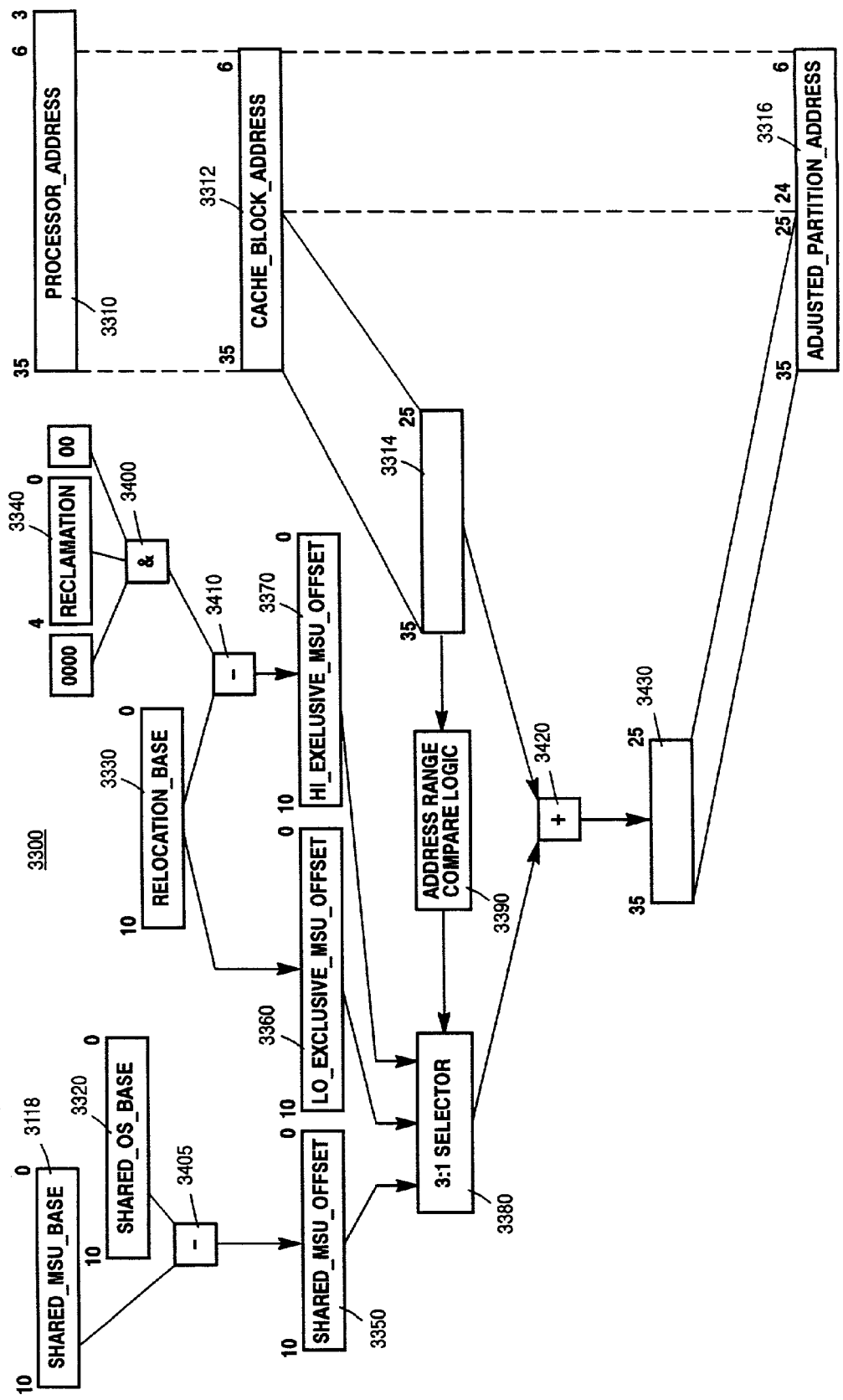
FIG. 33 is a block diagram of apparatus for carrying out the address relocation and reclamation methods of the computer system of FIG. 2.

FIG. 33 is a block diagram illustrating apparatus, in the form of registers and logic, for performing the relocation and reclamation functions described above. This logic is provided in each TCT 270 to perform the relocation and reclamation functions for memory addresses issued by the processors (MP) 240 interfaced to the TCT 270. As mentioned, this logic is also replicated in each TCM 285 in order to perform relocation and reclamation for memory addresses issued by an I/O processor via a respective DIB 250.

According to the preferred embodiment, as illustrated in FIG. 33, a memory address issued on the address lines of a given processor 240 (or by an I/O processor via a respective DIB 250) is captured in a Processor_Address register 3310. In the preferred embodiment, main memory is addressable in words of 8 bytes bits (1 word=8 bytes=64 bits), and therefore, the least significant 3 bits of the processor address are not needed for generating an adjusted address. Thus, as shown, only bits [35:3] are captured in the Processor_Address register 3310. Furthermore, in the preferred embodiment, main memory is cached in blocks of eight (8) words (8 words=64 bytes), and thus bits [35:6] represent the effective cache block address. As shown, these bits are captured in a subsequent Cache_Block_Address register 3312.

As further described above, in the preferred embodiment, all memory windows, whether "exclusive" or "shared," must begin on a mod 32 MB address boundary. Consequently, in relocating a processor address to a particular exclusive memory window or shared memory window, only bits [35:25] of the processor address are needed for the calculation. Accordingly, as shown, these bits are captured to a temporary register 3314.

The values $S_{BASE}^{MSU}$, $S_{BASE}^{OS}$, $R_L^{OS}$, and $R_C^{OS}$ are stored in respective register locations 3318, 3320, 3330, and 3340. Collectively, these register locations comprise the Configuration Register described above. In practice, these register locations can comprise separate fields of a single, larger register, or they can be implemented as four separate registers. For the case of a processor address that falls within the portion of the processor's address space designated as a shared memory window, a subtractor 3405 subtracts the $S_{BASE}^{OS}$ value in register location 3320 from the $S_{BASE}^{MSU}$ value in register location 3318 and stores the resulting offset value in register 3350. For the case of a processor address that falls within the high memory portion of the exclusive memory window assigned to the partition to which the processor belongs, a subtractor 3410 subtracts the $R_C^{OS}$ value in register 3340 from the $R_L^{OS}$ value in register 3330 and stores the resulting offset value in register 3370. As further shown, the five bits of the $R_C^{OS}$ value are padded (using an append function 3400) with two logic zero bits in the least significant bit positions and four logic zero bits in the most significant bit positions to properly align the bits for subtraction from the bits of the $R_L^{OS}$ value. Recall from above that in the present embodiment, reclamation can only be performed in increments of 128 MB. For the case of a processor address that falls within the low memory portion of the processor's exclusive memory window, the $R_L^{OS}$ value in register 3330 is the required offset, and thus, that value is stored directly in register 3360.

Address Range Compare Logic 3390 performs the steps described above of determining whether the address issued by the processor falls within the portion of the processor's address space designated as a shared memory window, or whether the address falls within either the low memory or high memory portions of the exclusive memory window assigned to the partition to which the processor belongs. Based on this comparison, the appropriate offset from one of the registers 3350, 3360, or 3370 is selected via a 3:1 Selector 3380. An adder 3420 then adds the selected offset value to the bits [35:25] of the processor address stored in register 3314, and the result is stored in register 3430. The bits in register 3430 are then prepended to bits [24:6] of the cache block address to form the adjusted address, which is stored in an Adjusted_Partition_Address register 3316. The adjusted address in register 3316 is then used to access main memory (after further translation in accordance with the interleaving mechanism described below).

Referring again to FIG. 5, and as already discussed above, addresses that have been assigned to memory-mapped I/O can be reclaimed. These addresses are referred to as low memory holes, such as low memory hole 512. In a preferred embodiment, the low memory holes always begin immediately below 4 GB and extend downward in the address space of the associated operating system equal to the size of the hole. Obviously the placement of the low memory hole is a design choice. Memory reclamation is to be used only when the top of memory addresses, for the installed memory amount, is greater than the bottom of the memory overlap region (i.e., 4 GB minus the overlap hole size). In other words, reclamation should not be used in systems where there is no overlap between the PCI APIC range and installed DRAM memory.

All overlaid memory, and any memory immediately above it, can be perceived as sliding up in the processor/operating system address space. Therefore, the memory that lies behind and starting at the bottom of the hole now begins at address 4 GB and extends upward from this point. Memory addressing remains contiguous from the 4 GB starting address and extends to the new top of memory, i.e., the original top of memory plus the hole size.

Figure 11:
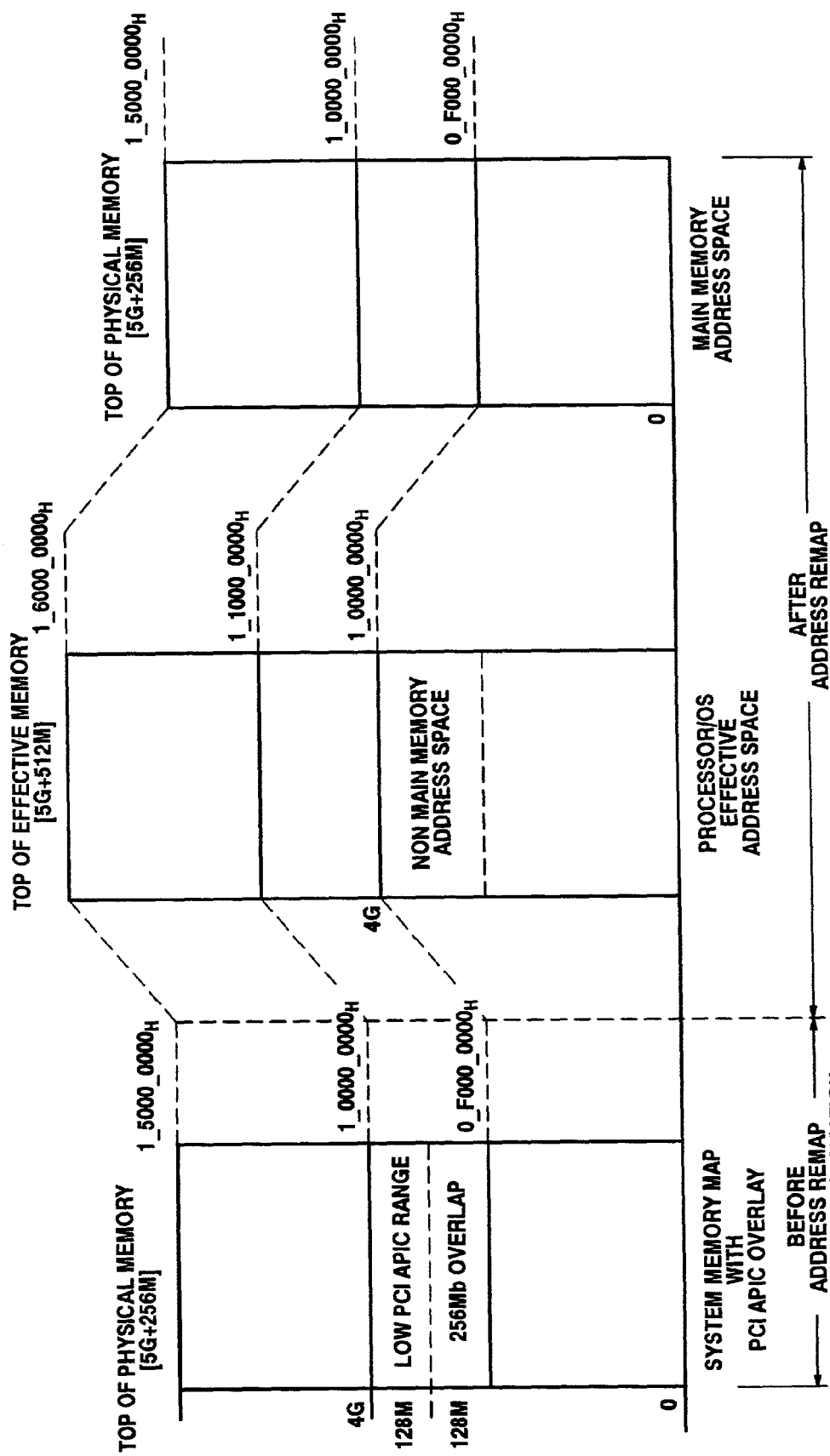
FIG. 11 and FIG. 12 illustrate further aspects of the computer system of FIG. 2.
Figure 12:
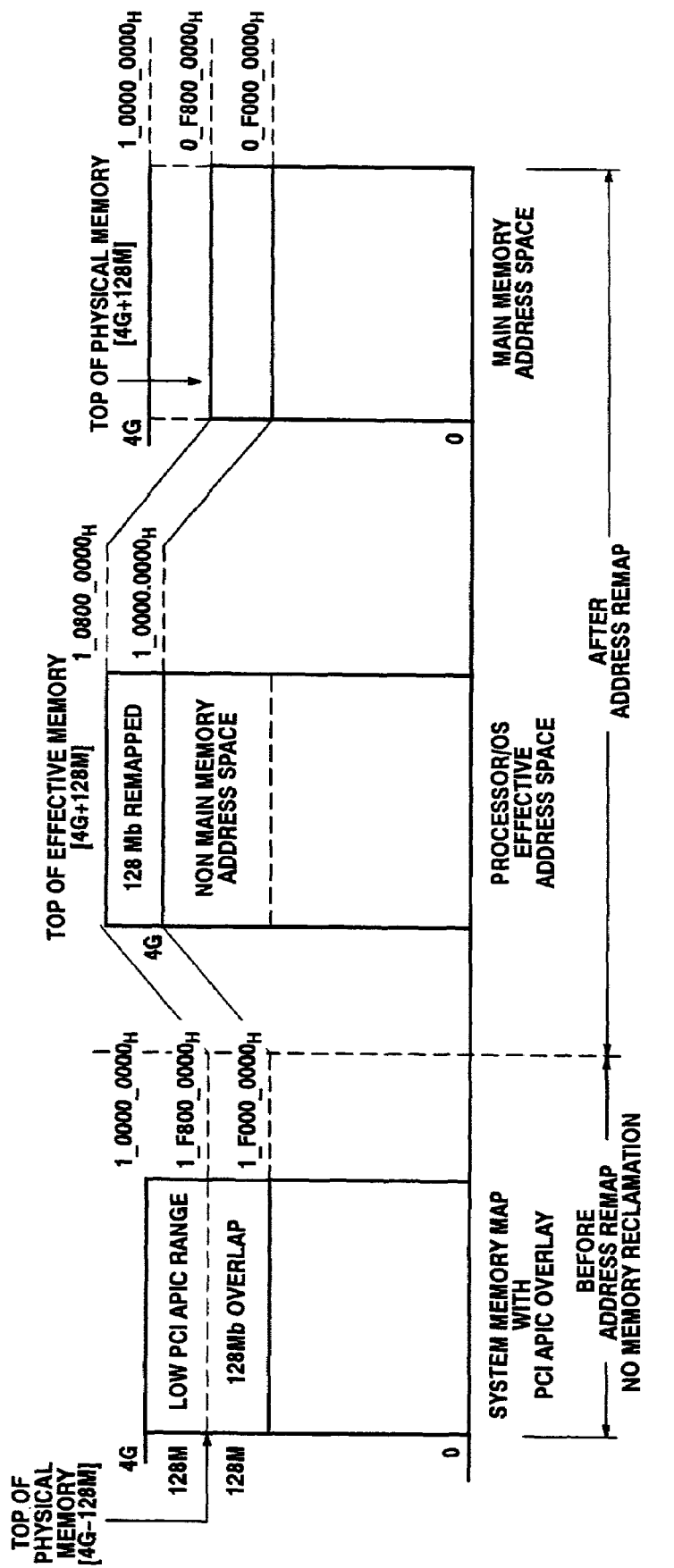

FIG. 11 illustrates how an address range is mapped using a specific example. For systems with 4 GB or less of memory and where there is a partial memory overlay with the PCI APIC Range, reclamation can be used. In these systems, the overlapped memory is mapped to start at 4 GB. FIG. 12 illustrates this point. The sub-Pod takes a processor's adjusted memory request address, and after determining that it lies above the 4 GB boundary, it subtracts a fixed value from it. This memory address reflects the insertion of the PCI APIC Range into the system address space. Therefore, the adjustment offset is equal to the PCI APIC Range hole size, fixed in increments of 128 MB blocks as described above.

Provided below are a few more examples of relocation and reclamation. Reference is made to FIG. 5 and TABLE A. The first example deals with an address reference within an exclusive window. The second example references a shared window.

As shown in FIG. 5, operating system address space OS#3 has been relocated ($R_L$) to main memory address 10.5 GB. Reclamation is set to recover the 128 MB (0.125 GB) memory behind the low memory hole 572. Using $OS_{ADR}=1.5000.0000_H$ as the memory reference, TCT 270 performs the function $OS_{ADR}+[R_L-R_C]$ to generate an address in MSU memory space 504. The values for $R_L$ and $R_C$ are provided in TABLE A. Thus, $OS_{ADR}+[R_L-R_C]$ becomes $1.5000.0000_H+[2.A000.0000_H-0.0800.0000_H]$. This becomes $1.5000.0000_H+2.9800.0000_H$, which becomes $3.E800.0000_H$ (15.625 GB). This address corresponds to a location within exclusive window 540A, which is associated with operating system OS#3. A simple calculation shows the address is offset 1.25 GB from high memory area base address of 4 GB. The address calculated above is also offset 1.25 GB from the relocated high memory base address (14.375 GB) of OS #3.

If a processor in the partition in which OS#2 is executing issues the same address, $1.5000.0000_H$, the relocated address will instead fall within the exclusive memory window assigned to that partition (i.e., window 540B). Thus $OS_{ADR}+[R_L-R_C]$ becomes $1.5000.0000_H+[1.4000.0000_H-0.1000.0000_H]$. This becomes $1.5000.0000_H+1.3000.0000_H$, which becomes $2.8000.0000_H$ (10.00 GB). This address clearly falls in high memory area 534 of main memory 160, which is part of the exclusive memory window (540B) assigned to the partition executing OS#2. This example demonstrates that the operating systems in two different partitions will each view their address spaces as if starting at the same base address (i.e., address zero), but address references within those address spaces will be properly relocated to their corresponding locations within the exclusive memory windows assigned to each partition within main memory. Of course, the relocation feature can be used to map any two overlapping physical address spaces on different partitions (not just those that both start at address zero) to the respective exclusive memory windows in main memory.

The second example uses memory references to shared window 575 associated with OS#3. For this example, assume OS#3 tries to reference address $1.B900.0000_H$ (6.890 GB). TCT 270 determines that this address falls within the range of shared memory. As such, the function mapping $OS_{ADR}+[S_{BASE}^{MSU}-S_{BASE}^{OS}]$ is applied to generate an appropriate address to access MSU memory space 504. Thus the mapping function becomes $1.B9000.0000_H+[4.5000.0000_H-1.B8000.0000_H]$. This becomes $1.B9000.0000_H+2.98000.0000_H$, which becomes $4.5100.0000_H$ (17.2656 GB). This address falls within the range of shared memory window 537 of MSU memory space 504.

Using the same address offset, 0.0156 GB, and applying it to operating system OS#2's shared base address, the equivalent address can be calculated for OS#2. $OS_{ADR}$ equals 5.750 GB+0.0156 GB, which equals 5.7656 GB ($1.7100.0000_H$). Applying the mapping function, $OS_{ADR}+[S_{BASE}^{MSU}-S_{BASE}^{OS}]$, we get $1.7100.0000_H+[4.5000.0000_H-1.7000.0000_H]$. Thus the mapping function generates a memory address of $4.5100.0000_H$ (17.2656 GB). Thus, a memory reference by operating system OS#3 of $1.B900.0000_H$ (6.8906 GB) and a memory reference by operating system OS#2 of $1.7100.0000_H$ (5.7656 GB) both access main memory 160 at address $4.5100.0000_H$ (17.2656 GB).

B. Interleaving and Stacking of Memory (Translation)

Translation is the process by which a memory reference (after relocation and, if appropriate, reclamation) is mapped to a specific memory storage unit within main memory 160. Referring to FIG. 2, main memory 160 is conceptually divided into a plurality of MSU pairs 222 and 224 (referred to as MSU_PAIRs). Individual MSU's 220 within a MSU_Pair are not uniquely connected. Only two MSU_PAIRs 222, 224 are shown in FIG. 2 for illustration purposes only. There can be more than two MSU_PAIRs.

Computer system 200 utilizes the adjusted address (or memory reference) that was generated during relocation and, if applicable, reclamation as described above, and then interleaves or stacks the adjusted memory reference between memory storage unit pairs 222, 224. The goal is to distribute each of the main memory requests associated with each processor 240 over the global address space of main memory 160 (i.e., total DRAM address space) such that sequential memory accesses are distributed over different memory storage units 220 in order to minimize contention for memory resources. In the event interleaving cannot be performed, memory addresses are directed to memory storage unit pairs in a sequential order, referred to herein has stacking.

In an exemplary embodiment, there are four memory storage units, i.e., two pairs of memory storage units, such as memory storage unit pair 222 and memory storage unit pair 224. Each memory storage unit pair (hereinafter MSU_Pair) includes two memory storage units, such as memory storage units 220A and 220B. Interleaving is accomplished across memory storage unit pair 222 and 224. Then, interleaving is accomplished across the memory storage units 220 within the memory storage unit pairs 222 and 224, respectively. There effective result is four-way interleaving.

For example, suppose there are two memory storage units, such as memory storage unit 220A and memory storage unit 220B. Optimally, references to memory would be ping-ponged between memory storage unit 220A and memory storage unit 220B. That is, the first reference to memory accesses memory storage unit 220A, while the second accesses memory storage unit 220B. If memory storage unit 220A has only one bank populated, while memory storage unit 220B has eight banks populated, ping-ponging between memory storage unit 220A and memory storage unit 220B, then at some point memory storage unit 220A will run out of memory space. In that case, the remaining memory in memory storage unit 220B will be stacked, i.e., resort to sequential addressing (or referencing) of memory storage unit 220B.

One characteristic of memory storage units is that there may be one memory storage unit present or a plurality of memory storage units present in a particular memory storage unit "pair." Moreover, memory storage units can be populated at different rates. That is, one memory storage unit can have one bank of DRAM populated, while another memory storage unit may have eight banks of DRAM populated.

The translation process involves interleaving and stacking of memory references between memory storage unit pair 222 and memory storage unit pair 224, and among MSUs 220. For a memory request issued from a processor (MP) 240, this process is performed by the respective TCT 270. For memory requests issued from an I/O processor (e.g., PCI card) via a DIB, this process is performed by the respective TCM 285.

Considering the operation of a TCT 270, a mechanism is provided for specifying at initialization time which MSU_Pair or which MSU 220 should receive the first cacheline address (i.e., an address from the TCT 270). The TCT 270 takes a processor's memory read/write address (after any relocation and/or reclamation) and passes it through an address translation function. In a preferred embodiment, memory storage unit 220 receives a twenty-eight bit cache line address (or memory reference) and an 8 byte container address from a multi-cycle signal representing 16 gigabytes of memory space. Based on the settings of the address translation options, which are described below, the translation function generates a MSU number that is associated with the memory storage unit that will receive the request, along with the upper ten 10 bits of the 28 bit MSU mapped address. The TCT 270 also provides the MSU's lower 18 bits of the mapped address; however, these bits are not altered by the translation function.

A TCT 270 allows for various combinations of interleaving and stacking of memory accesses on both a MSU_Pair basis and between each individual MSU 220. Listed in TABLE C are the eight combinations for interleaving/stacking memory between MSU_PAIRs and their individual MSU's 220.

TABLE C

| Option | Between MSU_Pair0 & MSU_Pair1 | MSU_Pair0 Between MSU0 & MSU1 | MSU_Pair 1 Between MSU2 & MSU3 |
|---|---|---|---|
| ISS | Interleaved | Stacked | Stacked |
| ISI | Interleaved | Stacked | Interleaved |
| IIS | Interleaved | Interleaved | Stacked |
| III | Interleaved | Interleaved | Interleaved |
| SSS | Stacked | Stacked | Stacked |
| SSI | Stacked | Stacked | Interleaved |
| SIS | Stacked | Interleaved | Stacked |
| SII | Stacked | Interleaved | Interleaved |

Referring to TABLE C, in the III mode, the algorithm distributes every other cache line to alternating MSU_PAIRS (e.g., cache line address 0 forwarded to MSU_PAIR 222). The algorithm further distributes every other cache line directed to an MSU_PAIR to alternating MSUs 220 in MSU_PAIR 222, 224 (e.g., cache line address 0 is directed to the lower numbered MSU 220).

In ISI, ISS or IIS mode, the algorithm distributes every other cache line to alternating MSU_PAIRS 222, 224 (e.g., cache line address 0 is forwarded to MSU_PAIR 222). For MSUs 220 within a MSU_PAIR 222, 224 that are stacked, the algorithm further directs sequentially addressed accesses to the lower numbered MSU 220 of the selected MSU_PAIR 222, 224 until it is full before sequentially filling the other MSU 220. For MSUs 220 within a MSU_PAIR 222, 224 that are interleaved, the algorithm further distributes every other cache line directed to a MSU_PAIR 222, 224 to alternating MSUs 220 (i.e., cache line address 0 is directed to the lower numbered MSU 220 within MSU_PAIR 222, 224).

In SSS mode, the lower numbered MSU_PAIR 222, 224 (determined by a configuration register) is sequentially filled until it is full before sequentially filling the other MSU_PAIR 222, 224. The algorithm further directs accesses sequentially to the lower numbered MSU 220 within the selected MSU_PAIR 222, 224 until it is full before sequentially filling the other MSU 220 of that MSU_PAIR 222, 224.

In SSI, SII or SIS mode, the algorithm sequentially fills the lower numbered MSU_PAIR 222, 224 until it is full before sequentially filling the other MSU_PAIR 222, 224. For MSUs 220 within a MSU_PAIR 222, 224 that are stacked, the low MSU 220 of the selected MSU_PAIR 222, 224 is then sequentially addressed until it is full before sequentially filling the other MSU_PAIR 222, 224. For MSUs 220 within a MSU_PAIR 222, 224 that are interleaved, every other cache line in a MSU_PAIR 222, 224 is distributed to alternating MSUs 220. Cache line address 0 is directed to the lower numbered MSU 220 within that MSU_PAIR 222, 224.

For example, following the ISS option, interleaving is accomplished every other cache line to alternating memory storage unit pairs. That is, a first cache line address is forwarded to memory storage unit pair 222 and the next cache line address is forwarded to memory storage unit pair 224. The present embodiment sequentially stacks memory references in memory storage unit 220A until memory storage unit 220A is fill. When memory storage unit 220A is full, the present embodiment then sequentially stacks memory references in memory storage unit 220B until it is full. Similarly, when memory storage unit 220C is full, the present embodiment then sequentially stacks memory references in memory storage unit 220D until it is full.

TABLE D defines a translation and reclamation register. The table includes a row for each address bit of interest within the translation and reclamation register. Each row includes a function field and a default value field. Function field indicates the function of the address bit of interest. Default value field is the value that the address bit defaults to upon initialization. The status of the bits in memory address translation and reclamation register determine whether memory address space reclamation is enabled and whether address translation is enabled. It also indicates which memory storage unit pair to select and which memory storage unit to select for the translation process.

TABLE D

| Bits | Function | Default Value |
|---|---|---|
| [15] | Address Translation Enable | 0 (Default) |
| [14] | Memory Address Space Reclamation Enable | 0 |
| [13] | PAIR_MODE | 0 |
| [12] | PAIR_SEL | 0 |
| [11:10] | Reserved | 00 |
| [9.0] | Smallest_Pair_Size[9:0] | $000_H$ (Default) |

It is the responsibility of a memory controller (not shown) to interleave between banks of an MSU_PAIRs 222, 224 and MSUs 220.

Whether computer system 200 implements interleaving depends on the settings in a plurality of registers. For example, TABLES E and F illustrate the contents upon initialization of a memory address translation register corresponding to a first memory storage unit pair and a second memory storage unit pair, respectively. Memory address translation register includes a row for each bit of interest. Each row includes a function field and a default value field. Function field includes the function of the address bit of interest. Default value field is the value that the address bit defaults to upon initialization.

TABLE E

| Bits | Function | Default Value |
|---|---|---|
| [15] | Pair#0 Address Translation Enable | 0 (Default) |
| [14] | Reserved | 0 |
| [13] | Pair0_Mode | 0 |
| [12] | Pair0_Sel | 0 |
| [11:10] | Reserved | 00 |
| [9:0] | Pair0_Smallest_MSU_Size[9:0] | $000_H$ (Default) |

TABLE F

| Bits | Function | Default Value |
|---|---|---|
| [15] | Pair#1 Address Translation Enable | 0 (Default) |
| [14] | Reserved | 0 |
| [13] | Pair1_Mode | 0 |
| [12] | Pair1_Sel | 0 |
| [11:10] | Reserved | 00 |
| [9:0] | Pair1_Smallest_MSU_Size[9:0] | $000_H$ (Default) |

The status of the bits in memory address translation registers shown in TABLE E and F determine whether interleaving for a particular pair of memory storage units is enabled or whether stacking is enabled. The status of the bits in memory address translation registers further indicate the smaller of the two memory storage units in a memory storage unit pair.

TABLE G shows Configuration Information required at initialization for forward and reverse address translation. TABLE G relates to FIG. 2 as follows: MSU_Pair0 is MSU_Pair222, MSU_Pair1 is MSU_Pair 224, MSU#0 is MSU 220A, MSU#1 is MSU 220B, MSU#2 is MSU 220C and MSU#3 is MSU 220D.

TABLE G

| Name | Definition |
|---|---|
| MSU_Pair0/Pair1 Configuration Registers: used to control accesses to a specific MSU_Pair | |
| PAIR_MODE | This 1 bit register controls whether address interleaving between MSU_PAIRs is selected. Address interleaving should only be enabled when both MSU_PAIRs are present. When = 0 then Interleave between MSU_PAIRs = 1 then Stack between MSU_PAIRs (Pair0 first, overflow into Pair1) |
| SMALLEST_PAIR_SZ | This register[1] holds one of two memory size values[2] depending on whether address interleaving between MSU_PAIRs is enabled. if PAIR_MODE = 0 (interleaving then) = the smaller of the two memory size values between MSU_Pair0 (MSU#0 + MUS#1) and MSU_Pair1 (MSU#2 + MSU#3). else PAIR_MODE = 1 (stacking) = the memory size of the MSU pairs selected by the PAIR_SEL register |
| PAIR_SEL | This 1 bit register specifies which one of the two MSU_PAIRs is to be addressed first. The value depending on whether address interleaving is being performed. For interleaving, the MSU_Pair with the largest installed memory must be selected. For stacking, either MSU_Pair can be selected. if PAIR_MODE = 0 (interleaving) then = 0 if pair0 has more storage then pair1 = if 1 if pair1 has more storage then pair0 else PAIR_MODE = 1 (stacking) = Pair which gets the memory "address0" (0 - Pair0; 1 - Pair1) |
| MSU_Pair0 Configuration Registers: used to control accesses to a specific MSU within pair0 | |
| PAIR0_MODE | This 1 bid register controls whether address interleaving between MSUs within an MSU_Pair is selected. Address interleaving should only be enabled when both MSUs are present in MSU_Pair0. = 0 Interleave between MSUs of pair0 (MSU#0 and MSU#1) = 1 Stack the MSUs of pair0 |
| PAIR0_SMALLEST_MSU_SZ | This register[1] holds one of two memory size[2] values depending on whether address interleaving within this MSU_Pair is enabled. = the smaller of the two memory size values between MSU#0 and MSU#1 of MSU_Pair0. else (PAIR0_MODE0 = 1:stacking) = the memory size of the MSU selected by the PAIR0_SEL register |
| PAIR0_SEL | This 1 bid register specifies one of the two MSUs within a MSU_Pair is to be addressed first. The value depending on whether address interleaving is being performed. For interleaving, the MSU with the largest installed memory must be selected. For stacking, either MSU can be selected. if PAIR0_MODE = 0 (interleaving) then = |

TABLE G-continued

| Name | Definition |
|---|---|
| | 0 if MSU#0 of pair0 has more storage then MSU#1 of pair0 = |
| | 1 if MSU#1 of pair0 has more storage then MSU#0 of pair0 |
| | else PAIR0_MODE = 1 (stacking) = |
| | MSU of pair0 which gets the memory "address 0" |
| | (0 - MSU#0; 1 - MSU#1) |
| MSU_Pair1 Configuration Registers: used to control access to a specific MSU within pair1 | |
| PAIR1_MODE | This 1 bit register controls whether address interleaving between MSUs within an MSU_Pair is selected. Address interleaving should only be enabled when both MSUs are present in MSU_Pair1. When = |
| | 0 Interleave between MSUs of paif1 (MSU#2 and MSU#3) = |
| | 1 then Stack the MSUs of pair1 |
| PAIR1_SMALLEST_MSU_SZ | This register[1] holds one of two memory size values[2] depending on Dobbins et. al. |
| | whether address interleaving within this MSU_Pair is enabled. |
| | if PAIR1_MODE = 0 (interleaving) then = |
| | the smaller of the two memory size values between MSU#2 and MSU#3 of MSU_Pair1. |
| | else PAIR1_MODE = 1 (stacking) = |
| | the memory size of the MSU selected by the PAIR1_SEL register |
| PAIR1_SEL | This 1 bit register specifies one of the two MSUs within a MSU_Pair is to be addressed first. The value depending on whether address interleaving is being performed. For interleaving, the MSU with the largest installed memory must be selected. For stacking, either MSU can be selected. |
| | if PAIR1_MODE = 0 (interleaving) then = |
| | 0 if MSU#2 of pair1 has more storage then MSU#3 of pair1 = |
| | 1 if MSU#3 of pair1 has more storage then MSU#2 of pair1 |
| | else PAIR1_MODE = 1 (stacking) = |
| | MSU of pair1 which gets the memory "address 0" |
| | (0 - MSU#2; 1 - MSU#3) |

[1]Note: The size of this register is not specified in this table. It is implementation specific, and is not necessary for the understanding of the translation algorithm.
[2]Note: The memory size is equal to the maximum memory address + 1. For example, a single 128MB bank has an address range from $000\_0000_H$–$700\_0000_H$, but the size is $800\_0000_H$. Expanding this size to 36 bits [35:0] yields $0\_800\_0000_H$. Using the 9 most significant bits [35:27] for the size, the size register for this example is loaded with $000000001_B$ or $001_H$.

As mentioned, logic and registers to implement the forward address translation function reside in both the TCMs 285 (for memory requests from an I/O processor via a respective DIB) and the TCTs 270 (for memory requests from a processor 240). The algorithm is performed in two steps. The first step determines which MSU_PAIR should be selected and the second step determines which MSU of the selected pair should be selected to send the address to. Illustrated Appendix A is simplified pseudo-code of the forward address translation algorithm. The pseudo-code does not include checks verifying criteria such as the number of MSU_PAIRS, or the number of MSUs per MSU_PAIR, etc. These checks, which should be readily apparent to one skilled in the art, were intentionally left out of the pseudo-code allowing for easier understanding of the translation process.

The forward address translation algorithm takes as an input TEMP_ADDR and uses registers PAIR_MODE, SMALLEST_PAIR_SZ and PAIR_SEL. The algorithm produces as an output TEMP_ADDR, which is the address after any required adjustments, and RCVING_PAIR, which indicates which MSU_PAIR has been selected. Initially, TEMP_ADDR [29:0] is the address after any address relocation has been performed. TEMP_ADDR [29:0] equals ADDR_IN [35:6]. TOP_OF_INTRLV_RANGE is the address value where there is no more memory left for interleaving. That is, this is the address where stacking of memory addresses begins. TOP_OF_INTRLV_RANGE equals two times SMALLEST_PAIR_SZ.

Figure 9:
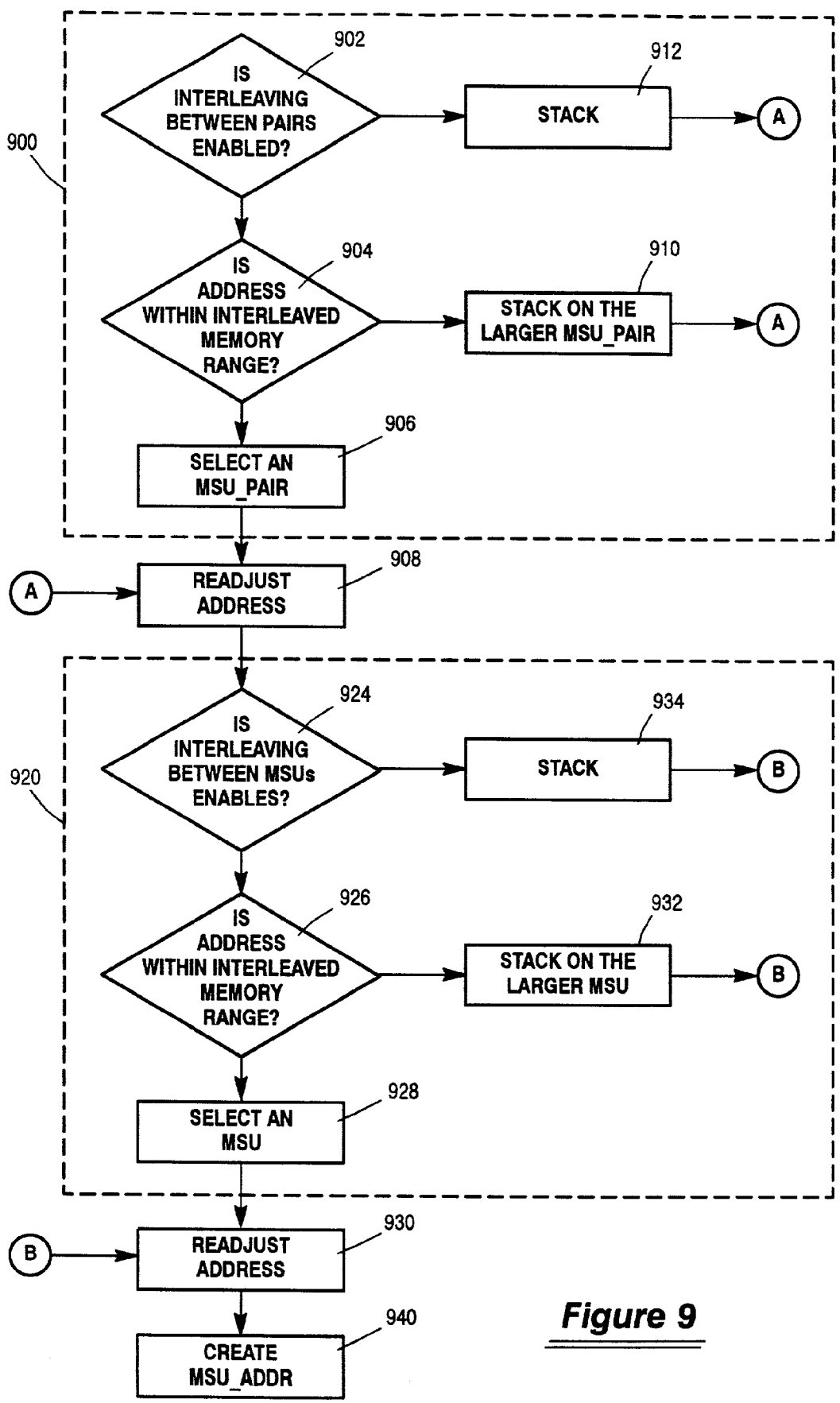
FIG. 9 is a flowchart illustrating a forward translation algorithm.

FIG. 9 illustrates a flowchart of the forward address translation algorithm. The selection of an MSU_Pair is shown in stage 900. Step 902 determines whether interleaving between pairs is enabled. If so, the algorithm first checks whether the address is within the interleaved memory range, as shown in step 904. If the cache line address is above the interleave range, then the present embodiment stacks on the larger MSU_PAIR, as shown in step 910. Otherwise, flow continues to step 906 where it is determined which MSU_PAIR should be selected between the plurality of MSU_PAIRs. In a preferred embodiment, the low order cache line address bit, TEMP_ADDR [0] is used to select the MSU_PAIR.

If interleaving between pairs is not enabled, then the present embodiment stacks cache line addresses. In a preferred embodiment, the present embodiment begins stacking the cache line addresses into MSU_PAIR0. Once MSU_PAIR0 (i.e., MSU_Pair 222) is full, then stacking proceeds to MSU_PAIR1 (i.e., MSU_Pair 224). Stacking continues until the highest MSU_PAIR is full. This is shown generally at step 912.

Flow then continues to step 908 (from either block 906, 910 and 912) where the cache line address is readjusted. The adjustment depends upon whether the interleaving or stacking is chosen. In the case of interleaving, the cache line address (TEMP_ADDR) is readjusted by shifting the address to the right by one location and zero-filling the most significant address bit. In the case of stacking, the cache line address either remains the same or is set equal to TEMP_ADDR-SMALLEST_PAIR_SZ, as evident by a review of the pseudo-code.

Once an MSU_PAIR is selected for stacking, the present embodiment proceeds to stage 920. This stage of the algorithm has an input TEMP_ADDR, which may have been adjusted by step 908. Stage 920 uses the following registers: PAIR0_MODE, PAIR0_SMALLEST_MSU_SZ, PAIR0_SEL. The outputs from stage 920 are TEMP_ADDR, which is the cache line address after any required adjustments, and RCVING_MSU, which indicates which MSU will receive the cache line address. At initialization, PAIR0_TOP_OF_INTLV_RANGE is the address value where no more memory is left for interleaving between MSUs of MSU_PAIR0. PAIR1_TOP_OF_INTLV_RANGE is the address value where no more memory is left for interleaving between MSUs of MSU_PAIR1.

If Stage 900 selected MSU_Pair0, then stage 920 determines whether RCVING_PAIR equals MSU0 or MSU1. Similarly, if stage 900 selected MSU Pair1, then stage 920 determines whether RCVING_PAIR equals MSU2 or MSU3. For the sake of brevity, only a selection between MSU0 and MSU1 will be described.

Step 924 determines whether interleaving between the multiple MSUs of an MSU_PAIR is enabled. If interleaving is enabled, the algorithm first checks whether the cache line address is within the interleaved memory range, as shown in step 926. If the cache line address is within the interleaved memory range, the low order cache line address bit is used to select the appropriate MSU, as shown in step 928. Next, the cache line address is readjusted by shifting the cache line address bits to the right by one location and zero-filling the most significant address bit, as shown in step 930.

If, on the other hand, the cache line address is above the interleave memory range, then the algorithm stacks onto the larger MSU, as shown in step 932. Flow then proceeds to the step 930 where the address is adjusted for stacking by setting TEMP_ADDR to TEMP_ADDR—PAIR0_SMALLEST_MSU_SZ.

If interleaving between MSUs of the MSU_PAIR0 is not enabled, the present embodiment stacks MSU0 first and then stacks the remainder into MSU1, as shown in step 934. Once again, the address is adjusted in step 930 based on whether the low or high MSU is used first. When the low MSU is used first, TEMP_ADDR remains unchanged. When the high MSU is used first, TEMP_ADDR is set to TEMP_ADDR—PAIR0_SMALLEST_MSU_SZ.

As stated above, a similar procedure is followed for selecting between MSU2 and MSU3 in MSU_PAIR1.

Finally, as shown in step 940, MSU_ADDR [29:0] is assigned to the adjusted TEMP_ADDR [29:0] and the RCVING_PAIR is concatenated with the RCVING_MSU indicators to form MSU_SEL [1:0]. This completes the forward address translation algorithm.

Shown in Appendix B is pseudo-code for the reversed translation algorithm. The reverse address translation function resides only in the MSU controller (not shown).

Figure 6:
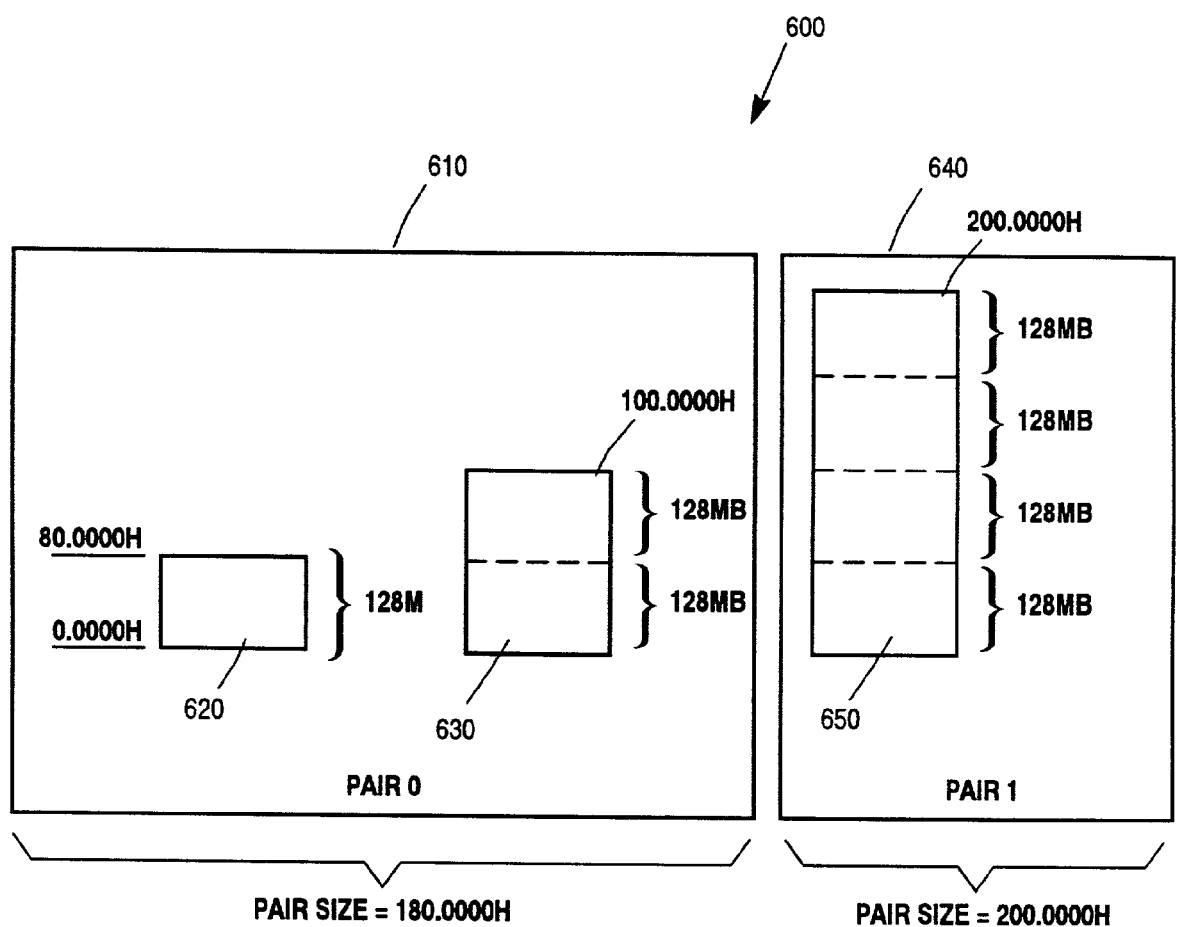
FIG. 6 illustrates another example memory configuration.

Reference to FIG. 6 will be made to demonstrate an example of the forward address translation algorithm. FIG. 6 illustrates a main memory 600 having two MSU_PAIRs 610, 640. MSU_Pair 610 has two MSUs 620, 630, whereas MSU_Pair640 has a single MSU 650. MSU 620 has one 128 megabyte memory bank 1020, MSU 630 has two 128 megabyte banks 1030 (or 256 megabytes of memory space), and MSU 650 has four 128 megabyte banks 1040 (or 512 megabytes of memory space). The top of MSU 620 is $80.0000_H$. This means that $80.0000_H$ is the address location where there is no more memory left for interleaving. The top of MSU 630 is $100.0000_H$. Thus, MSU_Pair 610 has a pair size of $180.0000_H$. The top of MSU 650 is $200.0000_H$. Thus, MSU_Pair 610 has a pair size of $200.00000_H$. Note that MSU_Pair 640 is treated conceptually as a pair of MSUs even though it includes only a single MSU 650.

Suppose there are four cache line addresses $0.0000.0000_H$, $0.0000.0040_H$, $0.0000.0080_H$, and $0.0000.00C0_H$, respectively representing four memory references from four operating systems following any address relocation performed. For this example, main memory is configured as shown in FIG. 6. Note that this is not the most efficient memory configuration for this number of memory banks.

The register setup for this example is as follows: PAIR_MODE quals 0 (Interleave), PAIR0_MODE equals 0 (Interleave), PAIR1_MODE equals 1 (Stack), SMALLEST_PAIR_SZ equals $003_H$, PAIR0_SMALLEST_MSU_SZ equals $001_H$, PAIR1_SMALLEST_MSU_SZ equals $004_H$, PAIR_SEL equals 1, PAIR0_SEL equals 1, PAIR_SEL equals 0. The above setup represents the IIS option of translation.

Using these register settings and presenting the first address to the algorithm yields the following results:

```
Initialization for both phases:
    PROCESSOR_ADDR[35:0] =        000000000_H
        TEMP_ADDR[29:0] =         00000000_H
    TOP_OF_INTRLV_RANGE =         003_H
    PAIR0_TOP_OF_INTLV_RANGE =    002_H
    PAIR1_TOP_OF_INTLV_RANGE =    004_H
the MSU_Pair selection phase:
    In
        TEMP_ADDR[29:0] =         00000000_H
    Results:
        RCVING_MSU =              0 (MSU_PAIR0)
        TEMP_ADDR[29:0] =         00000000_H
the MSU# selection phase:
    In
        TEMP_ADDR[29:0] =         00000000_H
    Results:
        RCVING_MSU =              0 (MSU#0)
        TEMP_ADDR[29:0] =         00000000_H
the final results:
        MSU_ADDR[29:0] =          000000000_H
        MSU_SEL[1:0] =            00 (MSU#0 of
                                  MSU_PAIR0)
Processing the second address
    Initialization:
        PROCESSOR_ADDR[35:        000000040_H
            0] =
        TEMP_ADDR[29:0] =         00000001_H
        RCVING_PAIR =             1 (MSU_PAIR1)
        TEMP_ADDR[29:0] =         00000000_H
        RCVING_MSU =              0 (MSU#2)
        TEMP_ADDR[29:0] =         00000000_H
    the final results:
        MSU_ADDR[29:0] =          00000000_H
        MSU_SEL[1:0] =            10 (MSU#2 OF
                                  MSU_PAIR1)
The third address yields:
    Initialization:
        PROCESSOR_ADDR[35:        000000080_H
            0] =
        TEMP_ADDR[29:0] =         00000002_H
        RVCING_PAIR =             1 (MSU_PAIR1)
        TEMP_ADDR[29:0] =         00000001_H
        RCVING_MSU =              0 (MSU#2)
        TEMP_ADDR[29:0] =         00000000_H
    Final results:
        MSU_ADDR[29:0] =          00000000_H
        MSU_SEL[1:0] =            01(MSU#1 OF
                                  MSU_PAIR0)
While the fourth address yields the final results:
    Initialization:
```

-continued

| | |
|---|---|
| PROCESSOR_ADDR[35:0] = | 0000000C0$_H$ |
| TEMP_ADDR[29:0] = | 00000003$_H$ |
| RVCING_PAIR = | 1 (MSU_PAIR1) |
| TEMP_ADDR[29:0] = | 00000001$_H$ |
| RCVING_MSU = | 0 (MSU#2) |
| TEMP_ADDR[29:0] = | 00000000$_H$ |
| Final results: | |
| MSU_ADDR[29:0] = | 00000000$_H$ |
| MSU_SEL[1:0] = | 01(MSU#2 OF MSU_PAIR1) |

Figure 7:
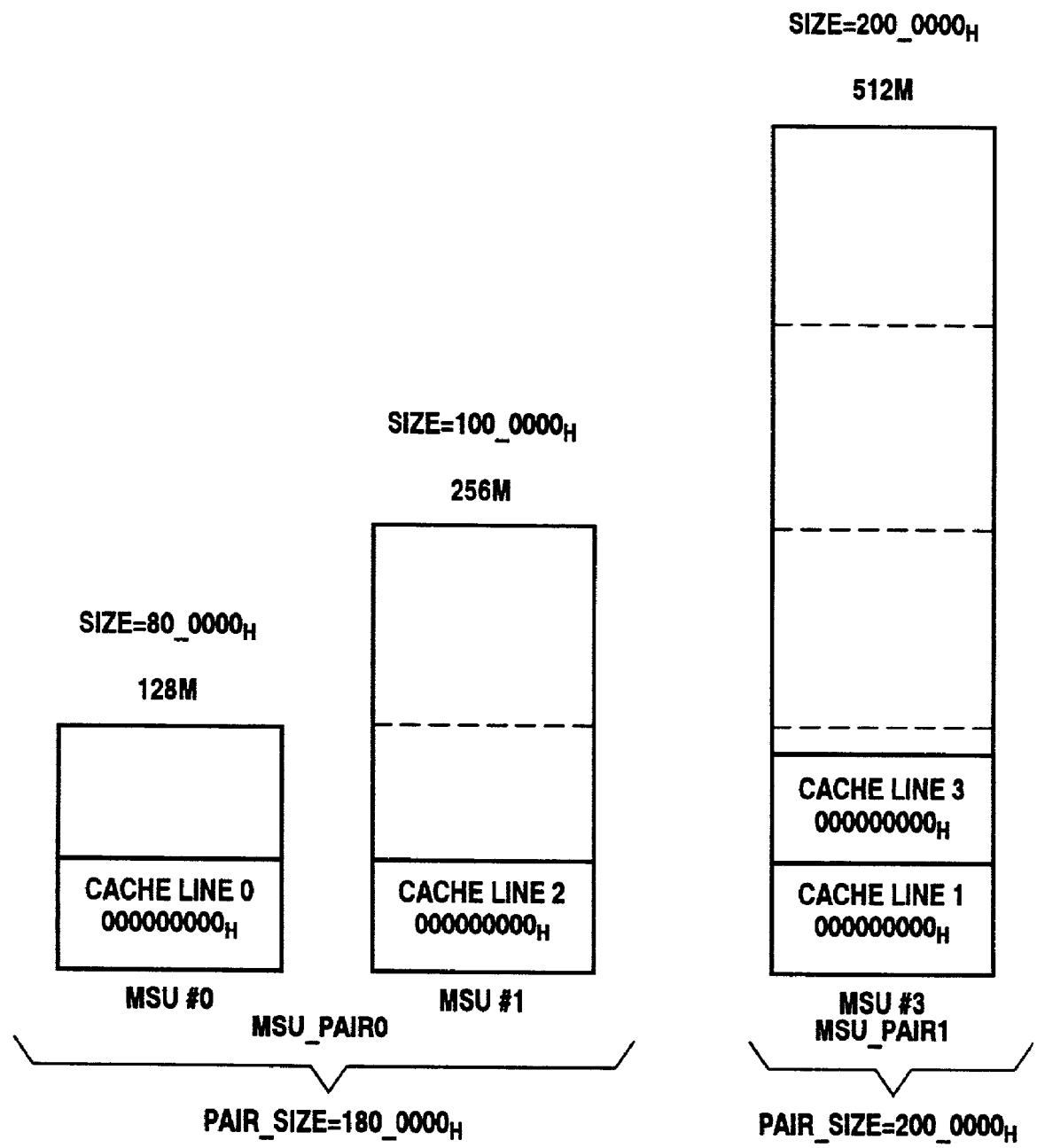
FIG. 7 further illustrates the operation of the computer system of FIG. 2 with respect to the memory configuration shown in FIG. 6.

FIG. 7 shows the result of this example.

It should be understood that embodiments can be implemented in hardware, software or a combination thereof In such embodiments, the various components and steps may be implemented in hardware and/or software to perform the functions of the present embodiment. Any presently available or future developed computer software language and/or hardware components can be employed in such embodiments. In particular, the pseudo-code discussed and provided above and in the appendixes below can be especially useful for creating the software embodiments.

C. Initialization at Boot Time

In an exemplary embodiment, partitioning of the computer system 200, including the processing modules and the memory 160, is performed at boot time. Exemplary processes for partitioning, mapping memory and setting up interleaving, are described below. These initialization operations can be performed by a Basic Input/Output System (BIOS) and a Management Interface Processor (MIP) at boot time via an MIP high-speed scan interface. The MIP is a hardware interface portion of a management application platform (MAP) for performing initialization and error recovery for the computer system 200. In an exemplary embodiment, the MIP high-speed scan interface complies with IEEE TAP Linker Specification 1149.1.

As used herein, the term "partition" is sometimes used in place of window. As used herein, these two terms are synonymous, and indicate a part of the system that is controlled by one instance of an operating system.

The manner in which the partitioning will be accomplished at boot time can be predetermined by a system administrator and entered into a database that resides on MAP. Partitioning information identifies system resources which are to be allocated to a particular window, which type of operating system will be loaded within the window, and whether and how two partitions will communicate via shared memory. In the exemplary embodiment of FIG. 2, partitioning preferably occurs on sub-Pod and direct I/O bridge (DIB) boundaries.

Generally each operating system has certain hardware requirements. For example, off-the-shelf, open architecture operating systems, such as Windows NT and Unixware (available from The Santa Cruz Operation, Inc.), require a disk controller (SCSI fiber channel, etc), VGA controller, compatibility PCI board, and compatibility peripherals (CD-ROM, tape, and disk). The appropriate hardware should be resident on the system, and the system should be partitioned in a manner that ensures these requirements are met. This should be taken into account when entering the partitioning information into the database on the MAP.

Figure 13:
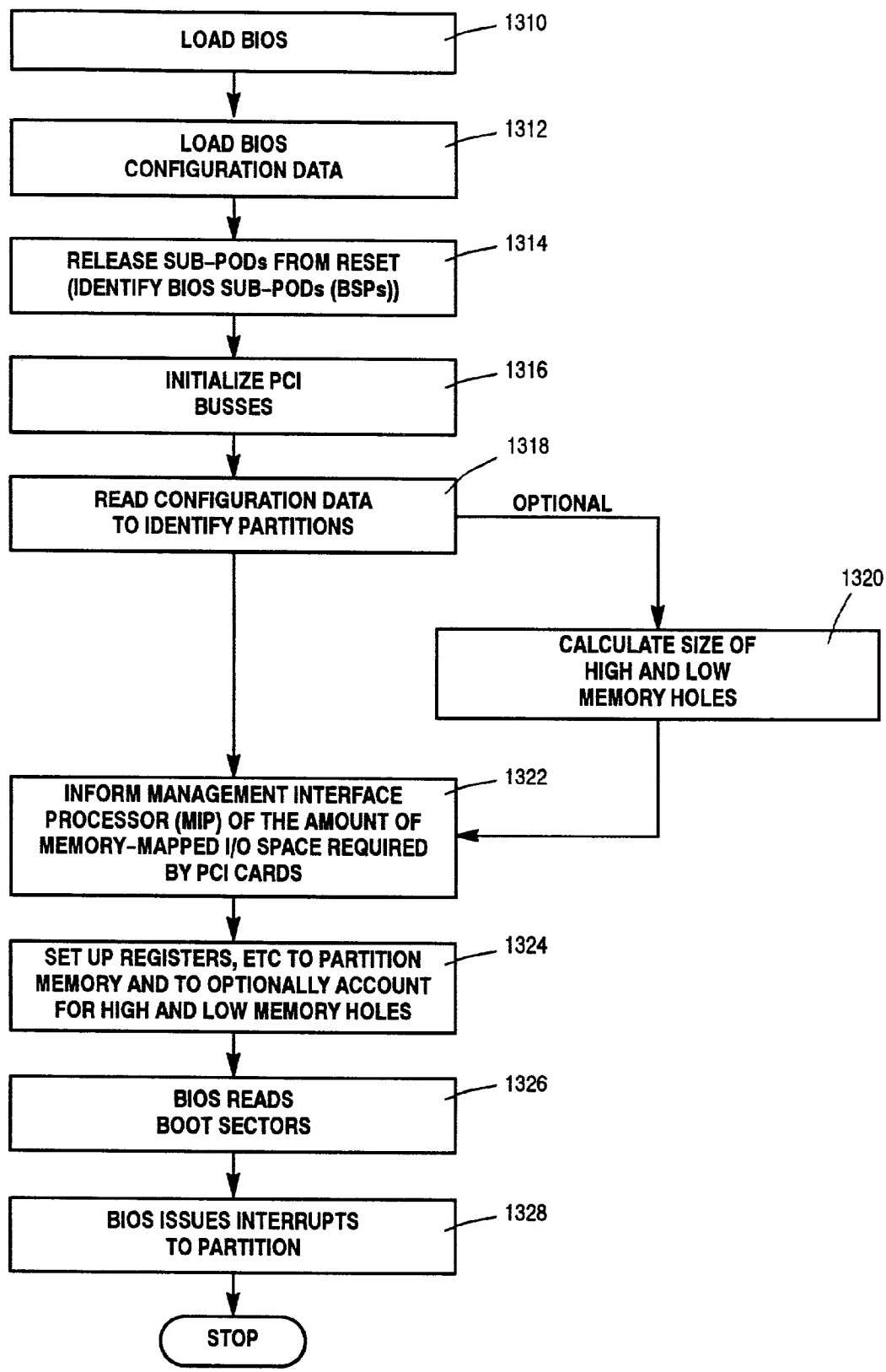
FIG. 13 illustrates a process flowchart for an exemplary initialization process of the computer system of FIG. 2.

Referring to FIG. 13, a process flowchart is provided to illustrate an exemplary initialization process:

Processing begins at step 1310, where the MIP loads the BIOS into main memory.

In step 1312, the MIP loads the BIOS configuration data area in main memory. This information partially reflects what was stored in the configuration database.

In step 1314, the MIP releases each sub-Pod from reset one at a time. Preferably, the sub-Pods arbitrate and one sub-Pod becomes the BIOS sub-Pod (BSP). Within the BSP, one processor becomes the master, and this processor executes the BIOS code. Throughout the remainder of this specification, the processor that runs the BIOS can be referred to as the BSP. The BSP performs a number of functions, as described below.

In step 1316, the BSP initializes each PCI Bus. The BSP gains access to each PCI Bus in the system through a path that extends from the Crossbar Interconnect in the BSP's sub-Pod, to the MSU, through another Crossbar Interconnect on another sub-Pod, and finally through an interface to the DIBs. The BSP can access the DIBs associated with its own sub-Pod without accessing the MSU.

In step 1318, the BSP reads configuration data, which was loaded into main memory in step 1312, above, to determine which DIBs are in which partition. The BSP writes a Partition ID (PID) to a "DIBs in the Partition Register" in each Compatibility DIB by using the path described above. The PID is used when a message is received by a DIB during normal system operations. The message is only processed if the DIB has the same PID as the message. The PID allows all units in a partition running under the same operating system to talk to one another, and is also used to send messages through shared memory.

In optional step 1320, the BSP calculates the size of the high memory hole and low memory hole by reading PCI registers in each of the PCI cards to determine I/O and memory requirements for each PCI cards. Overlaying I/O space with main memory is required by the Intel Multi-Processor Specification, and by the fact that some off-the-shelf PCI cards can not recognize addresses above 64 gigabytes.

In step 1322, the BIOS informs the MIP of the amount of memory-mapped I/O space that is required by each PCI card. This is done via a BIOS-to-MIP interrupt and associated mailbox. The MIP already is aware of the size of main memory, and the amount of memory that is to be shared between operating systems, because this information is included in the configuration database associated with the MIP. Therefore, after the MIP is informed as to the amount of I/O space required, the MIP can calculate the following information using Tcl scripts:

a. Location of the high and low memory holes
b. Location of reclamation area
c. Location of shared memory Tcl is an industry-standard simulation language that is used by the hardware designers to write simulation scripts. The simulation scripts are also ported to the MIP to accomplish hardware initialization.

In step 1324, the MIP uses the memory addresses calculated above along with data located in the configuration database to set up registers in the sub-Pods (TCT), crossbar interconnect (TCM), and memory storage unit (MSU). Initialization of the TCM sets up the partitioning and address translation for the DIBs and memory address translation registers for the DIB. These constants can be used for interleave functions and memory reclamation.

In an exemplary embodiment, there are at least two sets of registers in each TCM, one for each DIB. These include range registers and broadcast registers.

Range registers for the DIB contain the legal memory range for each DIB, according to the partition definition. Interfaces within the TCM are enabled/disabled according to partition definitions.

A TCT Info Register is initialized with, among other things, the Partition ID, which identifies the partition. This is used to determine if a particular sub-Pod should operate on messages. Messages having the same Partition ID as in this register will be received.

Broadcast registers contain the Partition ID, and are used for broadcast messages throughout a partition. A broadcast message is tagged with the Partition ID as identified in this register.

Agent tables are loaded with the Partition ID, and are used to validate interrupts to the processors of a particular window.

In the DIB, range registers for the PCI Cards contain address ranges for memory-mapped spaces for each PCI bus. A Partition ID register contains the Partition ID so that only messages for that DIB are received.

In the MSU, MSU_PairA/PairB configuration registers set up interleave between banks of MSU. The MIP initializes the Memory Address Translation Registers (see Tables E and F above) to set up interleave operations. These interleave operations are specified by the user prior to initialization.

The MIP uses the length of the memory-mapped I/O space as received from the BIOS to calculate the locations of the memory-mapped I/O space, the shared memory start address, the reclamation start address, and new top of memory. The MIP communicates these start addresses back to the BIOS using the MIP-to-BIOS interrupt and associated mailbox in main memory. The MIP further uses this information in conjunction with user-specified configuration data to initialize the Configuration Register (Table A, above), and the Translation and Reclamation Register (Table D, above). The initialization data stored in these registers and the Memory Address Translation Registers (Tables E and F, above) is required by the address translation logic to perform the windowing, reclamation, and address translation functions. As discussed above, copies of these registers and the associated logic are located in each of the TCTs 270 (for memory requests from a processor 240), and are also located in each of the TCMs 285 (for memory requests from an I/O processor via a DIB). The MIP further initializes range registers for the processors with valid address ranges for the memory-mapped space for each DIB, I/O port, APIC memory-mapped space, and memory address space.

The BIOS uses this information to set up a configuration table in memory for each partition/operating system. This information communicates the location of shared memory to each partition. The configuration table could be of any user-defined format. In an exemplary embodiment, an MP Configuration Table, as defined in a MultiProcessor Specification available from the Intel Corporation, is used. The field called "OEM Table Pointer" within the MP Configuration Table is used to point to a user-defined area that will include the location and length of the shared memory area. Unixware and NT drivers use this information for memory allocation purposes, and to determined queue locations.

The BIOS further sets up registers in selected ones of the processors. The BIOS sets up these registers because the MIP does not have access to them. In an exemplary embodiment, this is just done for Intel processors, and involves writing registers within each of the processors to indicate, for example, a top of memory register (TOMR) in each processor that communicates to an operating systems where the top of memory is. The operating system is not allowed to attempt to access memory above the TOMR value.

Registers can also include memory type range registers (MTRR) that communicate to processors which type of memory exists within the various memory ranges (e.g., mapped I/O, APIC interrupt space, main memory, etc.). MTRRs are used to tell processors how to handle memory accesses. For example, processor read operations to a memory range that is designated as memory-mapped I/O space are not cached in the processor's cache. Processors running an instance of operating system should have the same value loaded into their respective MTRR.

In step 1326, after performing any additional initialization functions, the BIOS reads the boot sector for each operating system into the appropriate location in memory as determined by information in the configuration database.

In step 1328, the BIOS issues an interrupt to one of the processors in each partition, and those processors begin loading the associated operating system from a designated I/O device. When this is completed, the operating system assumes control of the resources in its window. This completes the BIOS to operating system transition and processing.

III. Methods for Managing the Global Shared Memory (Inter-Partition Communications)

The global shared memory approach described above can provide a private memory space for each partition, plus a shared memory area that all of partitions can access. The shared memory area can include one or more read-only areas. Partitions, including their operating systems and other clients running on the partitions, can communicate with one another through the shared memory.

The shared memory area can be managed by, for example, a portion of the operating system running on a partition, or by other software and/or hardware that may reside on a partition. The shared memory area can be managed by different operating systems, including, but not limited to, Windows NT, commercially available from Microsoft Corp., UNIXWARE, commercially available from The Santa Cruz Operation, Inc. (SCO), Master Control Program (MCP), which is an operating system adapted for UNISYS Clearpath HMP NX computer systems, which supercede the A-Series family of computer systems, both of which are commercially available from Unisys Corp., or OS 2200, which is an operating system adapted for UNISYS Clearpath HMP IX computer systems.

Alternative embodiments are described below for managing a shared memory area. The embodiments are described herein for purposes of illustration, and not limitation. Other embodiments (including equivalents, extensions, variations, deviations, et cetera, of the embodiments described herein) will be apparent to persons skilled in the relevant art(s) based on the teachings contained herein.

A. Polling For Inter-Partition Communications

In one embodiment, each operating system executing in its own partition (e.g., one or more Pods or sub-Pods) on the computer system is associated with, or allocated, a portion of shared memory 160. Operating systems can write to, and read from, their associated portions of shared memory but cannot write to portions of memory associated with other operating systems. All operating systems can, however, read from the entire shared memory.

Preferably, each partition or operating system is assigned an exclusive memory window (sometimes hereinafter also referred to as its "local memory space") dedicated to the partition or operating system. When an operating system or an application associated with the operating system sends a message to another operating system, or to an application associated with the operating system, the sending entity builds the message in a buffer in its local memory space in the same manner as would occur if the message were being built to be transferred via a network. The sending entity then copies part, or all, of the message, into its allocated part of shared memory 160.

The target partition/operating system, which can read from, but which cannot write to, the sending operating systems' associated portion of shared main memory 160, detects that a new message is available, and copies the message from shared main memory into its own local memory (i.e., its exclusive memory window).

In an exemplary embodiment, code and most data structures for an operating system reside in the local memory space for the operating system. Certain new data structures preferably reside within the shared memory 160.

In an exemplary embodiment, two types of data structures are used to facilitate communication between partitions or operating systems. The first type includes message storage structures that store the message data, and which are built in output message buffers. The second type includes queue structures that are stored within a message queue area and which contain pointers to message data stored in an associated output message buffer. Preferably, these two types of data structures are stored in shared main memory 160 while other code and data constructs utilized by the various operating systems and associated application programs reside in associated local memory spaces. This protects system integrity.

Figure 14:
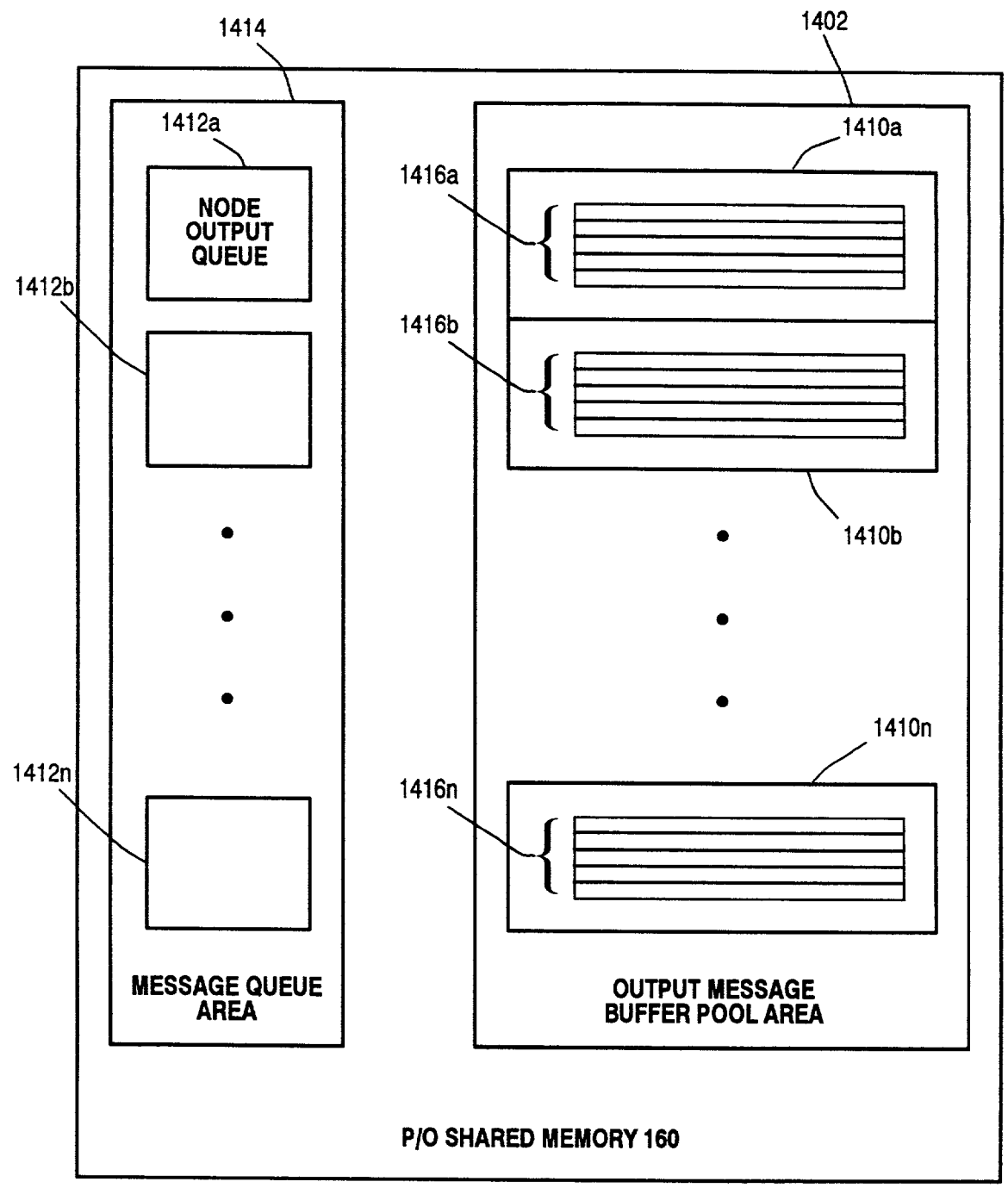
FIG. 14 illustrates data structures that can be used for sharing memory, in accordance with a first embodiment of a shared memory management method of the present invention.

FIG. 14 illustrates a portion of shared memory 160, including an output message buffer pool area 1402 and a message queue area 1414. Generally, an output message buffer pool area 1402 is associated with each partition. Buffers 1410 are allocated for a message and pointed to by a queue entity, or multiple queue entities, when a message is broadcast Generally, all partitions have read access to all output message buffer pool areas 1402. But each partition has write access only to buffers 1410 in its associated output message buffer pool area 1402.

Message queue area 1414 is divided into n node output queues 1412, each of which is dedicated to a different partition. Although all partitions have read access to the entire message queue area 1414, a partition can only modify its associated node output queue 1412. This access control, which can be enforced within hardware, renders hardware locks unnecessary, thereby simplifying recovery and checkout operations.

Figure 15:
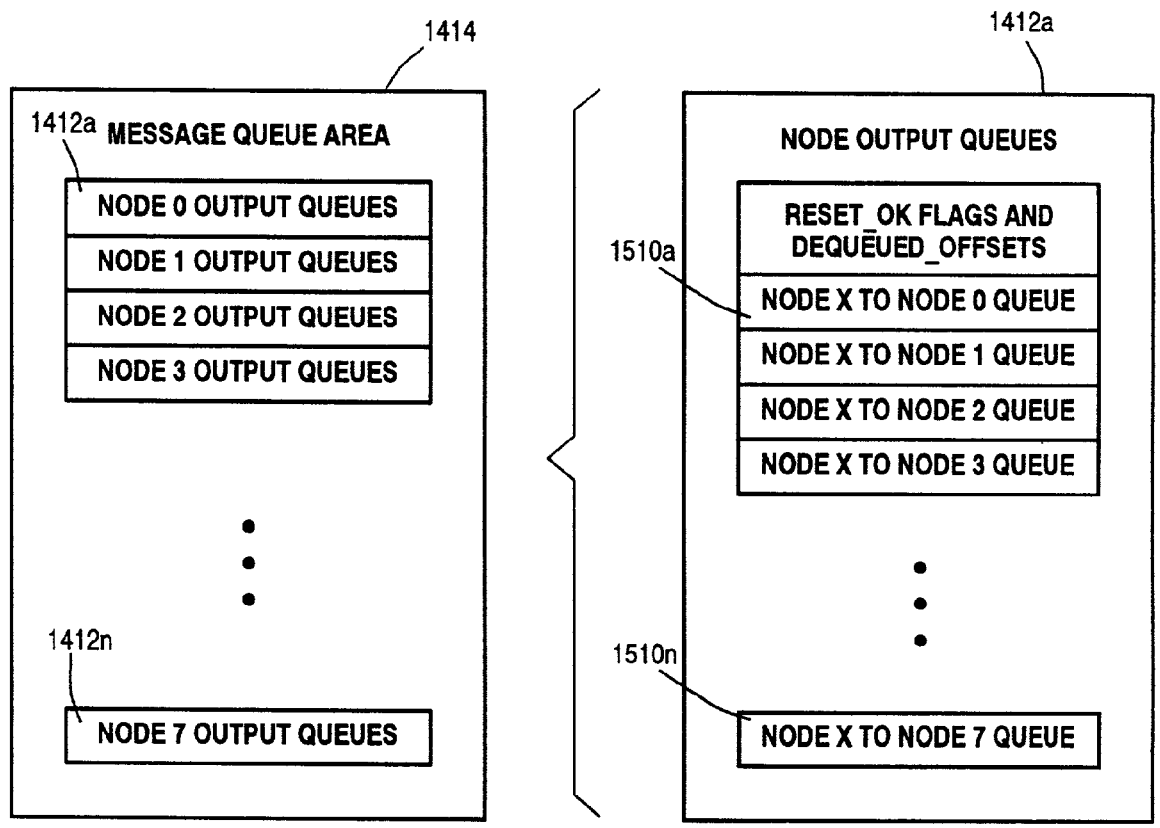
FIG. 15 illustrates an exemplary embodiment of a message queue area, in accordance with the first embodiment.

FIG. 15A illustrates an exemplary embodiment of message queue area 1414 is illustrated with eight node output queues 1412. Node output queue 1412*a* is illustrated including a node-to-node queue 1510 for each partition. As used herein, the term "node" is equivalent to the term "partition."

FIGS. 16A and 16B illustrate exemplary information contained in a node output queue 1412. The first sixteen words of an exemplary node output queue 1412 includes control information for the associated node including node operating system type (Node_OS_ID) 1610, node media access control (MAC) address 1612, and various reset flags (e.g., Reset_OK) used during recovery, as is discussed below.

The control information further includes eight Dequeued_offset fields, each of which stores an offset into a respective different node's node output queue, and indicates which is the next message to receive from that respective different node, as will be explained below.

In the exemplary embodiment of FIGS. 16A and 16B, node-to-node queues 1510 follow the first sixteen words of control information. Each node-to-node queue 1510 is used by the associated operating system to send messages to the named different node. For example, node 0 to node 1 queue 1510*a* is used by node 0 to send messages to node 1. For simplicity, a node-to-node queue 1510 can be provided for each node to send a message to itself.

In FIGS. 16A and 16B, the first word in each node-to-node queues 1510 includes control information including a "Need_Reset" flag and an "Enqueue_offset". The Need_Reset is used in conjunction with a selected one of the Reset_OK flags when a sending node wants to reset one of the node-to-node queues. The "Enqueue_offset" contains a number between 1 and 511, for example, and is used to point to the next available entry in the respective node-to-node queue 1510. The use of this field is explained further below. Each of the remaining words (e.g., 511 words) of the node-to-node queue 1510 includes an offset pointer that points to an associated message data structure 1416 in an associated output message buffer 1410

In a preferred embodiment, the offset is the number of 64-bit words from the start of the respective node's output message buffer 1410. The pointer should be an offset from some base address, not a real or virtual address. The pointer should not be based on a virtual address because, when the nodes are heterogeneous nodes, they may not have a common virtual address translation. The pointer should not be based on a real address because, as a result of the address translation scheme described above, real addresses used by one node generally do not coincide with real address used by another node.

In an exemplary embodiment, pointers are offsets from an address that each node or operating system can calculate from information received from the Management Application Platform (MAP), described above, during node initialization.

Each of the eight node-to-node queues 1510 within a node output queue 1412 can be, for example, 512 words long, as illustrated in FIGS. 16A and 16B, so that each node output queue 1412 is 16+8(512) words long.

This queue depth helps to ensure that an associated queue will not be full when a message is available to be transferred to shared memory. The queue depth may be specified by the manager application platform (MAP) during initialization. As mentioned above, the MAP is a support system for performing initialization and error recovery on the computer system 200.

To add flexibility, the MAP can be designed to indicate the queue capacity at initialization time. This data may be added as an entry into each of the configuration tables, which are data structures provided by MAP for each operating system instance in the system to inform the respective operating system of necessary system parameters such as the location of shared main memory.

FIG. 17 illustrates an exemplary embodiment of a message data structure 1416. Each message data structure 1416 is preferably located at an offset of 0 within an associated output message buffer 1410 and includes a header area 1710 and a message data area 1712. The header area 1710 is illustrated as occupying words 0-n, and includes the buffer length, header length, and count information. The count information is preferably included for writing messages by a 2200 operating system (i.e., an operating system adapted for a 2200 style processor commercially available from Unisys Corporation) because messages written to memory by the 2200 operating system will not occupy contiguous memory locations. When nodes running the 2200 operating system record message data in shared memory, each 64-bit main memory word will store, at most, 32 bits of data which will be located in the least significant bits of each 64-bit main memory word. Some words may store fewer bits if messages do not start or end on a word boundary. Therefore, the first Byte Skip Count indicates the number of bytes that should be skipped between a protocol header and the message data. The Byte Transfer Count indicates the byte length of an associated valid message field. The sum of the Byte Skip Counts and Byte Transfer Counts should be less than or equal to (length of the buffer–length of the header)*4.

In an Ethernet environment, the maximum message segment size is 1500 bytes or 375 64-bit words for the message. In an embodiment, a network input/output processing architecture (NIOP), which is a message handler developed by Unisys Corporation, as described in U.S. Pat. No. 5,659,794, assigned to Unisys, allows for 50 separate data streams to be combined into one message segment to be sent over a network. Therefore, an output message buffer size of 427 words would allow a 2200 operating system to continue to perform in the shared memory environment as it does for an Ethernet LAN environment. Given a queue depth of 511 and a buffer size of 427 words, a node buffer pool size of (511*427*8)//4096=1,748,992 words. The total shared memory needed per shared memory environment is then (65,536+1,748,992*8)//4096=14,057,472 words.

The use of these data structures can be explained by example. Assume that a first operating system OS1 wants to send a message to a second operating system OS2. Further assuming that the OS1 to OS2 node output queue 1412 is not full, OS1 obtains an available message data structure (i.e., buffer) 1416$a$ within the OS1 output message buffer area 1410$a$. The buffer 1410$a$ is preferably identified by an address offset pointer as discussed above. OS1 builds a protocol header 1710 for the message, transfers the header 1710 and message 1712 from the local main storage of OS2 into this available message buffer 1416$a$. OS1 then increments the contents of an Enqueued_offset within the OS1 to OS2 queue 1510$a$ to point to the next available entry in the OS1 to OS2 queue 1510$a$. OS1 copies the offset pointer which points to the message data structure (i.e., buffer) 1416$a$ into this next available entry. In a preferred embodiment, the Enqueued_offset maintained as a circular queue.

OS2 polls to determine if a message is available from OS1. This is done by comparing the contents of an appropriate Dequeued_offset for OS2, stored in the control area of OS2's node output queue 1412$a$, to the appropriate Enqueued_offset stored in the OS1 to OS2 output queue of OS1's node output queue 1412$b$. In a preferred embodiment, the Dequeued_offset is maintained as a circular queue.

Each of the eight Dequeued_offsets (in the exemplary embodiment) stores a value between 1 and 511 which points to an entry within a corresponding sending one of the node's node output queues 1412. For example, the Dequeued_offset stored within word 8 of OS2's output queue stores an offset value which points into the "Node 0 to Node 1 Queue" within OS1's node output queue 1412$a$. Similarly, the Dequeued_offset stored within word 15 of OS2's node output queue 1412 stores an offset value which points into the "Node 7 to Node 1 Queue". As noted above, the data structures include a node output queue 1412 and associated Dequeued_offset which allows each node or operating system to send a message to itself, e.g., OS1 to OS1 node output queue.

In the current example, the Dequeued_offset field within word 8 of the OS2 node output queue 1412 is compared to the Enqueued_offset field within the OS1 to OS2 queue. If the two offset entries are the same, the queue is empty. When the Enqueued_offset is different than the Dequeued_offset, one or more entries exist on the OS1 to OS2 queue.

After OS1 determines a message is available, it uses the contents of the Dequeued_offset to retrieve the message and then increments the Dequeued_offset. The message offset pointer is used to retrieve the message, which is copied into local storage.

A sending node or operating system can use a mechanism similar to the above-described polling mechanism to determine whether a queue is full prior to adding an entry to the appropriate queue. That is, the Dequeued_offset within the recipient's queue is compared to the appropriate Enqueued_offset within the sending node's output queue. If the contents of the Enqueued_offset is the same as the contents of the Dequeued_offset, the queue is full and no message may be added at that time. Enqueued_offsets and Dequeued_offsets conforms to the assumption that all operating systems may read all other operating systems' queue areas, but an operating system may only modify its own queue area.

In a virtual memory system, code and/or data structures can be transferred, or "paged", out of main memory to mass storage under the direction of an operating system to make additional room within the main memory. In an exemplary embodiment, paging out is allowed for code and/or data structures stored within a local memory area, but is not allowed for data structures residing in shared memory 160. This restriction ensures that operating systems that use shared memory space 160, can make assumptions about the location and content of the data structures stored within the shared memory space 160.

In an exemplary embodiment, 2200 operating system applications communicate with Intel-based applications (e.g., applications written for Windows NT on an Intel platform) wherein the only substantial operating system involvement is managing the shared memory (e.g., requesting initialization of the message queues). In this exemplary embodiment, the 2200 operating system does not request services or perform services for the Intel nodes. Instead, services are performed through application-to-application requests. One skilled in the relevant art(s) will recognize that the 2200 operating system could, alternatively, be altered to directly request services of the Intel node.

In an exemplary embodiment, the global shared memory mechanism allows communication to occur between 2200 operating system application programs and NT and/or Unix application programs. It can also be used to facilitate communication between applications running under the MCP operating system and applications running under a NT and/or Unix operating system, and can be used for communication between operating systems. Similarly, it can be used to facilitate communications between applications running under an associated different instance of an NT operating system and for communications between applications running under an associated different instance of a Unix operating system. The shared memory mechanism can be used to facilitate communication between 2200 and MCP operating systems.

In an exemplary embodiment, messages written to shared main memory are typically ASCII characters, but can also include positive integers such as one, two or four-byte positive integers, and bit information. 2200 operating systems, which operate on 36-bit words, represent ASCII characters as 8 bits within a 9-bit byte. Intel platforms, which use IA 32 or IA 64 architecture and operate on 32-bit or 64-bit words, respectively, represent ASCII characters as 8 bits within an 8-bit byte. Therefore, data written to, or read from, shared memory should undergo a conversion process. This conversion can be performed by 2200 operating system hardware instructions. A 2200 style processor uses a Block Transfer Pack (BTP) instruction to pack ASCII data from 9-bit to 8-bit bytes, and to zero fill the most significant 32 bits within the 64-bit words of the main memory.

Typically, applications running on Intel platforms expect that message data is included within contiguous bytes. Since the 2200 operating system Block Transfer Pack (BTP) instruction does not enter the message data in contiguous bytes within the shared main memory (four bytes within a word are usually unused), device drivers operating on Intel platforms must move the message data into contiguous bytes within local main memory before the message can be processed. Similarly, when a 2200 style processor receives a message, it uses a Block Transfer Unpack (BTU) instruction to unpack ASCII data from shared main memory and move it to associated local memory. The Block Transfer Pack and Block Transfer Unpack instructions also perform big-endian/little-endian conversion. Examples of data movement into and out of shared memory 414 for a 2200 to Intel message, an Intel to 2200 message, and an Intel to Intel message are provided below.

Preferably, the global shared memory communication mechanism is as transparent as possible to the software running on the system so that software changes are minimized and so that the system is as compatible as possible with various open-system standards. For example, the system can be made to appear from the upper layers of the software as though communication-by-wire has been maintained (see Section IV.B. below). In an exemplary embodiment, the system employs an Ethernet protocol. One skilled in the relevant art(s) will recognize that other protocols, such as an ATM protocol can be used.

For NT/UNIX nodes, a Shared Memory interface is preferably visible within a NIC device driver, which exists at the LLC/MAC level of the Open Standards Interconnection (OSI) communications model. LLC/MAC are 2 sub-layers of the OSI level 2 communications model. LLC can be an interface between layers 2 and 3. MAC is an IEEE sub-layer that deals with various LANs such as Ethernet, Token Ring, Token Bus, etc.

In 2200 operating system nodes, this visibility also occurs at the LLC/MAC level. This design choice also makes it easy to allow some partitions to communicate through shared memory while other partitions maintain communication via a wire. The two types of communication are viewed as the same from the upper layers of the software.

Since the Ethernet protocol imposes a limit of 1500 bytes per transmission, a large message may have to be divided into segments and transferred during multiple message transfer operations.

Ethernet has a 1500 byte limit on the amount of data in one transmission. Thus, where an Ethernet connection is replaced with shared memory, 1500 bytes becomes the limit on how much data can be placed in a buffer that is queued for output to another node. As with all communications protocols, any size message can be sent, but it may have to be sent in a number of separate transmissions (buffers).

A 2200 style processor can transfer message data into shared memory using the Block Transfer Pack instruction discussed above.

B. Interrupt-Driven Shared Memory Communications

An interrupt-driven shared memory management implementation is now described, as an alternate embodiment, including a description of how the shared memory area, or region, is to be accessed and managed in accordance with this alternate embodiment. In this embodiment, management of the shared memory window is performed by program code embodied in Core Services software that resides on each partition. The Core Services software on each partition provides an application programming interface (API) that a client running in that partition can call to request certain shared memory services, such as, for example, communicating with a client on another partition via the shared memory window. As used herein and in the claims, a "client" can be the operating system, a device driver, an application program, or any other software or program code executing on a partition that requires the use of the shared memory window. Also as used herein and in the claims, the term "a communication" may mean a Signal (described hereinafter), a message in the form of data (which may or may not be stored in an allocated buffer within the shared memory window), or any other form of information or data to be communicated between partitions for any purpose. Unlike in the previous embodiment, in which a polling technique is employed to determine whether a communication is to be transferred between partitions, this embodiment employs an inter-processor interrupt mechanism to communicate between partitions, as described more fully below.

As with the previous embodiment, this embodiment can be used to facilitate communications between partitions running under the control of different operating systems (e.g. Unisys MCP, Unisys OS 2200, Windows NT, Unix, etc.) or partitions running under the control of different instances of a same operating system.

1. Shared Memory Layout

Figure 19:
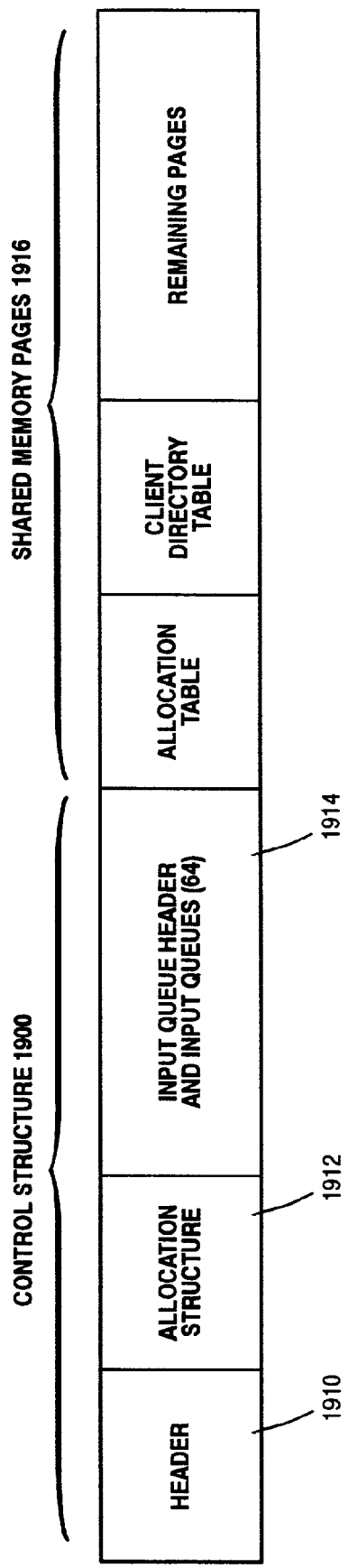
FIG. 19 illustrates the layout of a shared memory window in accordance with an alternate embodiment of a shared memory management method.

FIG. 19 illustrates the layout of the shared memory window in accordance with this alternate embodiment. As shown, a control structure 1900 resides at the base of the shared memory window, followed by the remainder of the shared memory window, 1916 which is broken into separate pages. In the present embodiment, each page comprises 4 K bytes, however, the size may be different in other embodiments. Each page can be in-use, available, or out-of-use. As described hereinafter, a client can request that a portion of the shared memory window be allocated to it, for example, to define a buffer, and the Core Services software then allocates the required number of pages to satisfy that request.

The shared memory control structure 1900 comprises a header 1910, an allocation structure 1912, and a plurality of partition input queues with an associated header 1914. Information in the control structure is private. Direct access to this information is not provided to clients of the Core Services software. Instead, the Core Services software API provides calls that return client-related information to a client via procedural parameters. In the present embodiment, words in the control structure include 64 bits, where the upper 32 bits are 0's to allow for the different size words used by different processor architectures.

2. Free Page List

In the present embodiment, in order to keep track of available shared memory pages, i.e., those that are not already in-use, the available pages are linked through pointers in the first word of each page to form a linked-list of available pages. The linked-list of available pages is referred to herein as the Free Page List. The control structure 1900 provides a pointer to the first page of the linked list (i.e., the start of the Free Page List).

3. Client Directory Table

The Core Services software allocates one or more pages of the shared memory window to store a Client Directory Table (not shown). The Client Directory Table is a registry of the clients on each partition that are using the shared memory window. More specifically, in the present embodiment, each client of the Core Services software on a given partition must register with the Core Services software as a member of a Client Group. Two clients on the same partition cannot be members of the same Client Group; if there are multiple clients of the Core Services software on a partition, each must register as a member of a different Client Group. Each Client Group has an associated name (Client Group Name) and identifier (Client Group ID). The Client Directory Table contains an entry for each Client Group that specifies the Client Group Name and lists each partition that has a client registered as a member of that group. When a client registers with the Core Services software as a member of a particular Client Group, the Core Services software returns the Client Group ID to the client. The Client Group ID is used to identify the sending and receiving clients when messages are passed via the shared memory window, as described hereinafter.

4. Shared Memory Page Types

The Core Services software may allocate one or more pages of the shared memory, either for its own use or on behalf of a client request to allocate some portion of shared memory. In the present embodiment, four different page types are defined.

a. Type 1 Memory Pages

Figure 32A:
FIG. 32A illustrates the contents of a header of a Type 1 shared memory page in accordance with the alternate embodiment.

Type 1 memory pages, in the present embodiment, can only be allocated for use by the Core Services software on a partition; there are no interfaces to allow a client to request allocation of a Type 1 page. As one example, the Client Directory Table described above is stored in one or more Type 1 pages allocated by the Core Services software. When the Core Services software allocates a Type 1 memory page, a Core Services header is created at the beginning of the page. FIG. 32A illustrates the contents of the Core Services header for Type 1 pages, in accordance with the present embodiment.

The first field (Partition Ownership Mask) is used to store an indication of which partitions have access rights to the page. Specifically, the Partition Ownership Mask contains eight bits, one for each possible partition in the computer system. Each partition that has ownership rights to the page will have its corresponding bit in the Partition Ownership Mask set. In the case of the Client Directory Table, for example, each partition that requires access to the table will have its bit of the Partition Ownership Mask set in each page containing all or part of the table.

Although in the present embodiment, there are no interfaces to allow a client to request allocation of Type 1 pages, to accommodate future embodiments in which it may be desirable to allow clients to request allocation of Type 1 pages, the Core Services header in a Type 1 page farther contains a Client Group ID field. This field would be used to contain the Client Group ID of the clients that have ownership rights to the page. In the present embodiment, however, this field is not used.

The DeallocationLock field is used to coordinate changes in the ownership of the page. This field is part of a broader lock mechanism implemented throughout the Core Services software, that allows different partitions to lock access to the various structures, pages, and tables of the shared memory window, as needed, and in a consistent manner, to ensure that only one partition is capable of modifying any given structure, page, or table at a time (i.e., to synchronize access to these structures).

The DeallocationLock field, as well as all other lock fields described hereinafter, consists of two 64-bit words, designated Word 0 and Word 1. Word 0 defines a Lock Status Word, and Word 1 defines an Owner Word. The low order bit of Word 0 defines an "in use" bit. Setting this bit indicates a locked status. Word 1 is used to store the Partition ID of the partition that acquires the lock, enabling the owner of the lock to be determined.

Most operating systems and the processors on which they execute, provide a method by which the operating system and clients executing under those operating systems can acquire a lock to a given data structure. The lock field format used herein is compatible with a number of operating systems, including, for example, Windows NT, UnixWare, and the Unisys MCP. The Core Services on a given partition must be tailored to the operating system and processor architecture of that partition.

In accordance with an important feature of the lock mechanism, when a Type 1 memory page is first allocated, the allocating partition must acquire a system wide lock (a field of the Allocation Structure described hereinafter) in order to lock access to the page during allocation. However, when ownership of one or more allocated pages is extended or transferred to other partitions, only a lock to the pages involved must be acquired. The DeallocationLock field in these pages is used for this purpose. This facilitates greater throughput of communications between partitions, since contention for the system wide lock is avoided.

b. Type 2 Memory Pages

Figure 32B:
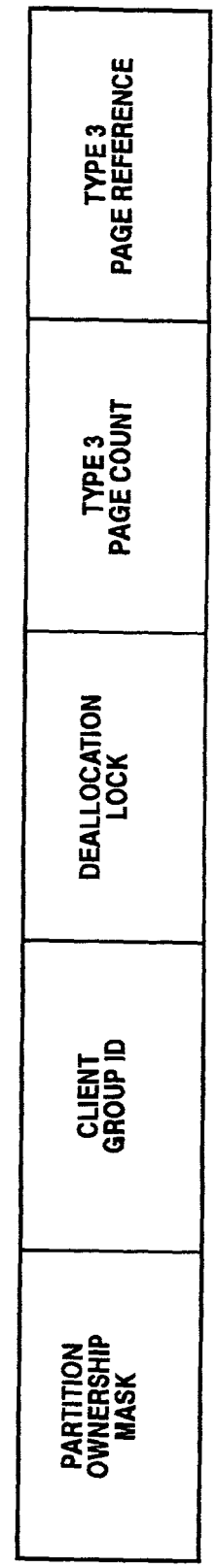
FIG. 32B illustrates the contents of a header of a Type 2 shared memory page in accordance with the alternate embodiment.

Allocation of this type of memory page can be requested by a client, for example, to define a buffer for passing message data to a client on another partition. As with Type 1 pages, when a Type 2 memory page is allocated to a given client, a Core Services header is created at the beginning of the page. FIG. 32B illustrates the contents of the Core Services header for Type 2 pages, in accordance with the present embodiment.

The Partition Ownership Mask and Client Group ID fields are identical to the corresponding fields in the header for Type 1 pages. That is, the Partition Ownership Mask indicates which partition(s) have ownership rights to the page, and the Client Group ID field contains the Client Group ID of the clients that have ownership rights to the page. When the page is first allocated, this field will contain the Client Group ID of the client that requested the allocation.

The DeallocationLock field, like the corresponding field in the header of Type 1 pages, is used to coordinate changes in the ownership of the page. Any partition intending to effect a change in ownership of a page must first acquire the lock to that page via the DeallocationLock field.

The Type 3 Page Count and Type 3 Page Reference fields relate to an additional feature, whereby as part of a request to allocate a Type 2 memory page, zero or more Type 3 pages may be allocated in conjunction with the Type 2 request in order to satisfy the buffer size in the allocation request. The Type 3 Page Count field specifies the total number of Type 3 memory pages associated with the Type 2 page, and the Type 3 Page Reference field specifies a location within the Type 2 page that contains references (i.e., pointers) to the associated Type 3 pages.

c. Type 3 Memory Pages

As mentioned above, this type of memory page is used in conjunction with a Type 2 memory page. A Type 3 page contains client data and is owned by a Client Group; however, the Type 3 page does not contain explicit Client Group information. Rather, the Client Group ownership of a Type 3 page is governed by the ownership of its associated Type 2 memory page, as specified in the Client Group ID field of the Core Services header of that Type 2 page. The ownership of a Type 3 page is implicitly changed whenever the ownership of its associated Type 2 page is changed.

d. Type 4 Memory Pages

This type of memory page is for static ownership by one or more Partitions. Unlike Type 1, 2, and 3 memory pages, ownership of Type 4 memory pages is specified in an Allocation Table, described hereinafter. Consequently, all changes to ownership of Type 4 pages require acquisition of the system-wide lock.

5. Control Structure Header

Figure 20:
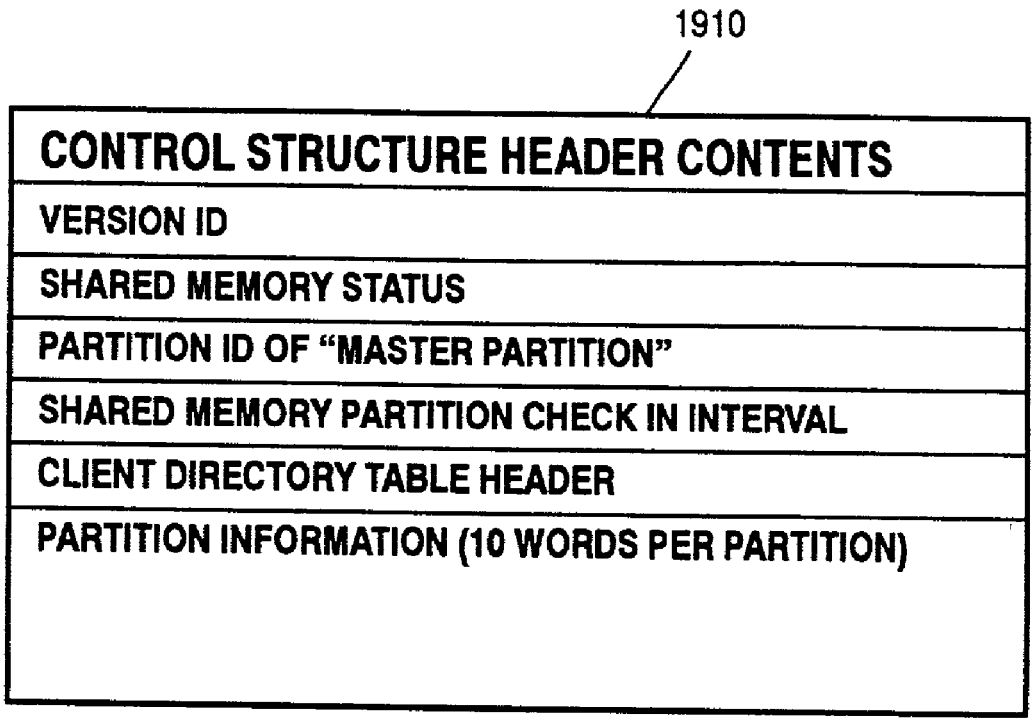
FIG. 20 illustrates the contents of a control structure header in accordance with the alternate embodiment.

FIG. 20 illustrates the contents of the control structure header 1910, in accordance with the present embodiment. A Version ID field is used to identify the particular release, or version, of the Core Services software running on the computer system. A Shared Memory Status field indicates the status of the shared memory (e.g., "uninitialized," "initializing," "initialized," and "cleanup"). A Partition ID Of Master Partition field identifies which partition is designated as the "Master" of the shared memory window; the Master partition has added responsibilities for managing the shared memory window, as described more fully below. A Shared Memory Partition Check-In Interval field specifies the time interval at which a partition is required to update certain status information to indicate to other partitions that it is active. A Client Directory Table Header field contains a pointer to the start of the Client Directory Table and a lock field that is used to coordinate access to the table in accordance with the lock mechanism.

The control structure header 1910 ends with information about each of the partitions within the computer system, including the type of operating system executing on the partition (e.g., NT, UnixWare, MCP, etc.) and information needed to issue inter-processor interrupts to the partition.

6. Allocation Structure

According to the present embodiment, administration of the shared memory pages is facilitated through an Allocation Table (not shown). Each allocable page in the shared memory window is represented by an entry in the Allocation Table. Each entry indicates whether the corresponding page is "in-use," "available," or references memory that is out-of-use, and may also specify page type. For a Type 4 memory page, the entry further specifies, in the form of a Partition Ownership Mask like that found within the headers of Type 1 and Type 2 memory pages, which partition(s) have ownership rights in the page. Thus, in this respect, ownership of Type 4 pages is maintained differently than for Type 1, Type 2, and Type 3 pages (where ownership information resides in the Core Services header of the page itself). The Allocation Table, like the Client Directory Table, itself occupies one or more pages of the shared memory window.

Figure 21:
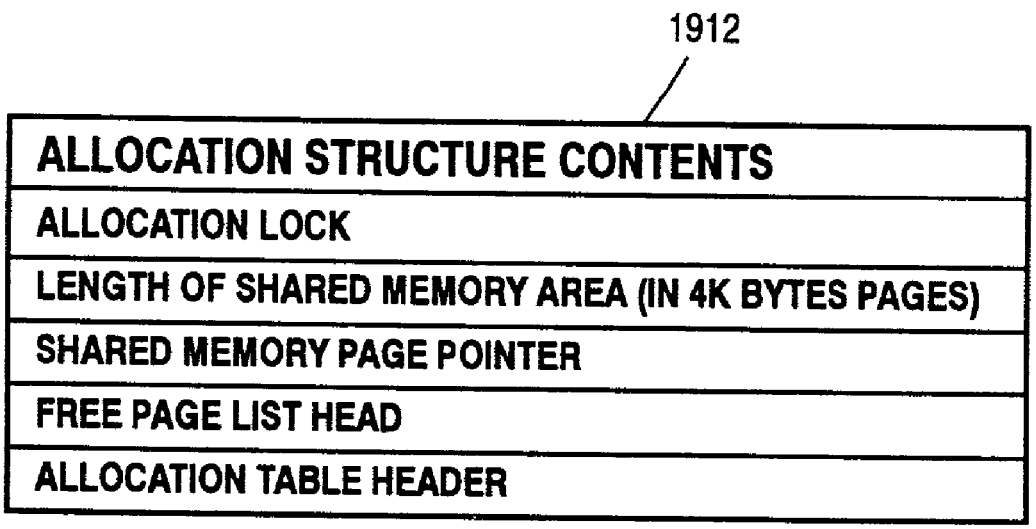
FIG. 21 illustrates the contents of an allocation structure in accordance with the alternate embodiment.

The Allocation Structure 1912 at the base of the shared memory window controls certain parameters associated with the Allocation Table and other structures. FIG. 21 illustrates the contents of the Allocation Structure, in accordance with the present embodiment. A lock field (Allocation Lock) is used to control access to the Allocation Table. This is the system-wide lock referred to above (as opposed to the individual page locks in the headers of Type 1 and Type 2 pages). Partitions must acquire this lock for any initial allocation of pages. This lock must also be required for any subsequent change in ownership of a Type 4 page, since ownership of Type 4 pages is maintained in their respective Allocation Table entries. As mentioned above, however, for subsequent changes in ownership of Type 1 and Type 2 pages, only the individual page locks within the headers of the pages themselves must be acquired. This ability to lock individual pages (Types 1 and 2) facilitates greater throughput between partitions, since contention for the system-wide lock (Allocation Lock) is eliminated.

A Length of Shared Memory Area field specifies the number of allocable pages in the shared memory window. A Shared Memory Page Pointer field provides a pointer to the start of the allocable pages. A Free Page List Header provides a pointer to the start of the Free Page List, and an Allocation Table Header provides the pointer to the start of the Allocation Table.

7. Signals

The fundamental unit of communication in this embodiment is a Signal. In the present embodiment, there are two major categories of Signals: (1) inter-Partition Core Services-to-Core Services Signals and (2) inter-Partition Client-to-Client Signals. Core Services-to-Core Services Signals are those that are sent between the Core Services software executing on different partitions. Client-to-Client Signals are those that are sent between clients on different partitions. Each category of Signal has one or more signal sub-types. Each Signal comprises a Core Services Information Section and a Client Information Section. Each of these sections comprises a number of words, the definition of which depends on its type.

For the Core Services-to-Core Services Signal sub-types, the Client Information Section is not defined. All information is contained in the Core Services Information Section. The following Core Services-to-Core Services Signal sub-types are defined in the present embodiment:

(1) Membership Change Signal: whenever a client registers or unregisters with the Core Services software on a partition, the Core Services software must send this Signal to the Core Services software on each other partition that has a client registered to the same Client Group to notify them that its client is registering/unregistering. The Core Services Information Section of the Signal will contain the Client Group ID of the Client Group to which the client is registering/unregistering with the Group.

(2) Resume Sending Signal: this Signal is used by a receiving partition to alert the Core Services software on a sending partition that it can resume sending Signals to it (the use of this Signal is further described below in conjunction with the description of the overflow flag of each Input Queue).

(3) You Have Been Marked Dead Signal: this Signal is sent by the Core Services software on the Master partition to a partition that the Master has determined is not functioning;

With Client-to-Client Signal sub-types, both the Core Services Information Section and the Client Information Section are defined. In the present embodiment, only the following Client-to-Client Signal sub-type has been defined: Signal Delivery Signal. As described in greater detail below, when a client on one partition wishes to send a Signal (and perhaps pass a buffer of message data) to a client on another partition, the client calls a Send Signal interface of the Core Services API. In response, the Core Services software sends the Signal Delivery Signal to the partition on which the receiving client is running. The Core Services Information Section of the Signal Delivery Signal contains the Client Group ID of the sending and receiving clients and may also contain a handle (i.e., reference) to one or more pages of shared memory that have been allocated to the client to define, for example, a buffer that contains a shared memory object intended for the receiving partition. Examples of shared memory objects are client messages, client data streams, client events, and Core Services events. The Client Information Section is opaque to the Core Services software, but can be used by the sending and receiving clients for any desired purpose. For example, the Client Information Section could be used to communicate short messages between clients. In the present embodiment, the Client Information Section comprises a maximum of five (5) words.

8. Input Queues and Input Queue Header

An input queue mechanism, in combination with the inter-processor interrupt mechanism described below, is used to signal a recipient partition that data is available. Each partition has a separate input queue for each other possible partition in the computer system. In the present embodiment, each partition also has an input queue for itself, to be used, for example, in the event that the Core Services software on the partition needs to send a Signal to a client on that same partition. Thus, in the present embodiment, wherein the computer system can be configured into a maximum of eight separate partitions (i.e., each of the eight sub-PODs defining a separate partition), each partition has eight separate input queues (one for each of the other seven partitions and one for itself), for a total of sixty-four (64) input queues. These input queues reside in the portion 1914 of the shared memory control structure 1900, along with a header. Signals will be generated by the Core Services software on one partition and delivered to the Core Services software on another partition via the corresponding input queue between them.

FIG. 29 illustrates the contents of the input queue header, in accordance with the present embodiment. An Input Queues Pointer field holds a pointer to the start of the actual input queues. A Number of Input Queues field specifies the number of input queues in the input queue area 1914 (sixty-four in the present embodiment). An Input Queue Length field specifies the length (in words) of each Input Queue. In the present embodiment, the length is specified as 2048 words. An Input Queue Signal Size field specifies the total length of each Signal (Core Services Information Section+Client Information Section). The total size of each Signal is the same and is fixed. Finally, a Number of Signals in Input Queue field specifies the total number of possible Signals that each Input Queue can accommodate at one time.

Figure 30:
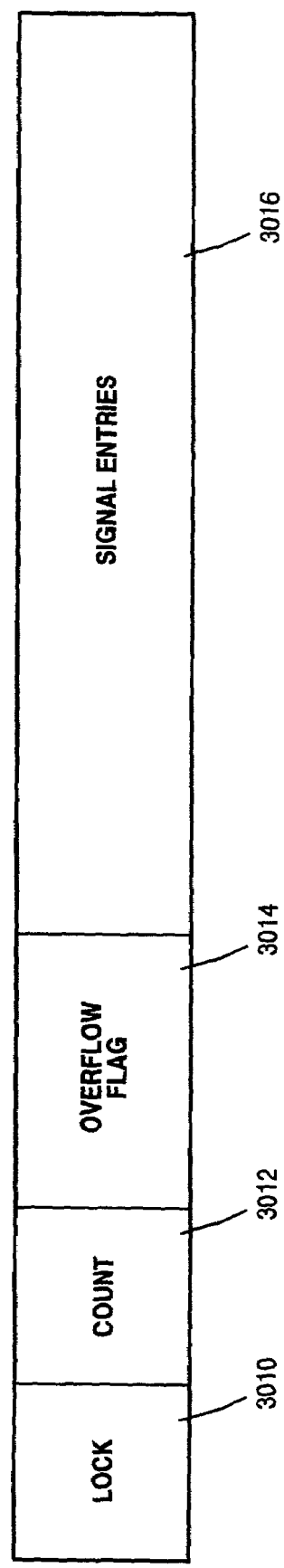
FIG. 30 illustrates the contents of an Input Queue in accordance with the alternate embodiment.

FIG. 30 illustrates the contents of each input queue, in accordance with the present embodiment. As shown, each input queue has a Lock field 3010 which is used by the Core Services software to lock access to the input queue while updating information in the queue, a Count field 3012 that specifies the current number of Signals in the queue, and an Overflow flag 3014 that is used to indicate that the queue has reached capacity but that there are additional Signals to be transferred onto the queue as soon as room becomes available. These fields are followed by space 3016 for a fixed number of Signals (as specified in the Number of Signals in Input Queue field of the Input Queue Header, see FIG. 29).

In the present embodiment, the sixty-four Input Queues are grouped contiguously in the Input Queue area 1914 of the control structure 1900. That is, the first eight Input Queues in the structure belong to the first partition, with successive groups of eight Input Queues belonging to successive ones of the other seven partitions.

a. Preferred Operation

In operation, whenever the Core Services software gets a request from a client to send a Signal to another partition, it builds the Signal based on information supplied by the client and attempts to place the Signal into an available entry in the appropriate Input Queue for the receiving partition. If no entries are available, then the Overflow flag 3014 of the Input Queue is set to alert the receiving partition that there are Signals waiting to be transferred that could not be transferred because the Input Queue was full, and an error is returned to the client. In such a case, when the receiving partition subsequently empties the Input Queue, it clears the Overflow flag 3014 and sends a Resume Sending Signal back to the sending partition, to alert the sending partition that it may now transfer any subsequent Signals issued by its clients onto the Input Queue for communication to the receiving partition.

On the receiving side, when the Core Services software on the receiving partition receives an inter-processor interrupt from a sending partition, it examines the count fields in each of its associated Input Queues to determine which Input Queues have available Signals. When the Core Services software finds an Input Queue with available Signals, it transfers them to a local processing buffer in its exclusive memory window and resets the count in the Input Queue. Each received Signal extracted from a given Input Queue is then passed to the appropriate client (based on the Client Group ID in the Signal) via a Receive Signal callback interface that all clients are required to implement.

b. Alternative Operation

In an alternative embodiment, in order to provide more efficient movement of client Signals into the various input queues in response to send requests, the Core Services software on each partition may set up a partition Send Queue (i.e., buffer) (not shown) in its exclusive memory window for each possible destination partition. In this alternative embodiment, whenever the Core Services software on a partition encounters a full Input Queue that prevents it from placing additional Signals on the Input Queue, it sets the overflow flag in the Input Queue and then queues those Signal requests to the appropriate local Send Queue until entries again become available in the Input Queue.

Additionally, on the receiving side, the Core Services software on each partition may also set up local Client Signal Tank Queues in its exclusive memory window—one for each client that has identified itself to the Core Services software. Each received Signal extracted from a given Input Queue of a receiving partition is transferred into the Client Signal Tank Queue that corresponds to the intended recipient client (again based on the Client Group ID in the Signal). Each Signal in a Tank Queue is eventually passed to the intended recipient client via a call to the client's Receive Signal interface.

The local Send Queues and Tank Queues in this alternate embodiment, in combination with the use of the Overflow flag as described above, are intended to provide efficient and equitable use of the shared memory resources to all of the clients of the Core Services software. Because each client's Signals are queued locally, the Input Queues in the shared memory window are kept open for communication in an efficient manner. No Signals are lost when an Input Queue reaches capacity, and the Input Queues are emptied quickly to minimize the time that Signals wait on a given Send Queue.

9. Inter-Processor Interrupt Mechanism

As mentioned above, an inter-processor interrupt mechanism is employed to alert a receiving partition that Signals have been placed in one of its Input Queues by a sending partition. Specifically, in the present embodiment, each partition establishes a single interrupt vector that all other partitions use to send inter-processor interrupts to it. Whenever a sending partition places a Signal in the Input Queue for a given receiving partition that causes the Input Queue to go from an empty state (Count=0) to a non-empty state (Count>0), the Core Services software on the sending partition generates an inter-processor interrupt to one of the processors of the receiving partition. The processor of the receiving partition responds to the interrupt by calling an interrupt service routine (not shown) of the Core Services software on that partition. Because each partition assigns only a single interrupt vector for receipt of interrupts from the other partitions, the Core Services software on the receiving partition does not know which other partition issued the inter-processor interrupt. Consequently, the Core Services software on the receiving partition must check the Count field 3012 in each of its Input Queues to determine whether any Signals are available in any of those queues.

If an Input Queue has available Signals, the Core Services software transfers those Signals to a local processing buffer in the receiving partition's exclusive memory window and resets the Count field 3012 in the Input Queue. If the Overflow flag 3014 of a particular Input Queue was also set, the Core Services software resets the Overflow flag and sends a Resume Sending Signal back to the sending partition, as explained above. The Core Services software then traverses the local processing buffer, extracting each received Signal, determining the destination client from the Client Group ID in the Signal, and then delivering the Signal to the destination client via the client's Receive Signal callback interface. The Core Services then repeats these steps for each other Input Queue that also has Signals available (i.e., count>0).

a. Exemplary Intel/Windows NT Implementation

At the processor and operating system levels, inter-processor interrupt mechanisms are both processor and operating system dependent. As one example, the following is a description of how inter-processor interrupts are generated and serviced in accordance with the present embodiment in the case of partitions that employ Intel Pentium-family microprocessors and that execute the Microsoft Windows NT operating system.

In accordance with the present embodiment, the Hardware Abstraction Layer (HAL) of the Microsoft Windows NT operating system is modified so that during initialization of the HAL on a given partition, the HAL will first select an inter-processor interrupt vector for receipt of shared memory inter-processor interrupts by that partition. An interrupt vector is a number that is assigned to an incoming interrupt hardware signal by the HAL of the Windows NT operating system. For example, interrupt vectors are typically assigned by the HAL to the various device I/O hardware interrupt signals on a system. An inter-processor interrupt is a specialized type of hardware interrupt signal that is sent from one processor to another (as opposed to from an I/O device to a processor). As with general I/O interrupts, the HAL must also assign vectors to any inter-processor interrupt signals (from the same number space that the I/O interrupt vectors are chosen). Thus, in the present embodiment, the modified HAL assigns an interrupt vector for the inter-processor interrupts that will be received by the local Core Services software on that partition to alert the software that one or more Signals are available in at least one of its Input Queues.

In the case of an Intel microprocessor, inter-processor interrupts are actually generated and received by an advanced programmed interrupt controller (APIC) associated with the processor. The APIC associated with the sending processor generates a hardware signal to the APIC associated with the receiving processor. If more than one processor is to receive the interrupt, then the APIC of the sending processor will generate a hardware signal to the APIC of each intended recipient. The APIC of each receiving processor receives the hardware signal and delivers the corresponding interrupt vector to the processor for handling.

Further according to the present embodiment, in addition to assigning an interrupt vector for the receipt of inter-processor interrupts from other partitions, the modified HAL will also designate one or more processors in its partition to handle such interrupts. In the present embodiment, in the case of a partition that comprises more than one sub-POD, the designated processors must be members of a single one of those sub-PODs (this is a limitation imposed by the present embodiment of the computer system platform and may not be a limitation in other embodiments). When more than one processor on a sub-POD has been designated, an incoming interrupt will be received in the local APICs of each of those processors. The APICs will then arbitrate to determine which one of the processors will handle the interrupt. Further details concerning this arbitration process are provided in the Pentium Pro Family Developer's Guide: Volume 3, available from Intel Corporation. Additional information concerning APICs can be found in the Intel MultiProcessor Specification, version 1.4, also available from Intel.

Still further according to the present embodiment, when the Core Services software is initialized on a partition, the Core Services software queries the HAL of the NT operating system on that partition through a custom interface to obtain the interrupt vector and the information concerning the processors designated by the HAL to handle shared memory inter-processor interrupts incoming to that partition. The Core Services software then stores this information in the Partition Information section of the Control Structure Header 1910 (see FIG. 20). This makes the information accessible to the Core Services software on other partitions. The Core Services software will then supply the HAL, through another interface, a reference to an interrupt service routine that is part of the Core Services software. If a designated processor on that partition receives an inter-processor interrupt with the designated interrupt vector, it will execute the interrupt service routine, allowing the Core Services software to respond to the interrupt.

In operation, in order to generate an inter-processor interrupt to notify a receiving partition that a Signal has been placed in one of its Input Queues, the Core Services software on the sending partition looks up the inter-processor interrupt information of the intended recipient partition in the Control Structure Header 1910. The Core Services software then calls another custom interface to the HAL on its partition, supplying the HAL with the inter-processor interrupt information for the receiving partition. With this information, the HAL on the sending partition manipulates the registers on the APIC of one of its processors to cause an inter-processor interrupt signal to be generated from its APIC to the APICs of each processor designated by the HAL on the receiving partition to receive such inter-processor interrupts. Those APICs on the receiving partition will then arbitrate to handle the interrupt, and the processor that wins the arbitration will invoke the interrupt service routine of the Core Services software on the receiving partition.

b. Alternative Embodiment—Multiple Interrupt Vectors

In the embodiment described above, each partition is assigned a single interrupt vector for receipt of shared memory inter-processor interrupts from any of the other partitions. Because of this, a receiving partition does not know which other partition generated the received interrupt. Consequently, the receiving partition must examine each of its Input Queues, in turn, to ensure that it receives the Signal(s) from the sending partition that generated the interrupt.

As an alternative embodiment, each partition may assign a separate interrupt vector for receipt of shared memory inter-processor interrupts from each other partition. A sending partition would then generate an inter-processor interrupt to a receiving partition using the corresponding interrupt vector assigned to it by the receiving partition. An advantage of this embodiment is that a receiving partition would know from the interrupt vector which other partition generated the incoming interrupt. The Core Services software on the receiving partition could then access the appropriate Input Queue to retrieve the incoming Signal(s), without having to cycle through all of the Input Queues as in the embodiment described above.

10. The Core Services API

In order to provide the functionality described above to clients of the Core Services software, the Core Services software has a defined application programming interface (API) that provides interfaces (i.e., callable methods) that a client can call to invoke the services of the Core Services software.

The following is a list of interfaces provided as part of the Core Services API to perform the functions described above:

Initialize Client Software—this interface is used by a client to identify itself to the Core Services software. The Core Services software returns a Client Reference identifier to the Client.

Uninitialize Client Software—this interface is used by a client to inform the Core Services software that it will no longer participate as a user of shared memory.

Register Client—this interface is used by a client to register with the Core Services software as a member of a given Client Group. Each client must register before it is allowed to request that any shared memory be allocated to it. The client supplies the desired Client Group Name and its Client Reference identifier as part of the call. The Core Services software will then make the appropriate changes to the Client Directory Table to reflect the addition of this client to the desired Client Group. The interface then returns the Client Group ID to the client.

Unregister Client—this interface is used by a client to unregister from a particular Client Group.

Allocate Shared Memory—this interface is used by a client to request allocation of one or more pages of the shared memory window. The client supplies its Client Group ID and the buffer size (in bytes) that it is requesting. The Core Services software locks the Allocation Table, determines whether enough pages to satisfy the request are available in the Free Page List, and then removes those pages from the Free Page List. The Allocation Table entries for each allocated page are updated to reflect that the pages are "in use." For Type 1 and Type 2 pages, a Core Services header is created in the page which, as explained above, indicates ownership of the page by partition and client. Any Type 3 pages associated with a Type 2 page are referenced in the header of the Type 2 page. For Type 4 pages, partition ownership is reflected in the corresponding Allocation Table entries. The Core Services software then returns a handle to the client that the client subsequently uses to reference the pages that comprise the allocated buffer.

Deallocate Shared Memory—this interface is used by a client to request that all pages associated with a given handle be deallocated. If the requesting partition is the only owner of the pages to be deallocated, then the pages are returned to the Free Page List (the system-wide lock must be acquired in order to do this). If not, then only the ownership information (in the Core Services header of Type 1 and Type 2 pages, or in the Allocation Table entries for Type 4 pages) is updated.

Send Signal—this is the interface that clients use to have a Signal inserted into the Input Queue of a receiving partition. The client calling this interface provides (i) the Client Group ID of the Client Group of which it and the receiving client(s) are members, (ii) an indication of which partitions have a client that will receive the Signal (because only one client on a given partition can be a member of a particular Client Group, this indication and the Client Group ID are the only pieces of information needed to identify the receiving client on each partition), (iii) the actual information to be supplied with the Signal in the Client Information Section, (iv) a flag indicating whether this is a point-to-point or multicast Signal (point-to-point has only one receiving partition, whereas multicast has multiple receiving partitions), and (v) an optional handle to a shared memory object, such as, a buffer (one or more shared memory pages) containing a client message. In response to a Send Signal call, the Core Services software will (i) build the Core Services Information and Client Information Sections of the Signal, (ii) check the status of shared memory, (iii) insert the Signal in the appropriate Input Queue, and if the Signal was placed in an empty Input Queue, (iv) generate an inter-processor interrupt on the receiving partition. If an Input Queue of an intended recipient partition is full, or the intended recipient partition is down, appropriate error indications will be returned.

11. Interfaces Supplied by Clients

In addition to the foregoing interfaces supplied by the Core Services software, any client of the Core Services software must implement certain callback interfaces that the Core Services software can invoke to notify the clients of certain events. In the present embodiment, these callback interfaces include interfaces for (i) notifying the client that a Signal has been received ("the Receive Signal interface"); (ii) notifying the client that there has been a membership change in its Client Group; (iii) notifying the client that shared memory is "up" or "down," (iv) notifying the client that the Core Services software is shutting down, and (v) notifying the client that one or more shared memory pages has a memory error.

12. Exemplary Operation

To further illustrate the operation of the interrupt-driven shared memory mechanism described above, FIGS. 31A and 31B comprise a flow chart that illustrates the steps performed by the clients and Core Services software on two partitions in order to communicate a message from one client to the other.

Figure 31A:
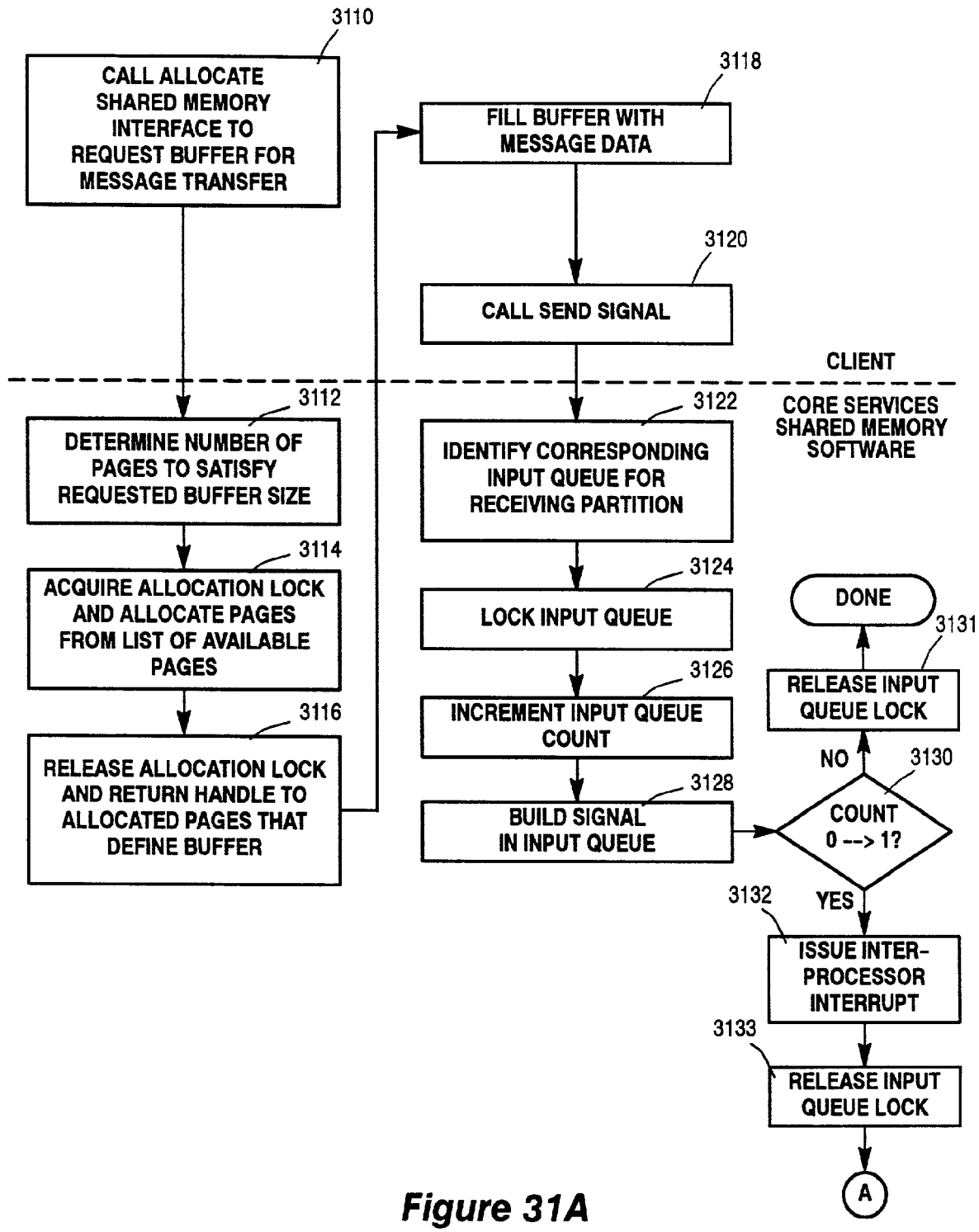
FIGS. 31A and 31B comprise a flow diagram further illustrating the operation of the computer system in accordance with the alternate embodiment.

FIG. 31A illustrates the steps that are performed on the sending partition. At step 3110, the client calls the Allocate Shared Memory interface of the Core Services API, requesting a buffer that will be used to transfer the message to the client on the receiving partition. In this example, the client requests that a Type 2 page be allocated. The client provides the required buffer size with the request. In response, at step 3112, the Core Services software determines the number of shared memory pages that will be required to satisfy the buffer request (i.e., whether any additional Type 3 pages will allocated with the Type 2 page). At step 3114, the Core Services software (i) acquires the system wide Allocation Lock, (ii) determines from the Free Page List whether the required number of pages are available and, assuming that they are, (iii) allocates the pages to the client. The Core Services software updates the Allocation Table to indicate that the pages are "in use," and then indicates ownership of the pages in the Core Services header of the Type 2 page. At step 3116, the Core Services software returns a handle to the allocated pages to the client and releases the Allocation Lock.

Next, at step 3118, the client fills the allocated buffer with the message data. Then, at step 3120, the client calls the Send Signal interface of the Core Services API, providing (i) the Client Group ID and receiving partition (which together identify the receiving client), (ii) any information to be provided in the Client Information Section of the Signal, (iii) the handle to the allocated buffer, and (iv) a flag indicating that this is a point-to-point request, as opposed to a multicast request. Recall from above that the client has the option to send a Signal to multiple partitions using the multicast feature.

In response to the Send Signal request, at step 3122, the Core Services software identifies the appropriate Input Queue based on the designated receiving partition. The Core Services software then locks the Input Queue (step 3124), increments the Count field (step 3126), and builds the Signal in the Input Queue (step 3128) as an entry in that queue. Next, if the Input Queue was previously empty (i.e., the Count has gone from zero to one) (step 3130), then the Core Services software generates an inter-processor interrupt on the receiving partition (step 3123). If the Count field of the Input Queue was already non-zero, the Core Services software does not need to generate an interrupt. The Core Services software then releases the lock on the Input Queue (step 3131 or step 3133).

Figure 31B:
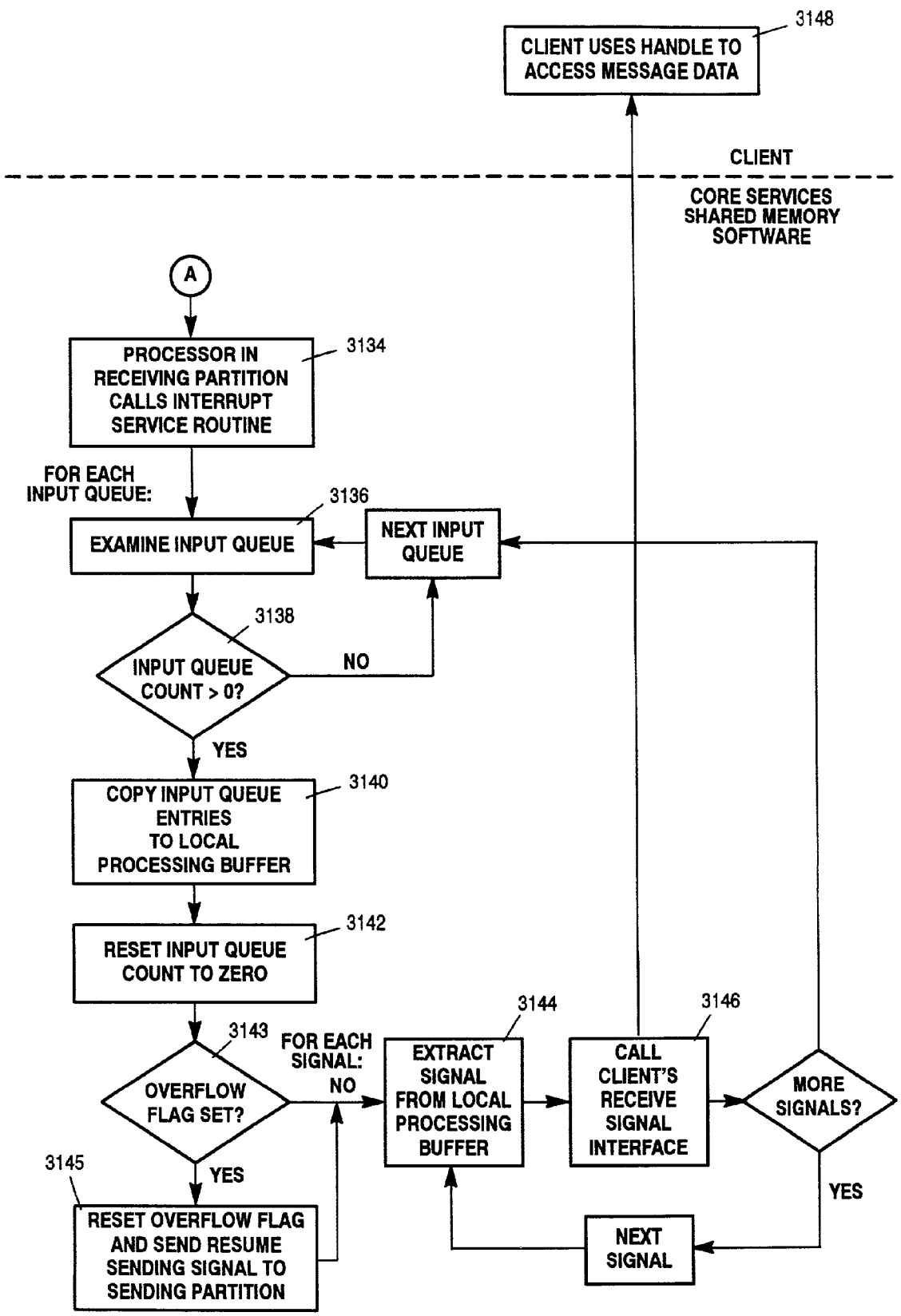

Referring now to FIG. 31B, the steps performed on the receiving partition are shown. At step 3134, one of the APICs on the pre-designated sub-POD of that partition arbitrates for, and delivers to its processor, the inter-processor interrupt generated by the sending partition. In response, the processor calls an interrupt service routine (not shown) of the Core Services software. As part of the interrupt service routine, the Core Services software begins examining, at step 3136, the first of its Input Queues (in the present embodiment, there are eight Input Queues for each partition). At step 3138, the Core Services software examines the Count field of the Input Queue. If the Count is zero, then no Signals have been sent from the sending partition that corresponds to that Input Queue, and the Core Services software proceeds to the next Input Queue.

If, however, the Count of a given Input Queue is greater than zero, then Signals are present and control passes to step 3140. At step 3140, the Core Services software copies each Signal in the Input Queue to a local processing buffer, and then at step 3142, resets the Count to zero. Next, at step 3143, the Core Services software determines whether the Overflow flag in the Input Queue is set. If the Overflow flag is set, the Core Services software resets the Overflow flag and then sends a Resume Sending Signal to the sending partition, thus alerting the sending partition that the Input Queue is no longer full.

Next, steps 3144 and 3146 are performed for each Signal copied into the local processing buffer. Specifically, at step 3144, the Core Services software extracts a Signal from the local processing buffer. At step 3146, the Core Services software calls the Receive Signal interface of the recipient client (as identified by the Client Group ID in the Signal), passing the Client Information Section and the handle to the allocated buffer associated with the Signal (if there is one). At step 3148, the client processes the Signal, including, for example, using the handle to access message data in the referenced buffer. Steps 3144 and 3146 are repeated for each Signal in the local processing buffer. When this is done, the Core Services software repeats steps 3136 through 3146 for each of its other Input Queues. Although not illustrated in FIG. 31B, in the present embodiment, the Core Services software on the receiving partition continues to cycle through its Input Queues until it has made a complete pass through all of the Input Queues without finding any waiting Signals (i.e., none with a count>0). Input Queue processing then stops until another inter-processor interrupt is received.

An additional aspect (not shown) of the sending and receiving processes is the deallocation of the allocated shared memory pages. When a sending client that has requested allocation of a buffer (i.e., one or more shared memory pages) transfers the buffer to a receiving partition by passing its handle to the receiving partition via a Signal, the sending partition has the option of either (i) extending ownership rights to the pages of the buffer to the receiving client (in which case both clients will have ownership rights), or (ii) transferring ownership rights to the receiving partition (in which case the sending client relinquishes ownership). Regardless of which option is chosen, at some point, a client may wish to deallocate the allocated pages. This is done using the Deallocate Shared Memory interface. Specifically, a client calls the Deallocate Shared Memory interface, passing the handle to the pages to be deallocated. If no other clients are owners of those pages, then the pages are returned to the Free Page List and their corresponding Allocation Table entries are updated to reflect their availability. If, however, other clients also have ownership rights to those pages, then the pages cannot yet be returned to the Free Page List. Rather, the Core Services software locks down the pages and updates the ownership information in the Core Services header of the Type 2 page.

13. Other Functions

In addition to the foregoing, the following additional functions of the interrupt-driven shared memory management mechanism are provided:

a. Initialization and Shut Down

When Core Services software begins execution on a partition, it first confirms the availability and status of the shared memory window, and then invokes appropriate platform interfaces to get the following information: the physical address and size of the shared memory window, the partition identifier (each partition has an associated identifier), the information needed by other partitions to generate inter-processor interrupts to this partition, and the host operating system type and version running on the partition. The Core Services software stores a copy of this information in the exclusive memory window of its partition and in the various fields of the shared memory control structure 1900, such as, for example, the Partition Information field of the control structure header 1910 and the Length of Shared Memory Area field of the Allocation Structure 1912.

In order for a partition to join other partitions in accessing and using the shared memory window, the partition must make itself known to the other partitions using the shared memory window. If there is no current Master partition, then they must arbitrate among themselves to elect a Master partition. For this purpose, Core Services has a 'Check In' mechanism. The 'Check In' mechanism enables each partition to determine the validity of the Shared Memory Status field in the Control Structure Header without using a lock, and to dynamically elect a new Master when there is no active Master.

It is also the responsibility of the Core Services software to exit the shared memory window cleanly whenever a partition voluntarily leaves the shared memory window. This is true for both the Master partition and the non-Master partitions. The common responsibilities of any departing partition are: (i) to notify its local clients that the shared memory window is going away by calling the appropriate client callback interface, (ii) to unlock any data structures that it has locked (e.g., Allocation Table, Input Queue, etc.), (iii) to clean up its Input Queues, (iv) to deallocate any shared memory pages that it owns, (v) to return any local memory that it owns, and (vi) to change its status in the Control Structure Header 1910 to "Uninitialized".

If the departing Partition is the Master partition and there are no other alive partitions, then it shuts down the shared memory window with a notification sent to the MIP. If the departing partition is the Master partition and there is at least one other partition still communicating with the shared memory window, then a new Master partition is chosen by the remaining active partitions.

b. Master Partition Duties

The Master Partition has specific responsibilities when shared memory is initialized, when a non-Master partition dies, and when shared memory shuts down. The following duties are reserved for the Master Partition:

(1) initialize shared memory structures, including the Control Structure Header, the Allocation Structure, the Allocation Table, the Free Page List, the Input Queue Header, the Input Queues, the Client Directory Table Header, and the Client Directory Table;

(2) perform house cleaning operations on shared memory structures and in-use shared memory pages when a partitions dies; and (3) perform house cleaning operations on shared memory structures when shared memory shuts down.

c. Duties of Non-Master Partitions

All the partitions, including the Master partition, have the following duties:

(1) monitor the status of the other partitions at the pre-defined Shared Memory Partition Check In Interval;

(2) determine if a new Master partition needs to be chosen;

(3) update the appropriate areas in the shared memory structures and deallocate any shared memory pages it owns if it chooses to leave the shared memory window; and, (4) deallocates any shared memory pages owned by a client, if the client withdraws its participation in the shared memory window or the client fails.

As described herein, the program code that implements the interrupt-driven shared memory communication mechanism of this alternative embodiment is implemented as a combination of both operating system code (e.g., the modification to the HAL) and a separate computer program (e.g., the Core Services software). It is understood, however, that in other embodiments, the program code could be implemented either entirely as operating system code or entirely as a separate computer program. Moreover, the program code can also be implemented in hard-wired circuitry or a combination of both hard-wired circuitry and software code. As mentioned above, the term "program code" is intended to encompass all such possibilities.

IV. A Shared Memory Device Driver

A shared memory network driver interface specification (NDIS) device driver, as described below, can be implemented to allow standard off-the-shelf applications to operate on the multi-partition system described above. The shared memory NDIS device driver provides standard networking and/or clustering interfaces with faster bandpass and with lower latency than on an analogous LAN configuration, for example. This shared memory NDIS device driver is built upon, and takes advantage of, the Core Services software of the interrupt-driven shared memory management mechanism described above in Section III.B.

Figure 18:
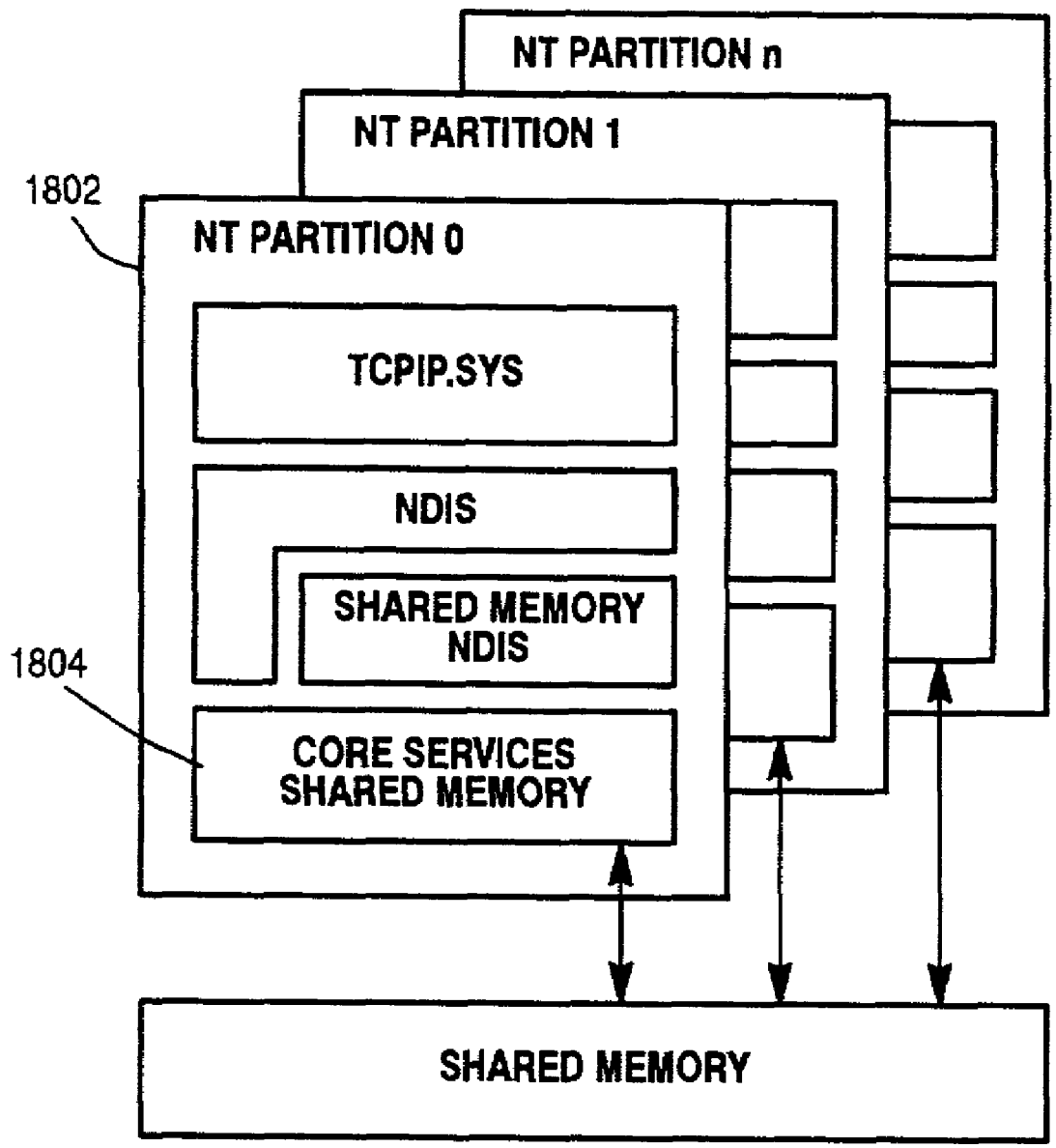
FIG. 18 illustrates a shared memory device driver for use in the computer system of FIG. 2.

FIG. 18 illustrates the exemplary shared memory NDIS device driver 1802. The unshaded boxes represent standard Windows NT components.

The shared memory NDIS device driver 1802 supports an upper-edge interface and a lower-edge interface. On the upper-edge interface, the shared memory NDIS device driver 1802 supports standard NDIS interfacing to standard network protocol drivers. The shared memory NDIS device driver 1802 functions as an NDIS layered driver. More specifically the shared memory NDIS device driver 1802 conforms to NDIS Miniport interfaces and supports any network protocol using the NDIS interfaces to communicate over NDIS device drivers. For example, TCP/IP and SPX/IPX protocols can be implemented.

The lower-edge interface for the shared memory NDIS device driver 1802 is a private interface to the Core Services software described in Section III.B., which directly supports the global shared memory capabilities. The interface includes a hybrid of normal layered 10 driver interfaces (IRPs) and tightly coupled 10 driver interfaces (direct procedure call). The IRPs are used for asynchronous functions. The tightly coupled I/O driver interfaces are used for synchronous functions.

The main function of the shared memory NDIS device driver 1802 is to map the NDIS interface onto the Core Services API. Local system buffers containing networking packets (NDIS packets) are passed through the NDIS interface to the shared memory NDIS device driver 1802. The shared memory NDIS device driver 1802 copies the network packet from the local system buffer (in a partitions exclusive memory window) into a shared memory buffer. A reference to the shared memory buffer is queued to the appropriate shared memory NDIS device driver in another partition as selected by the destination MAC address in the network packet. Packets with a broadcast or multicast MAC address are copied into as many shared memory buffers as necessary to send directly to each partition supporting a device driver in shared memory NDIS device driver 1802's shared memory group, thus simulating a broadcast/multicast. Buffers received from shared memory will be repackaged into NDIS packets and presented to the NDIS interface where they are processed by network protocol drivers. The NDIS packets are returned to shared memory NDIS device driver 1802.

The shared memory NDIS device driver 1802 maintains a list of shared memory buffers for each partition, called a SendList, to reduce the overhead of allocating and deallocating shared memory buffers via the Core Services software. Shared memory buffers are selected from the SendList for sending network packet information to another partition. The receiving partition will have a RcvList of handles corresponding to the originating partitions SendList. When the receiving partition is finished with the message processing, it sends a message indicating that the buffer should be returned to the available state in the SendList. When the number of buffers in the SendList drops below a minimum value, additional buffers are allocated from the Core Services software. When the number of buffers in the SendList is at a maximum, and not all in use, buffers are deallocated back to the Core Services software. The minimum and maximum SendList sizes have pre-determined default values in the code, but can be overridden by setting specific keys in a registry.

The shared memory NDIS device driver 1802 uses the Core Services software on its partition 1804 to simulate a FDDI LAN between all the partitions that are running copies of the shared memory NDIS device driver 1802. The shared memory NDIS device driver 1802 supports the basic semantics of an FDDI LAN. This includes point to point messaging, broadcast messaging, multi-cast messaging and 4491 byte message sizes.

V. Systems for Emulating Network Communications Between Partitions of a Server to Maintain an Appearance of Communications by Wire Described below are different embodiments of systems for emulating network communications between partitions of a server to maintain an appearance of communications by wire, in accordance with the present invention.

Figure 22:
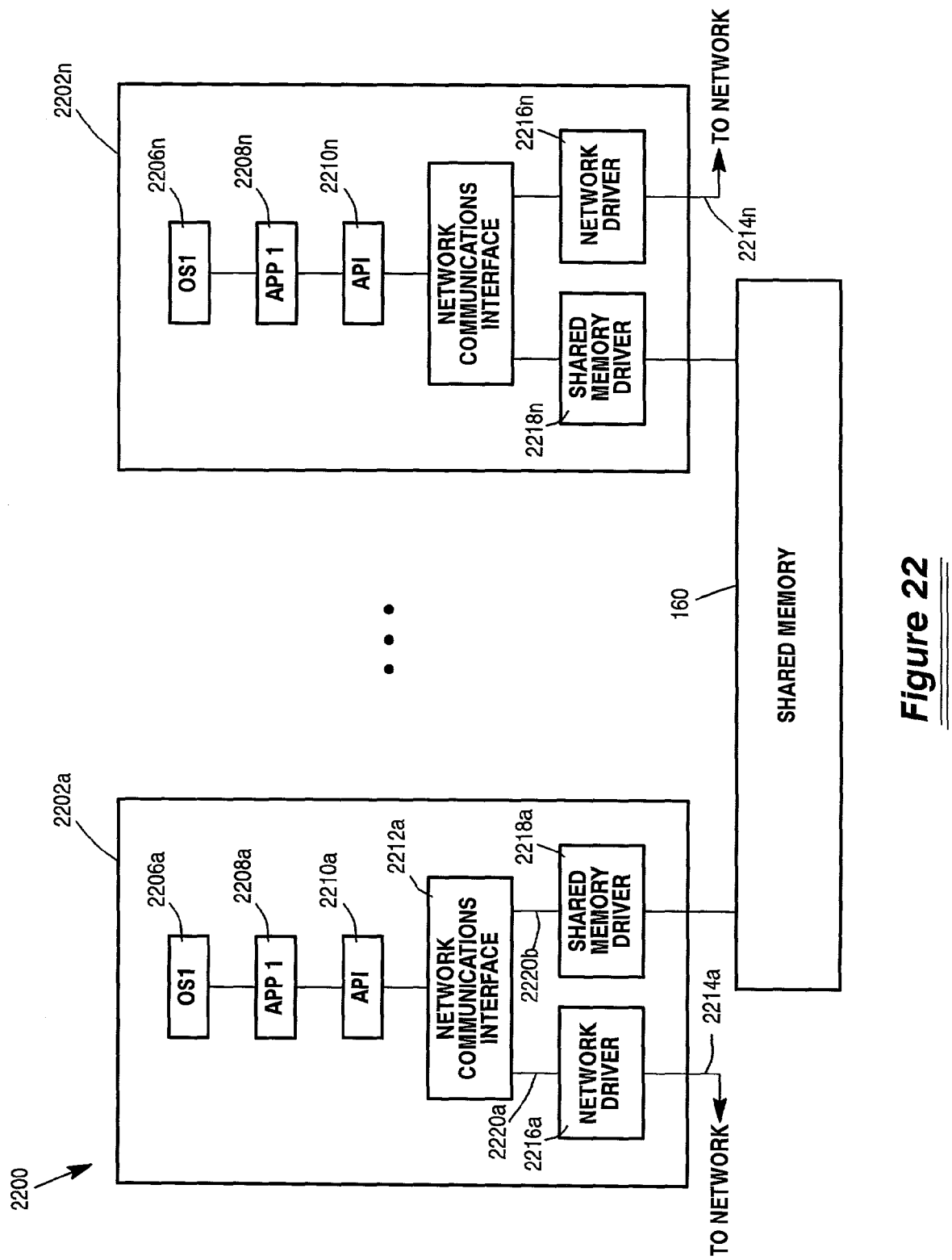
FIG. 22 is a block diagram of a system for emulating network communications between partitions of a computer system, in accordance with one embodiment of the present invention.

FIG. 22 shows an exemplary configuration of the computer system 200 of FIG. 2, including one embodiment of a system for emulating network communications between partitions of the computer system 200, in accordance with the present invention. This embodiment is built upon the mechanism described above in Section III.A., in which inter-partition communications are managed in accordance with a polling technique. In FIG. 22, two partitions 2202a and 2202n are shown, each of which may, for example, include a single sub-Pod. Each sub-Pod 2202 operates under control of a separate operating system 2206. Operating systems 2206 can be separate instances of the same operating system or they can be different operating systems. One or more application programs 2208 can run on each partition 2202 under the operating system 2206 that operates on that partition.

One or more application program interface (API) modules 2210 can be associated with one or more application programs 2208, for sending messages. For example, on sub-Pod 2202a, application program 2208a can initiate a message send operation using API 2208a. API 2208a prepares the message for input to a network communications interface module 2212.

Network interface communications interface module 2212 can be a conventional system that interfaces partitions with one another, such as through a network. Network interface communications module 2212 formats messages for transmittal to other partitions 2202 through a network driver 2216 and over a conventional network-type wire 2214. In an exemplary embodiment, network interface communications module 2212 outputs messages on lines 2220a and 2220b as if they were destined for a conventional network-type wire transmittal system 2214. Thus, up to this point, sending of messages from partitions 2202a is performed in a conventional manner.

Instead of sending all messages on lines 2220a and 2220b from network communications interface module 2212 to a conventional network driver 2216, messages intended for shared memory 160 are handled through a shared memory driver 2218. In an exemplary embodiment, a destination address is associated with each message. If an address corresponds to a computer or other destination that is coupled to wire 2214, then the message is sent to wire 2214 through network driver 2216. If, however, the address corresponds to an address in shared memory 160, the message is directed to shared memory driver 2218.

Shared memory driver 2218 receives and reformats messages for transmittal to, and storage in, shared memory 160. Reformatting can include, for example, reformatting messages into a standard format that can be recognized by application programs 2208 running on other partitions 2202. Reformatting can also include, for example, reformatting in accordance with specifications associated with shared memory 160.

Figure 23:
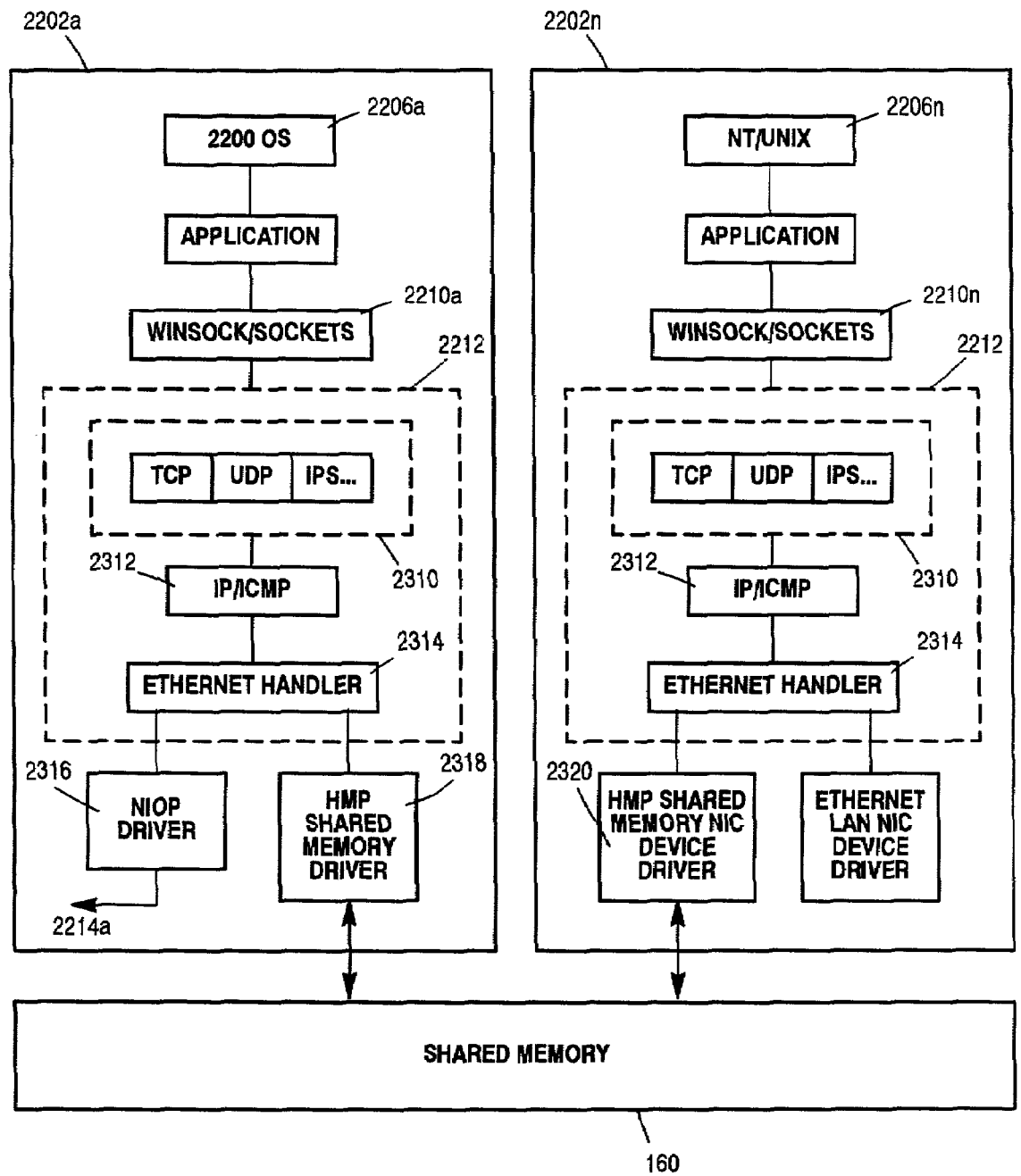
FIG. 23 illustrates further details of the system illustrated in FIG. 22.

Referring to FIG. 23, further details of system 2200 are illustrated. In this exemplary embodiment, operating system 2206a on partition 2202a is illustrated as a 2200 operating system, commercially available from Unisys Corporation, and operating system 2206n on partition 2202n is illustrated as a Windows NT or a UNIX operating system.

In the exemplary embodiment of FIG. 23, network communication interface modules 2212 include one or more software modules 2310 that implement a conventional transport layer (i.e., layer 4) of an Open Systems Interconnection (OSI) seven-layer communications model. The OSI seven-layer communications model is well known to persons skilled in the relevant art(s). The transport layer can be implemented using a number of different protocols, including a Transmission Control Protocol (TCP), and a User Datagram Protocol (UDP). The selected protocol will determine the reliability of, and the potential for duplication during, the subsequent communication operation. In an exemplary embodiment, TCP can be utilized to provide reliable unduplicated data delivery.

The software module that implements the transport layer 2310, interfaces with a software module that implements a network layer 2312, which is layer 3 of the seven-layer OSI protocol. This can be performed using the industry-recognized Internet Protocol (IP) and Internet Control Message Protocol (ICMP), for example. IP dictates the protocol used for data transmission. ICMP defines the manner in which error handling and analysis is performed.

The software module(s) that implements layer 3 2312 interfaces with a communications handler 2314. Communications handler 2314 formats message data into packets. A format can comply with a selected one of a number of communications protocols. These protocols can include, for example, Ethernet, Token Ring, Fiber Distributed Data Interface (FDDI), Asynchronous Transfer Mode (ATM), etc. In an exemplary embodiment, an Ethernet Handler, which implements an Ethernet protocol, is used.

After a message is formatted within local memory, communications handler 2314 calls a device driver. During a "normal" communication scenario, an I/O Driver is called to perform communications via a network. In an exemplary embodiment, this is a network input/output device driver (NIOP) 2316, commercially available from Unisys Corporation. NIOP 2316 implements layers 2 and 1 of the OSI model, which are the data link and physical layers of the model, respectively.

When communication is to be performed via shared memory 160 instead of over a network, a shared memory driver 2218 is called. For example, on partition 2202a, when communication is to be performed via shared memory 160 instead of over a network, communications handler 2314 can call a HMP Shared Memory Driver 2318 instead of NIOP Driver 2316. Communications handler 2314 does not need to distinguish between a call to NIOP Driver 2316 and a call to HMP Shared Memory Driver 2318. From communications handler 2314's point of view, all messages are transferred over a network. The operating system decides which of the two types of calls is to be made, as will be discussed further below. The functionality included within the HMP Shared Memory Driver is described below.

The functionality included in the 2200 operating system software modules on partition 2202a is included in similar modules residing in the NT or Unix operating system of partition 2202n. In FIG. 23, these modules can include an API 221 On (shown as Winsock/Sockets), and network communications interface modules 2212 (shown as TCP/UDP/IPS 2310n, IP/ICMP 2312n, and Ethernet Handler 2314n). Communications with memory 160 is through HMP Shared Memory NIC device driver 2320. As with the 2200 operating system software modules, the layers of the software that interface to the Applications Program, including the API and the communications software, do not distinguish between network or shared-memory communications. These software components view all communications operations as occurring over a network.

Figure 24:
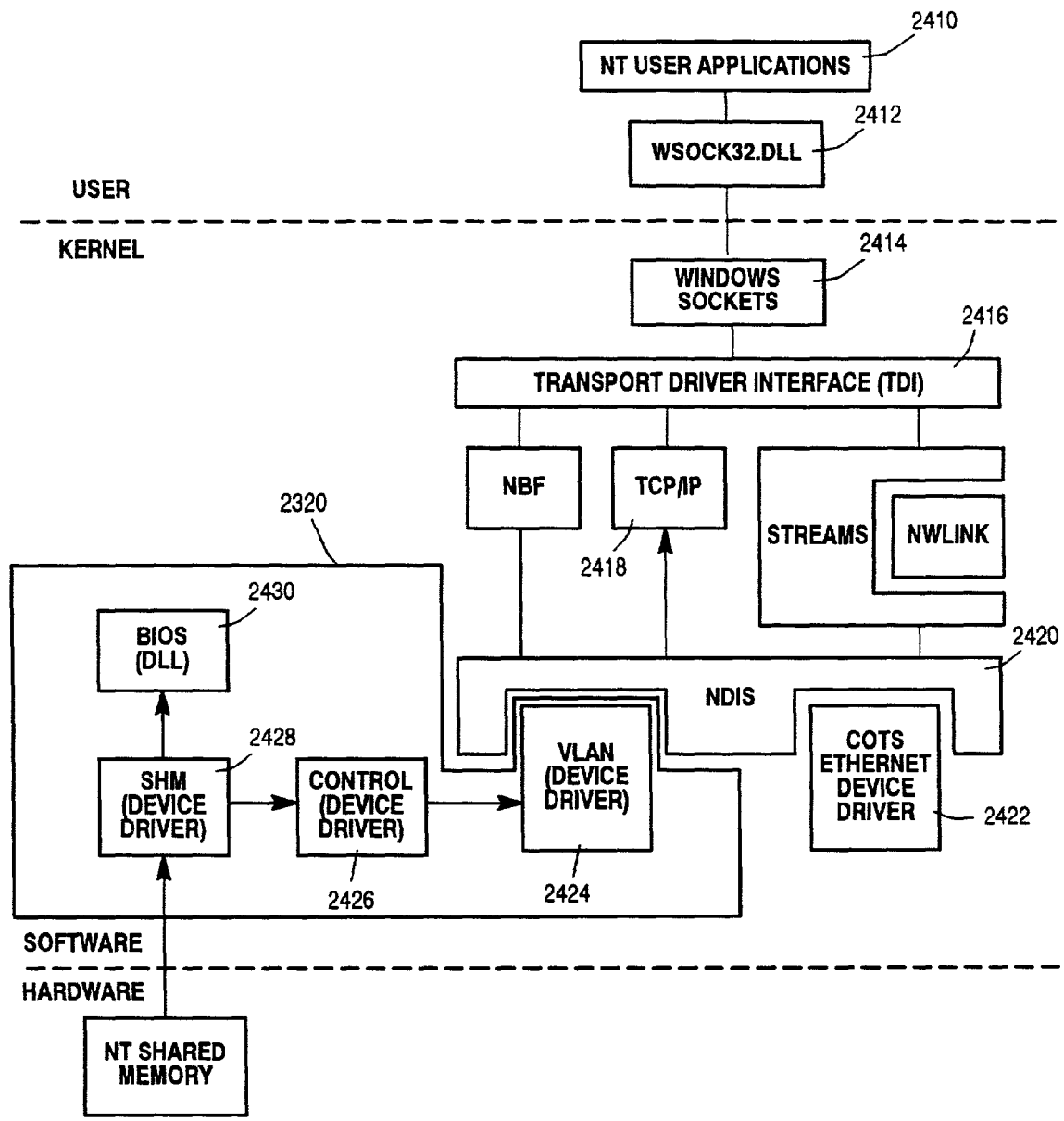
FIG. 24 illustrates further details of the system illustrated in FIG. 22, wherein the system is designed to operate in a Windows NT environment.

FIG. 24 provides farther details of the HMP Shared Memory Driver 2320 as implemented in a Windows NT environment in accordance with an exemplary embodiment of the invention. In FIG. 24, a NT User Application 2410 interfaces to a dynamic link library 2412. Dynamic link library 2412 interfaces with a Windows Socket 2414. Windows Socket 2414 interfaces with a Transport Driver Interface (TDI) 2416, which is a Microsoft-defined API for NT systems. API 2416 interfaces to a TCP/IP module 2418 which performs layers three and four of the OSI communications model. TCP/IP module 2418 can interface with a device driver via an API 2420 designed according to a Network Driver Interface Specification (NDIS) developed by the Microsoft and 3Com Corporations. The device driver can be, for example, an off-the-shelf driver, such as a COTS Ethernet Device Driver 2422, which performs message transmission over an Ethernet network, or may be HMP Shared Memory NIC Device Driver 2320. When the API 2420 makes a call to a device driver, API 2420 does not distinguish between the two types of calls, and all communications appear to be performed via a network.

HMP shared memory NIC device driver 2320 can include, for example, VLAN 2424, CONTROL 2426, SHM 2428, and BIOS 2430 modules. Operation and functionality of these modules is described below.

Figure 25:
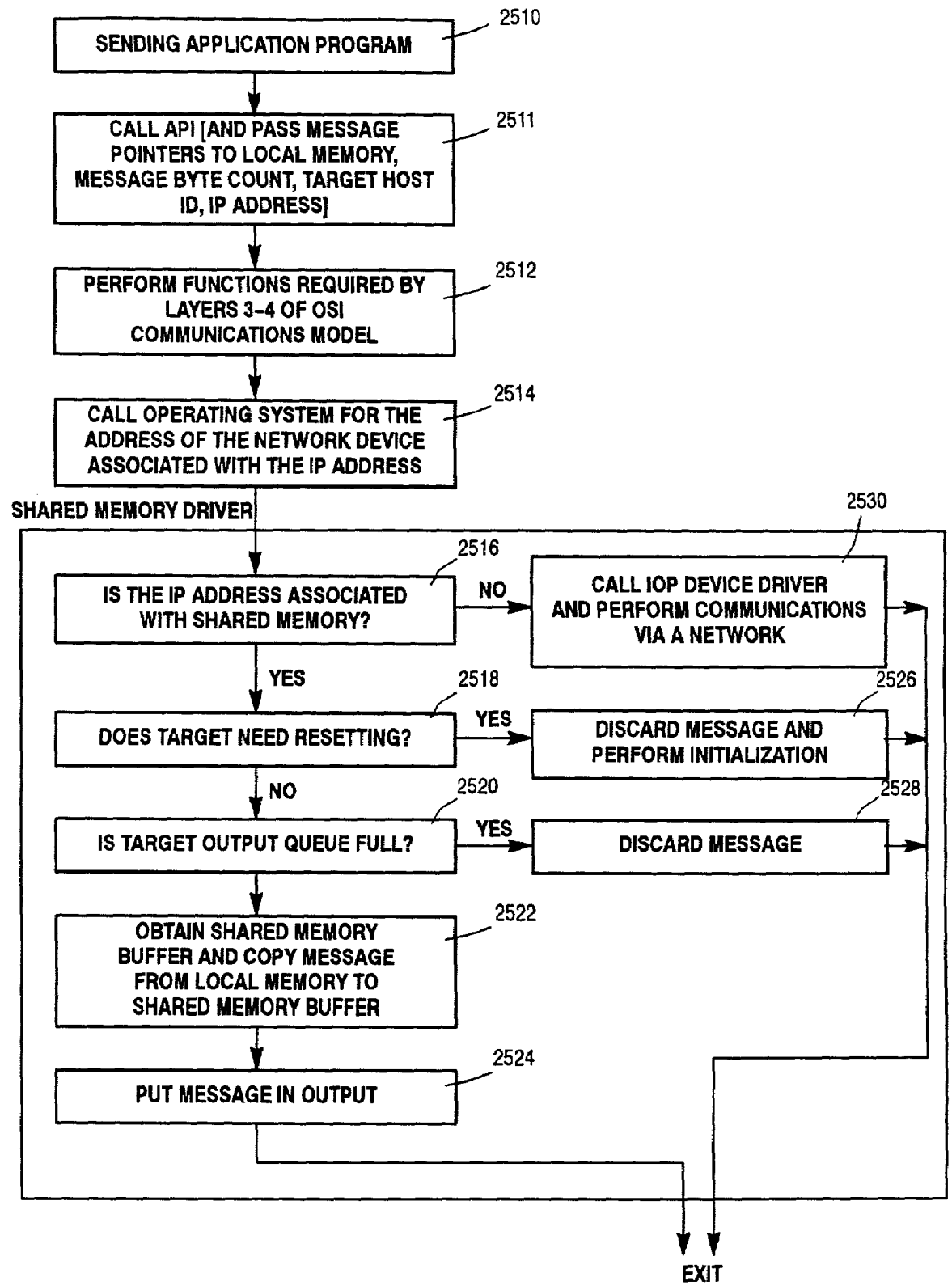
FIG. 25 is a process flowchart illustrating still further details of the system illustrated in FIG. 22, wherein the system is designed to operate in a Windows NT environment.

FIG. 25 is a process flowchart illustrating further details of the operation of the software component illustrated in FIGS. 22-24, in accordance with the present invention. The process begins at step 2510 where an application program builds a message and associated header information in local memory.

In step 2511, the application program calls an associated API. The program passes the API the length of the message, the IP address of the target host, and one or more pointers to the message data. If the message is to be passed over a network, the IP address specifies a device driver such as the NIOP (on the 2200 operating system side) or an Ethernet LAN NIC Device Driver (on the NT or UNIX side). If the message is to be passed via shared memory, the IP address indicates that an associated HMP Shared memory driver is to be used.

In step 2512, software modules which perform layers 3 and 4 of the OSI model add various headers to the message and format the message data to conform with the requirements of the selected communications protocol. For example, the Ethernet protocol requires that a single message transmission may contain no more than 1500 bytes. A longer message must therefore be formatted into multiple buffers to be sent via multiple message transmissions.

In step 2514, a communications handler (which, in an exemplary embodiment, is an Ethernet handler) makes a call to the Operating System (OS) for the address of the device driver. One skilled in the relevant art(s) will recognize that other protocols could be employed, including, for example, protocols with a larger network data packet size.

Generally, the communications handler will connect to a device driver before any application messages are received for transmission. The communications handler will send its own 'broadcast' message out over the network asking everyone to respond with their identity, which for TCP/IP, results in IP addresses being returned. This is how the communications handler knows what IP addresses can be accessed.

In step 2516, the operating system selects a device driver address associated with the specified IP address, and passes the address to the communications handler. In an exemplary embodiment, the operating system maintains a table which maps IP addresses to various device drivers. The device driver address may specify a device driver which performs network communications (such as the NIOP or the Ethernet LAN NIC Drivers). Alternatively, the device driver may specify a device driver which performs communications via shared memory. The communications handler is not able to distinguish between the two types of addresses. The 2200 operating system device driver for shared memory can be adapted from a 2200 operating system NIOP, as described in U.S. Pat. No. 5,659,794, assigned to Unisys, and hereby incorporated by reference in its entirety.

In steps 2518-2528, when the address indicates communication is to be performed via shared memory, an HMP Shared Memory Driver (2200 operating system) 2318 or an HMP Shared Memory NIC Device Driver (NT/UNIX) 2320 is called. The called driver first maps the target host ID to one of the nodes. This determines which one of the queues within the sending nodes' Output Queue will be utilized.

In step 2518, the called driver determines whether the queue for the target (receiving) system requires resetting. If the queue for the target system requires resetting, processing proceeds to step 2526 where the sending system (or sending "node") discards the message, and sets a Need_Reset flag in the queue for the target system (or target "node"). When the Need_Reset flag is set, a reset procedure can be performed.

Where a TCP protocol is used instead of UDP, the message can be discarded without resulting in message loss. This is because TCP waits for an acknowledge from the receiving system indicating that the message has been received. This is tracked using message IDs. Each message is retained in the local storage of the sending system until an associated acknowledge is received. If an acknowledge is not received within a predetermined period of time, another call is made to the operating system to re-send the message. If UDP is utilized instead of TCP, the message would be lost since UDP does not track the receipt of acknowledges from the receiving system.

Typically, the sending application decides whether UDP or TCP is used. This decision is transparent to shared memory. In an exemplary embodiment, the shared memory of the present invention supports UDP, TCP and higher layer protocols that connect with the device driver that handles shared memory. From a communications handler point of view, shared memory of the present invention is just another LAN that does not have very many nodes connected.

If the target queue does not require resetting, processing proceeds to step 2520, where the sending system checks to determine if the target queue is full. In an exemplary embodiment, this is done by comparing the value stored in the appropriate Enqueued_offset (in the sending node's output queue) to the associated Dequeued_offset (in the receiving node's input queue). If putting a new entry in the target output queue will cause the Enqueued_offset to be equal to the Dequeued_offset, then the target output queue is full.

When the target output queue is full, processing proceeds to step 2528 where the message is discarded. The message can be re-sent later, as discussed above with regard to steps 2518 and 2526.

When the target output queue is not full, processing proceeds to step 2522 where a message buffer in shared memory is obtained from the sending node's message buffer pool. One skilled in the relevant art(s) will recognize that this can be implemented in a variety of ways. In an exemplary embodiment, a memory management module is associated with the Shared Memory Device Driver on each node to keep track of empty buffers.

Preferably, for each Output Queue, a buffer pool including, for example, at least, 511 buffers, will be available. Each buffer can be, for example, 427 8-byte words in length. In an exemplary embodiment, each buffer pool starts on a 4K word page boundary, wherein each word is 8 bytes long. That is, a new buffer pool may start on every eighth 4K-byte page boundary. This allows for more efficient memory management.

For example, each buffer pool can be 511*427*8//4096=1,748,992 words long, where 511 is the number of queue entries, 427 is the number of words needed to handle a 1500 byte long message and an extra header needed to handle the 2200 operating system requirements. 1500 divided by four equals 375 plus 50 maximum parts and two for buffer and header length for a total of 427. Eight is for the maximum number of partitions and 4096 is to round it up to a page boundary for protection reasons.

After a buffer is obtained, processing proceeds to step 2524, where the message is placed in the output queue by copying from local memory to the shared memory buffer. During this process, a header is generated which serves as the header defined in physical layer, layer 1, of the OSI model.

The header in the shared memory buffer can be viewed as a physical layer because the MAC and LLC layers will be on the message when received by the shared memory device driver. These headers will remain because at least the LLC layer is needed for potential routing at the receiving node. The header in the buffer is necessary because of the different memory access characteristics of the 2200 style processor and the Intel platforms and represents how the data is at the physical layer.

When a 2200 operating system is performing the message send operation, the Block Transfer Pack (BTP) hardware instruction is used to move the message data from local to shared memory. This instruction converts the message data from 9-bit bytes to 8-bit bytes, performs a zero-fill operation, and big endian (2200 style processor) to little endian (Intel) conversion. Alternatively, this conversion could be performed in software.

In an exemplary embodiment, the message is added to the Output Queue by adding the pointer to the message buffer in the appropriate location within the Output Queue, then incrementing the appropriate Enqueued_offset with the sending node's Output Queue. The pointer is an offset from the start of the sending node's buffer area. Preferably, offsets are used instead of real or virtual addresses so that all nodes are able to get to the same address in the shared memory. (A receiving node's virtual or real addresses are not necessarily mapped to the same location in memory as another node's virtual or real addresses.)

As previously described with regard to FIGS. 23 and 24, when a 2200 operating system node is sending a message, a call is made to the operating system for a device driver address. The 2200 operating system uses the IP Address to decide whether a NIOP device driver or HMP Shared Memory Driver should be utilized during the communications operation. If an NT node is sending a message, similar functionality is provided. The VLAN component receives the message-send call from NDIS. VLAN passes this call to CONTROL, which determines whether the IP address associated with the message-send operation is mapped to the Ethernet Device Driver, or to the SHM Device Driver, and makes the appropriate device call. The SHM module performs the functionality illustrated in steps 2518-2528.

In order to receive a message, each node in the system performs a loop that checks the Output Queues for each node in the system. In an exemplary embodiment, each node performs this check as if the system is fully configured with the maximum number of eight nodes, even if fewer nodes are available. The Output Queues of the nodes which are not available can be initialized so that it appears that no messages are available. Each node checks its own Output Queue to determine if it is sending a message to itself, even though this will generally not occur. These are design decisions that can be implemented to simplify the code.

Alternatively, the number and identity of the available nodes can be communicated to each node during system initialization so that only the output queues of nodes that are actually present are checked. In this embodiment, each change in the number of nodes participating in shared memory is communicated to the participating nodes when the change occurs.

Figure 26:
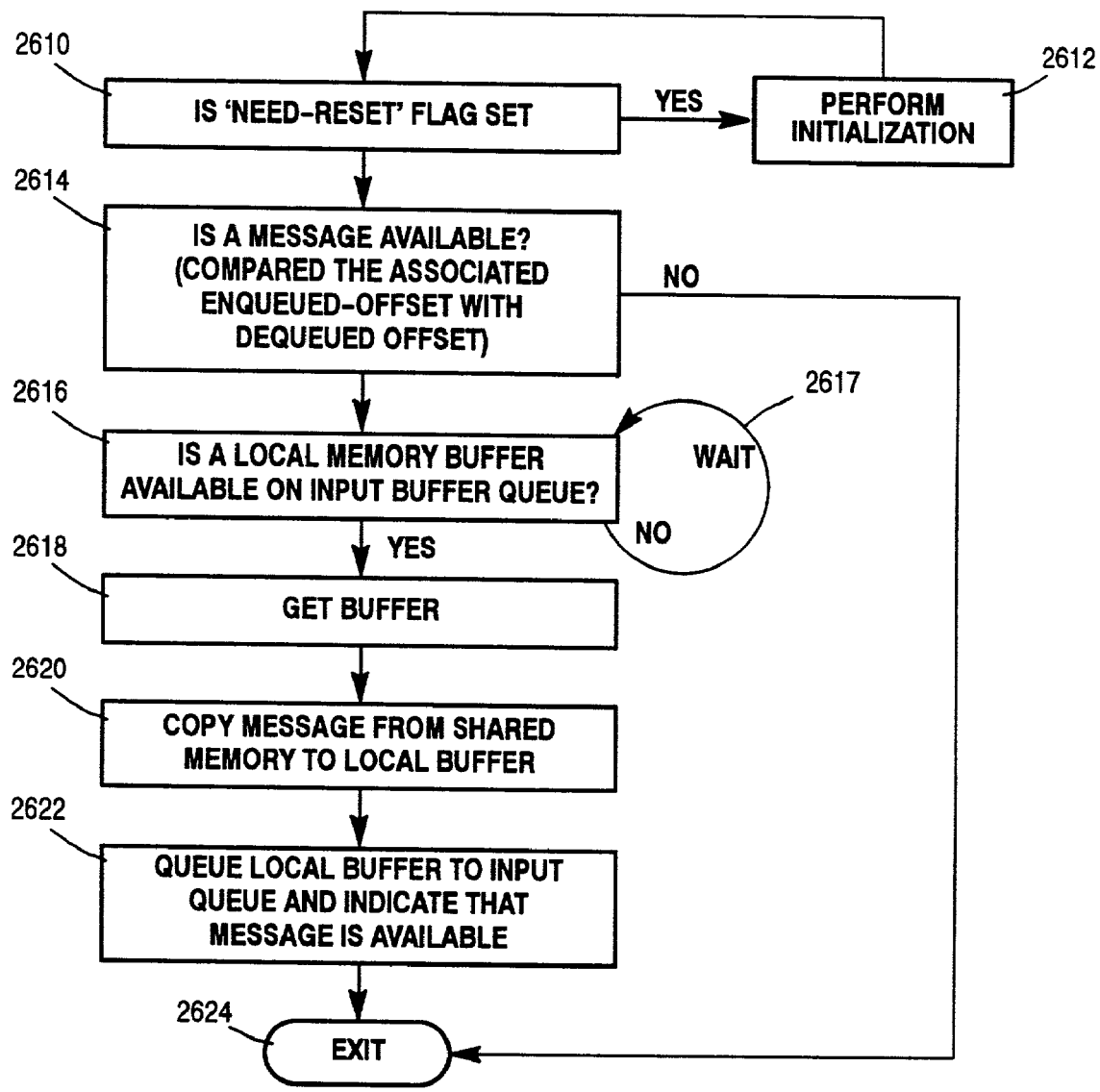
FIG. 26 is a process flowchart that illustrates still further details of the system illustrated in FIG. 22, wherein the system is designed to operate in a 2200 operating system environment.

FIG. 26 illustrates an exemplary message receiving process performed for each partition. The process beings at step 2610, where a message receiving node checks a Need_Reset flag in another sub-Pod's output queue. For example, Node 0 checks the Need_Reset flag in the Node-1-to-Node-0 Queue in the Node 1 Output Queue. If the Need_Reset flag is set, processing proceeds to step 2612, where an initialization sequence is performed.

If the Need_Reset flag is not set, processing proceeds to step 2614 where the message receiving sub-Pod compares an appropriate Enqueued_offset flag with one of its own Dequeued_offset flags in its own Output Queue. For example, in FIGS. 16A and 16B, Node 0 compares the Enqueued_off-set flag in the Node-1-to-Node-0 Queue in the Node 1 Output Queue to the Dequeued_offset for Node 1 in it's own Output Queue (in Word 1 of the Dequeued_offsets). If the values stored within the two fields are equal, the queue is empty and processing proceeds to step 2624, where the routine is exited.

If a message is available, processing proceeds to step 2616 where an available buffer is obtained within local memory. The buffer pool for the Shared Memory Driver can be maintained by the operating system in conjunction with the communications handler, as explained below. If a buffer is not available, a wait loop 2617 can be performed. In step 2618, a buffer is obtained and the Dequeued_offset is used as an offset into the queue to retrieve a pointer to shared memory. The pointer is preferably an offset from the start of the sending sub-Pod's buffer pool. The pointer is used to retrieve the message data from one of the sending sub-Pod's message buffers in shared memory.

In step 2620, the message data is copied to the local buffer. On a NT/UNIX sub-Pod receiving a message from a 2200 operating system, a compaction process can be performed which moves the message bytes into contiguous locations that use all bits (e.g., 64 bits) of a word. This is preferred because 2200 operating system message data occupies only the least-significant four bytes of a word, with the rest being zero-filled. On the 2200 operating system side, the message data can be copied from shared memory using the hardware Block Transfer Unpack (BTU) instruction, which converts message data from 8-bit to 9-bit bytes, and performs little endian (Intel) to big endian (2200 style processor) conversion. This conversion can be performed in software, firmware, hardware, or any combination thereof.

Alternatively, messages can be stored in shared memory in 2200 style processor format, whereby a message receiving Intel platform would convert between big and little endian and add/remove the extra bit needed by the 2200 style processor.

After the message data is copied to a local buffer, processing proceeds to step 2622, where the Shared Memory Driver adds the message to a local memory queue. The Shared Memory Driver can then check to see that a receiving process (e.g., an application 2208) is available to process the message. On the 2200 operating system side, the Shared Memory Driver will check to see if a flag indicates that a co-operative processing communications program (CPCOMM), developed by Unisys Corporation, is "sleeping." The CPCOMM handles communications protocol layers when messages are sent. If CPCOMM is sleeping, the Share Memory Driver makes a call to the operating system to wake CPCOMM up with the newly queued message. Alternatively, polling could be utilized to determine if a message is available in local memory.

Figure 27:
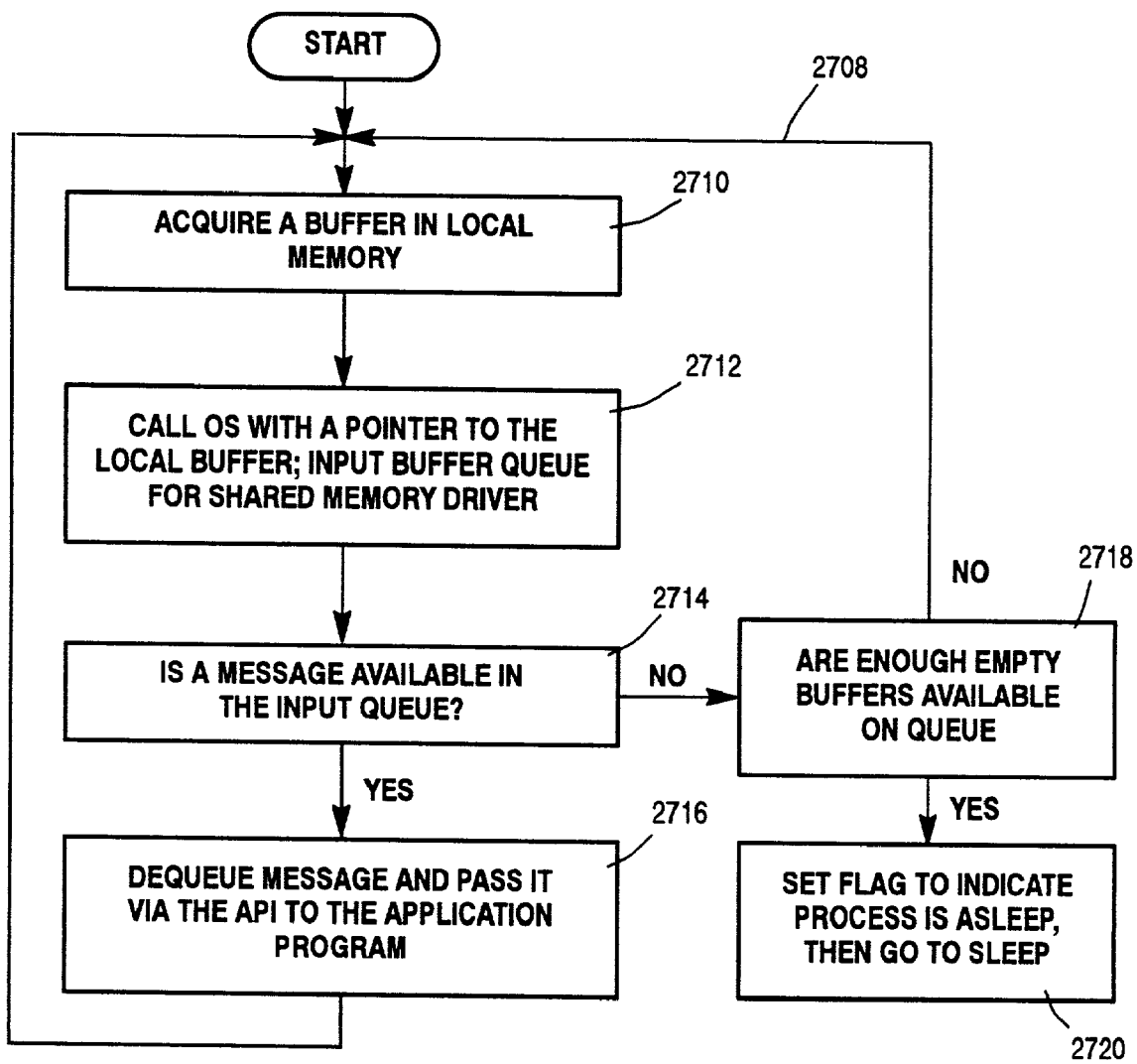
FIG. 27 is a process flowchart that illustrates still further details of the system illustrated in FIG. 22, including details of a co-operative processing communications (CPCOMM) software program.

FIG. 27 illustrates an exemplary process for CPCOMM on the 2200 operating system side that handles receiving messages. As is the case with sending messages, CPCOMM does not know that a received message was transferred through shared memory. From CPCOMM's point of view, all messages are sent/received over a network.

CPCOMM may be "sleeping" when an interrupt is received from the 2200 operating system. This interrupt is the result of the operating system receiving a call from the Shared Memory Driver indicating that a message was queued to CPCOMM's local message queue. When CPCOMM is interrupted, it enters a processing loop 2708. The process begins at step 2710 where a buffer is acquired in local memory. In step 2712, CPCOMM calls the 2200 operating system, passing the buffer address. The 2200 operating system places the buffer in one of the buffer pools associated with one of the device drivers, depending on need. The Shared Memory Device Driver is associated with one of these buffer pools. The buffers in these pools are then available for received message data.

After the buffer address is passed to the operating system, processing proceeds to step 2714, where CPCOMM checks to see if a message is available on its input queue. Assuming the CPCOMM was interrupted from the operating system, a message is available.

In step 2716, when a message is available, CPCOMM dequeues the message from its queue, and passes it to the upper layers of the code. Processing then returns to step 2710, where CPCOMM acquires another buffer.

In step 2714, if CPCOMM finds that no more messages are available, processing proceeds to step 2718, where CPCOMM determines whether enough empty buffers are available for use by the various device drivers. If enough buffers are available, processing proceeds to step 2720 where CPCOMM goes to sleep again.

Figure 34:
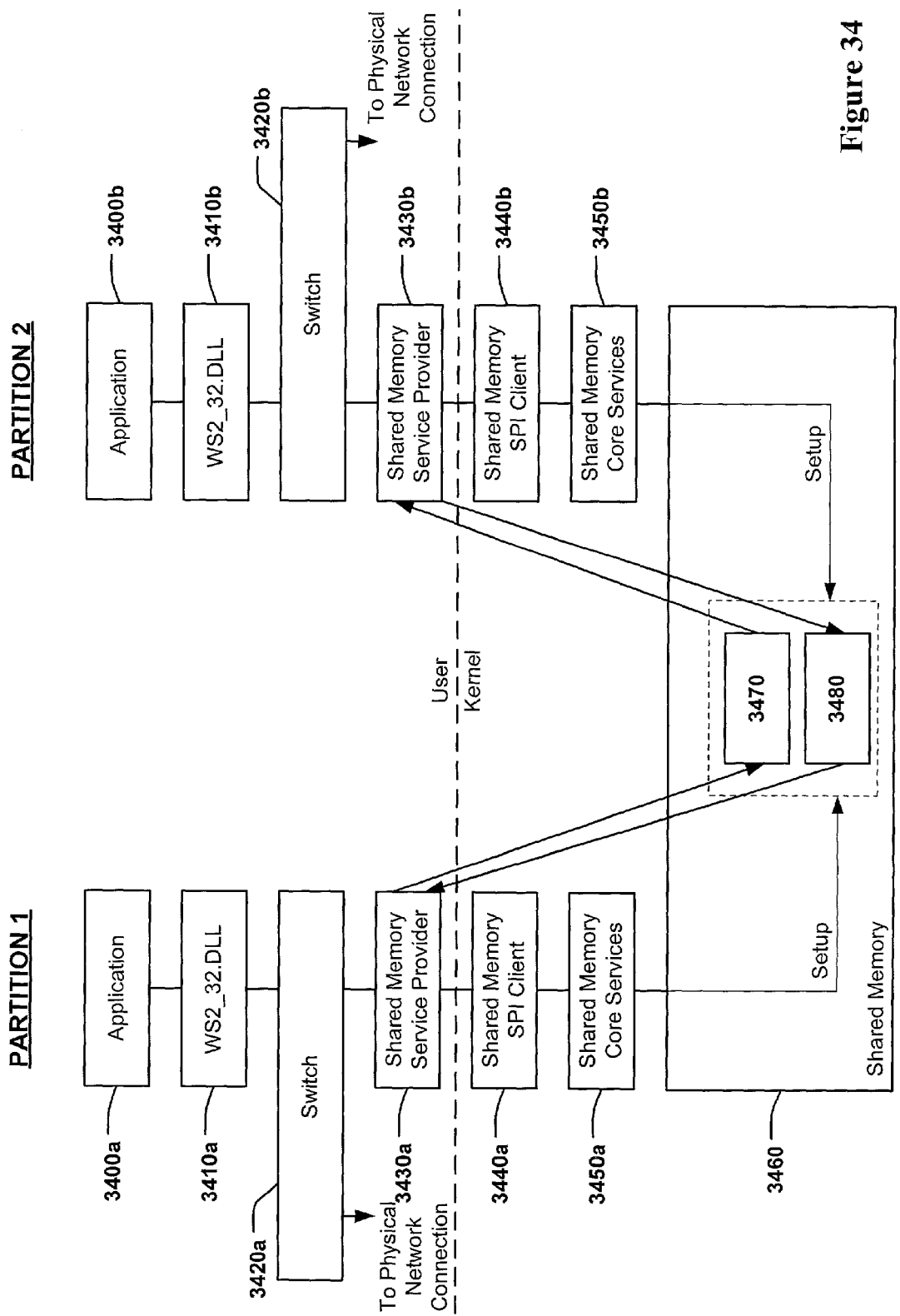
FIG. 34 is a block diagram of a system for emulating network communications between partitions of a computer system, in accordance with another embodiment of the present invention.

FIG. 34 is a block diagram of a system for emulating network communications between partitions of a computer system, in accordance with another embodiment of the present invention. In this embodiment, first software executing on a first partition of a computer system utilizes the shared memory resources of the computer system to initiate the emulation of a network connection through shared memory with second software executing on a second partition. A first application on the first partition can then communicate with a second application on the second partition across the emulated network connection using standard networking application programming interfaces (API), even though there is no physical network. Preferably, the emulated network connection is a TCP socket connection.

Further according to this embodiment, a data structure is used to facilitate the network communications between the first application and the second application. The data structure implements a lockless, circular buffer. One instance of the data structure (e.g., 3470) is created in the shared memory region and used to communicate messages from the first application to the second application, and a second instance (e.g., 3480) is created in the shared memory region to communicate messages from the second application to the first application. These instances of the data structure implement the data path of the emulated socket connection.

Referring to FIG. 34, applications 3400a and 3400b each execute in a different partition of the computer system. Each of the applications 3400a, 3400b may comprise any application that is configured to communicate with another application via a network. Each partition operates under the control of its own operating system. The operating systems on each partition may be different, or they may be different instances of the same operating system. In the exemplary embodiment shown in FIG. 34, each partition of the computer system is operating under the WINDOWS 2000 operating system, however, in other embodiments, other commodity operating systems can be employed.

According to the present invention, in each partition, a user-mode dynamic link library (DLL) 3430, referred to herein as the shared memory service provider DLL, works in combination with a kernel-mode device driver 3440, referred to herein as the shared memory service provider interface (SPI) client, to service requests made by one of the applications 3400a, 3400b to establish network communications (e.g., a socket connection) with the other application on the other partition. The shared memory service provider DLL 3430 and shared memory SPI client device driver 3440 on a given partition are sometimes referred to herein collectively as the "shared memory service provider 3430/3440." The shared memory service provider DLL 3430 will exist in each WINDOWS 2000 process space that needs to open socket connections and will handle any functions that can be performed in user mode for those sockets. The shared memory SPI client device driver 3440 will handle all socket functions that either must be performed in a central location for the partition or must be performed in kernel mode. In the present embodiment, there is one instance of the kernel mode component 3440 for each partition.

An application, such as application 3400a or 3400b, makes a request for network communications via a standard network API provided as part of the operating system services of the partition in which it executes. In accordance with the present invention, the shared memory service provider DLL 3430 interfaces to the standard networking interface components provided by the computer system to service the request made by an application. As described more fully below, the shared memory service provider DLL 3430 and shared memory SPI client device driver 3440 work together to establish data structures in shared memory to emulate the requested network connection through the shared memory of the computer system.

As further illustrated in FIG. 34, in the present embodiment, in which each partition executes the Microsoft WINDOWS 2000 operating system, the standard networking interface provided to each application comprises the WINDOWS 2000 implementation of sockets, referred to as the Winsock dynamic link library 3410 (i.e., WS2_32.DLL). The Winsock DLL 3410 supports sockets-based connections and selects the appropriate service provider that supports the services requested by an application 3400a. Thus, applications that use the standard Winsock application programming interface (API) will be able to open and use sockets by appropriate calls to WS2_32.DLL.

As further illustrated in FIG. 34, in the present embodiment, the Winsock DLL 3410 on a partition forwards requests for socket services to a service provider switch 3420. In the present embodiment, switch 3420 is the Winsock Switch (MSAFD.DLL) supplied by Microsoft Corporation with the WINDOWS 2000 operating system to allow multiple service providers, each of which provide TCP/IP services, to coexist with the standard Microsoft TCP/IP service provider and alternately to service application requests for socket connections. Conventionally, switch 3420 is used to switch an application between a TCP/IP service provider and a system area network (SAN) service provider. However, in the present embodiment, the shared memory service provider 3430/3440 of the present invention acts as another TCP/IP service provider so that application requests for socket connections can be serviced by the shared memory service provider 3430/3440, as desired.

In greater detail, the shared memory service provider DLL 3430, running in user mode, provides a Service Provider Interface (SPI) to the Winsock switch function 3420. Socket creation, shared memory data structure setup, and connection establishment are coordinated with the shared memory SPI client device driver 3440 running in kernel mode. Connection data-path functions are predominately performed by the shared memory service provider DLL 3430 with data (messages) copied into shared memory while in user mode and events signaled via the shared memory SPI client device driver 3440 in kernel mode only when a remote socket is waiting for the local socket. The method and data structures used in the data path, described more fully below, minimize the frequency of user mode to kernel mode transitions.

The shared memory SPI device driver 3440 provides the interface to the Shared Memory Core Services software 3450

(described in Section III.B.) of the exemplary computer system of FIG. 2. Through this interface, the shared memory service provider DLL 3440 allocates/deallocates and maps/unmaps shared memory areas, sends and receives signals to and from other partitions, and receives status changes about shared memory and other partitions, using appropriate calls to the Core Services API described above in Section III.B.10 (e.g., Allocate Shared Memory, Deallocate Shared Memory, Send Signal). The operations are illustrated generally in FIG. 34 by the lines labeled "setup." For example, through the interface to the Core Services API provided by the shared memory SPI client device driver 3440, the shared memory service provider DLL 3440 sets up data areas in shared memory 3460 for message data transfer, including a first data area 3470 for message data to be sent from application 3400a to application 3400b, and a second data area 3480 for message data to be sent from application 3400b to application 3400a. The creation of these data areas 3470, 3480 is described in more detail below. The Allocate Shared Memory, Deallocate Shared Memory, and Send Signal interfaces of the Core Services API are described above in Section III.B.10. A Map interface provided by the Core Services software 3450 makes an allocated shared memory area visible in the address space of a user process, and an Unmap interface removes that visibility. In the context of the present invention, the Map interface is used to make an allocated shared memory area visible in the address space of the user process containing the shared memory service provider DLL 3430, and the Unmap interface is used to remove that visibility.

In addition, the shared memory SPI client device driver 3440 performs functions that must be handled in a central location within the partition. For example, the shared memory SPI client device driver 3440 will match incoming connection requests to waiting sockets that may be in different user mode process environments.

As mentioned above, applications 3400a, 3400b drive the socket functions by making calls through the Winsock API of the WS2_32.DLL 3410. These calls are processed by the WS2_32.DLL 3410 and the Switch 3420 and forwarded to the shared memory service provider DLL 3430, which coordinates with the shared memory SPI client device driver 3440 to perform the functions corresponding to the calls.

Figure 35:
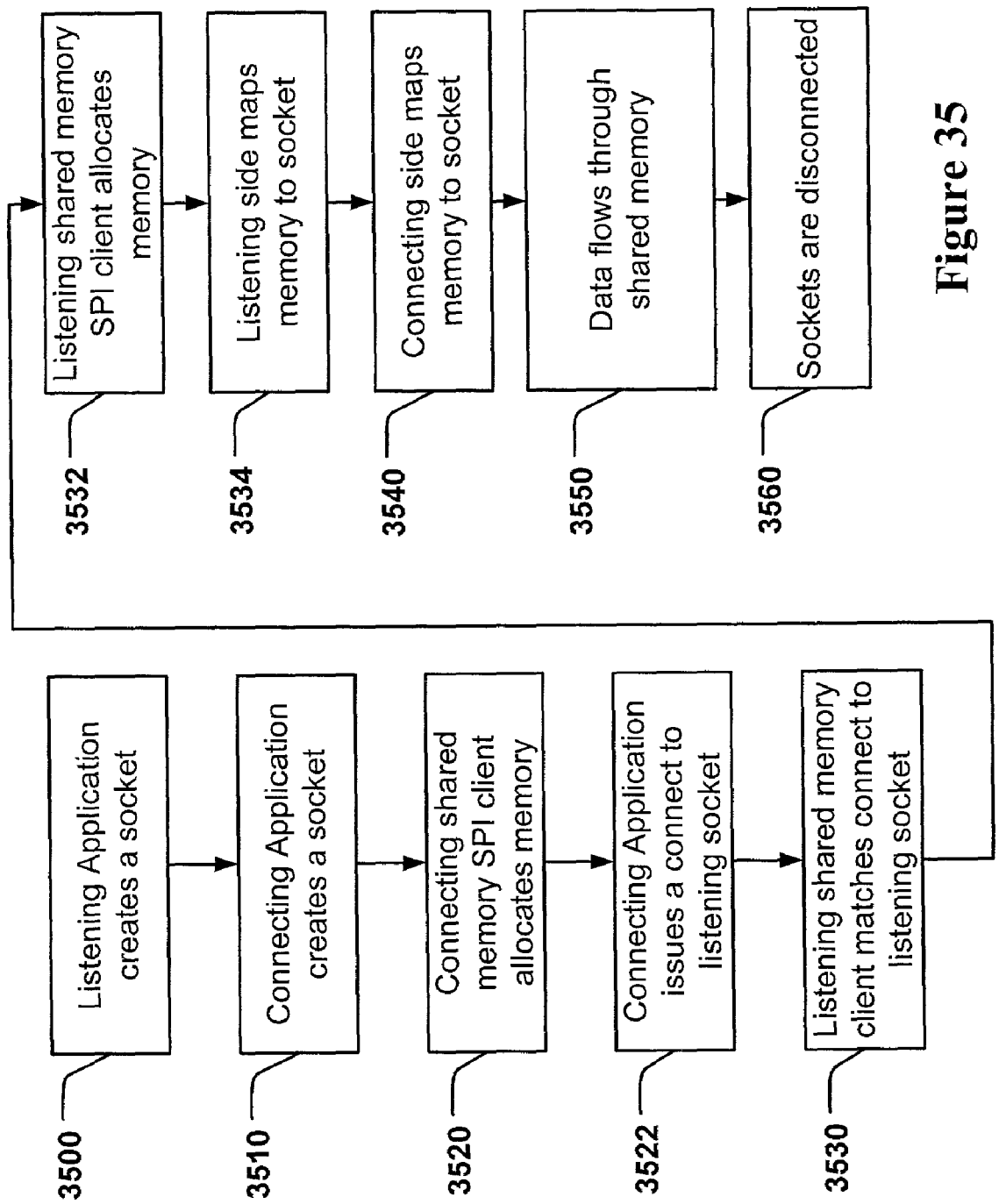
FIG. 35 is a flow diagram providing further details of the operation of the system of FIG. 34, as well as one embodiment of a method of the present invention.

FIG. 35 is a flow diagram illustrating the steps performed by the system of FIG. 34 in setting up, using and closing a socket connection, in accordance with the present embodiment of the invention. An application that initiates a socket connection with another application over a network is said to be on the connecting side of the socket, whereas the application to which the socket connection is made is said to be on the listening side of the socket. An application on the listening side of a socket connection must be in a "listen" mode in order for another application to establish a socket connection with it. For the purposes of description of FIG. 35, assume that application 3400a is on the listening side of the socket being created and that application 3400b is on the connecting side of the socket.

As shown in FIG. 35, at step 3500, on the listening side, application 3400a uses the Winsock API to request creation of a socket, to bind the socket to a port number/IP address, and to then enter a listen mode to "listen" for incoming connections. Specifically, the application 3400a uses a "Create" command of the Winsock API to initiate the creation of a socket, a "Bind" command to bind the socket to a port number/IP address, and a "Listen" command to enter a listen mode. In accordance with the present invention, these commands are passed through the WS2_32.DLL 3410a and Switch 3420a to the shared memory service provider DLL 3430a which together with the shared memory SPI client device driver 3440a, service these commands. In response to the Create command, the shared memory service provider DLL 3430a sets up appropriate local data structures to manage the socket and informs the shared memory SPI client 3440a of the socket. The shared memory SPI client device driver 3440a also sets up appropriate local socket structures that it needs to manage the socket. The port number/IP address to which the socket is bound is identified to the shared memory service provider DLL 3430a from the Bind command. When the shared memory service provider DLL 3430a receives the Listen command, it informs the shared memory SPI client device driver 3440a so that the shared memory SPI client device driver 3440a is prepared to try to match incoming connection requests to the newly created, waiting socket.

At step 3510, application 3400b requests that a socket connection be established with the application 3400a on the listening side. The request will include the IP address to which the waiting socket on the listening side is bound. Again, the request to establish the socket connection is made in accordance with the Winsock API. Specifically, application 3410b uses the Create and Bind commands to create the socket and bind it to a port number/IP address on its partition. The shared memory service provider DLL 3430b and shared memory SPI client device driver 3440b on the connecting side respond to these commands by setting up appropriate local data structures to manage the socket connection.

At step 3520, the requesting application 3410b uses a "Connect" command of the Winsock API to initiate the connection process. The destination IP address of the connect request is passed as a parameter, along with the port number/IP address of the socket created on the connecting side. In response to the Connect command, the shared memory service provider DLL 3430b coordinates with the shared memory SPI client 3440b to allocate, map and initialize a shared memory data area 3480 to be used by the connecting side to send data to the listening side over the socket connection.

At step 3522, the shared memory SPI client 3440b selects a destination partition based upon the destination IP address provided by the connecting application 3400b as a parameter of the Connect command. The shared memory SPI client 3440b then sends a connect message to the shared memory SPI client 3440a on the listening side using the Core Services API 3450a/3450b. The location of the allocated shared memory data area 3480 is passed with the connect message.

At step 3530, the listening side shared memory SPI client 3440a matches the connect message to one of the listening sockets, if possible. If no match is found, a rejection of the connect is returned to the shared memory SPI client 3440b, which indicates failure of the connect attempt through the shared memory service provider DLL 3430b to the application 3400b.

If the connect matches a listening socket, e.g., the listening socket created in step 3500, then at step 3532, the shared memory SPI client 3440a on the listening side allocates (again using the Core Services API) the listening side send data area 3470 in shared memory.

At step 3534, the shared memory SPI client 3440a maps both data areas 3470 and 3480 into the listening socket process space, initializes the listening side send data area, and returns a "connected" indication (with an identification of both data areas) to the connecting side shared memory SPI client 3440b, and informs the respective shared memory service provider DLL 3430a of the connect. The shared memory service provider DLL 3430a completes any processing on its local data structures to manage shared memory areas 3470 and 3480 and informs the application 3400*a* of the connect.

At step 3540, connecting shared memory service provider 3430*b* and connecting shared memory SPI client 3440*b* map the remote send data area 3480 into the connecting socket process space and inform connecting application 3400*b*. The shared memory service provider DLL 3430*b* likewise completes any processing on its local data structures to manage the shared memory areas 3470, 3480.

At step 3550, the respective shared memory service provider DLLs 3430*a*, 3430*b* manage the flow of data through the shared memory data areas 3470, 3480 in both directions with synchronization maintained in the shared memory data areas 3470, 3480, as described in more detail below. Any interrupts needed during this process are sent by the respective shared memory SPI client device driver 3440*a*, 3440*b* using the Core Services API 3450.

Figure 36:
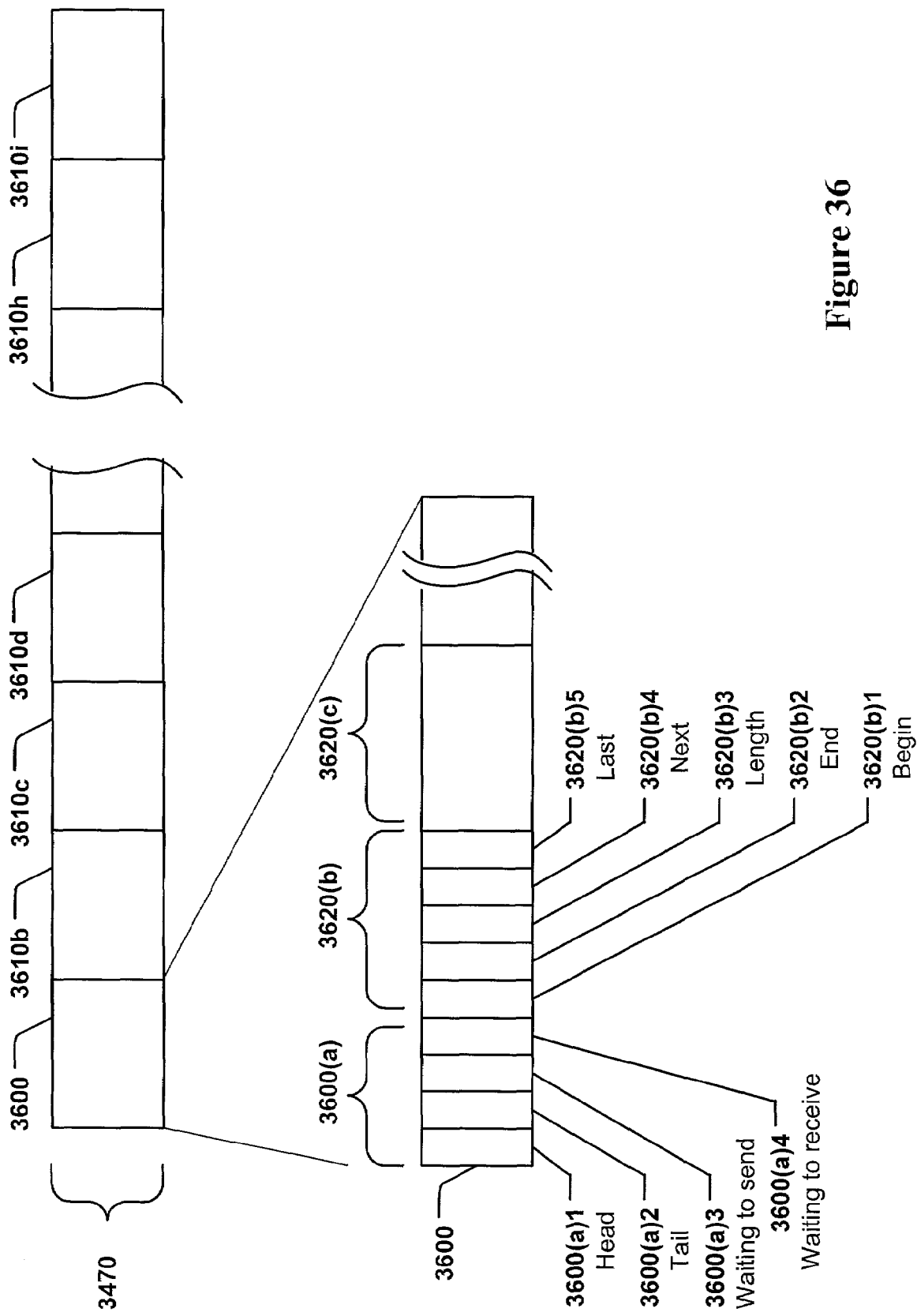
FIG. 36 is a diagram of a data structure for use in emulating network communications between partitions of a computer system, in accordance with the embodiment of FIGS. 34 and 35.

At step 3560, a disconnection may be initiated by either side and the shared memory service provider DLL 3430 and shared memory SPI client device driver 3440 on that side coordinate the disconnection (including deallocating and unmapping the data areas 3470, 3480) through signals sent via the Core Services software 3450. FIG. 36 is a diagram providing further details of one embodiment of the data structure of the data areas 3470, 3480, in accordance with a further aspect of the present invention. As shown in FIG. 36, the data structure includes a control segment 3600 and a plurality of data segments 3610. Additional features of the data structures can be added if desired for other purposes, and the order can be altered for other systems, without going beyond the teachings of this invention. Control segment 3600 is for storing information for controlling reading and writing of data in the plurality of data segments 3610. Each of the plurality of data segments 3610 is used for storing a network message or a portion of a network message. In the present embodiment, the plurality of data segments are arranged in a linked list forming a circular buffer. Collectively, the plurality of data segments must provide sufficient space to accommodate the largest network message that may be received. In the example of FIG. 36, there are eight data segments 3610*b*-3610*i*, addressed zero through seven, each of which is four kilobytes in size. However, in other embodiments, there may be more or less than eight data segments 3610, and the data segments may have larger or smaller sizes. For example, in one embodiment, there may be 31 data segments, each of which is 4 kilobytes in size.

Control segment 3600 includes a first portion 3600(*a*) and a plurality of second portions 3620(*b*) through 3620(*i*). First portion 3600(*a*) is for storing information for controlling reading and writing data in the plurality of data segments 3610. Each second portion 3620 corresponds to a respective one of the data segments 3610 and is for storing information for controlling reading and writing data in that corresponding data segment 3610. For example, second portion 3620(*b*) corresponds to data segment 3610*b*, second portion 3620(*c*) corresponds to data segment 3610*c*, etc.

First portion 3600(*a*) includes a first field 3600(*a*)1 for storing an indication of the data segment containing the most recently written network message, a second field 3600(*a*)2 for storing an indication of the data segment containing the earliest written, but not read, network message, an optional third field 3600(*a*)3 for storing an indication that an application is waiting to send a network message, and an optional fourth field 3600(*a*)4 for storing an indication that an application is waiting to receive a network message.

First field 3600(*a*)1, or the "head" index, may contain an indication of the data segment 3610 containing the most recently written network message. For example, if the most recent network message was written to data segment 3610*c*, then head index may contain a one indicating that data segment 3610*c* contains the most recently written network message. As network messages are written to the data structure, they are written in the next consecutive empty data segment and the head index is incremented by one. That is, in this example, the next network message is written to data segment 3610*d* and the head index is incremented by one. In this manner, the head of the network messages consecutively moves to the next data segment. After a network message is written in the next to last data segment (i.e., data segment 3610*h*), the head index is set to zero and the next network message is attempted to be written in first data segment 3610*b*. In this manner, a circular buffer is implemented.

Second field 3600(*a*)2, or the "tail" index, may contain an indication of the data segment containing the earliest written, but not read, network message. As network messages are removed from the data structure, the tail index is incremented by one. After a network message is read from the next to last data segment (i.e., data segment 3610*h*), the tail index is set to zero and the next network message is attempted to be read from first data segment 3610*b*. In this manner, the head and tail of the network messages is known.

In the present embodiment, the head index is not incremented and the tail index is not incremented until the entire message of a data segment 3610 is read or written. In this manner, a "lockless" protocol is implemented. That is, an application need not request a lock to read or write to and from the circular buffer. The application simply adjusts the head index or tail index accordingly after the application has completed its read or write. No handshaking is implemented between applications and there is no need to recover from lost locks.

Optional third field 3600(*a*)3 may contain an indication that the first application is waiting to send a network message. Optional fourth field 3600(*a*)4 may contain an indication that an application is waiting to receive a network message. The sending and receiving programs may operate in either polled or interrupt mode. In polled mode, the receiving program regularly polls the circular buffer to determine if there are network messages for the receiving program. In interrupt mode, the receiving program waits for an interrupt from a sending program to determine if there are network messages for the receiving program. Third field 3600(*a*)3, or the "waiting to send" field, is set if the circular buffer is full (i.e., each data segment 3610, except for the last data segment, contains a network message) and the sending program is waiting to send a network message. After the receiving program reads a network message, the receiving program resets the waiting to send field. Fourth field 3600(*a*)4, or the "waiting to receive" field, is set if the application needs an interrupt to resume reading data received into a data area 3470, 3480. This field is not used in polled mode.

Each second portion 3620(*b*) . . . 3620(*i*) corresponds to, and contains information concerning, a respective one of the plurality of data segments 3610*b* . . . 3610*i*. For a given data segment 3610*b* . . . 3610*i*, the corresponding second portion 3620(*b*) . . . 3620(*i*) includes a first field, e.g., 3620(*b*)1, for storing an indication of the beginning of network message data within the data segment, a second field, e.g., 3620(*b*)2, for storing an indication of the end of network message data within the data segment, a third field, e.g., 3620(*b*)3, for storing a length of the network message data within the data segment, a fourth field, e.g., 3620(*b*)4, for storing an indication of the next data segment in the linked list of data segments that comprise the circular buffer, and a fifth field, e.g.,

3620(b)5, for storing an indication that the data segment is the last data segment of a particular network message.

In greater detail, with reference in FIG. 35 to second portion 3620(b) which corresponds to data segment 3610b, first field 3620(b)1, or the "begin" field, may contain an indication of the beginning of network message data within that data segment. Second field 3620(b)2, or the "end" field, may contain an indication of the end of the network message data within that data segment. For example, with a four kilobyte data segment and a four kilobyte network message in the data segment, first field 3620(b)1 may contain a number representing 0 (the beginning of the message in the data segment) and second field 3620(b)2 may contain a number representing four kilobytes (the end of the message in the data segment).

Third field 3620(b)3, or the "length" field, may contain an indication of the length of the network message data within the data segment. For example, with a four kilobyte data segment and a four kilobyte message in the data segment, third field 3620(b)3 may contain a number representing four kilobytes. Third field 3620(b)3 is optional and may be used for error checking purposes.

Fourth field 3620(b)4, or the "next" field, may contain an indication of the next data segment in the linked list of data segments that comprise the circular buffer.

A network message may be larger than the size of a single data segment, and if so, the network message can be divided into smaller portions that are then written over a plurality of consecutive data segments 3610. Fifth field 3620(b)5, or the "last" field, identifies this data segment as the last data segment of the particular network message. In this manner, a receiving program may identify the end of a network message that spans a plurality of data segments. Fourth field 3620(b)4 and fifth field 3620(b)5 may be optional if the size of each data segment is larger than the largest network message.

Figure 37:
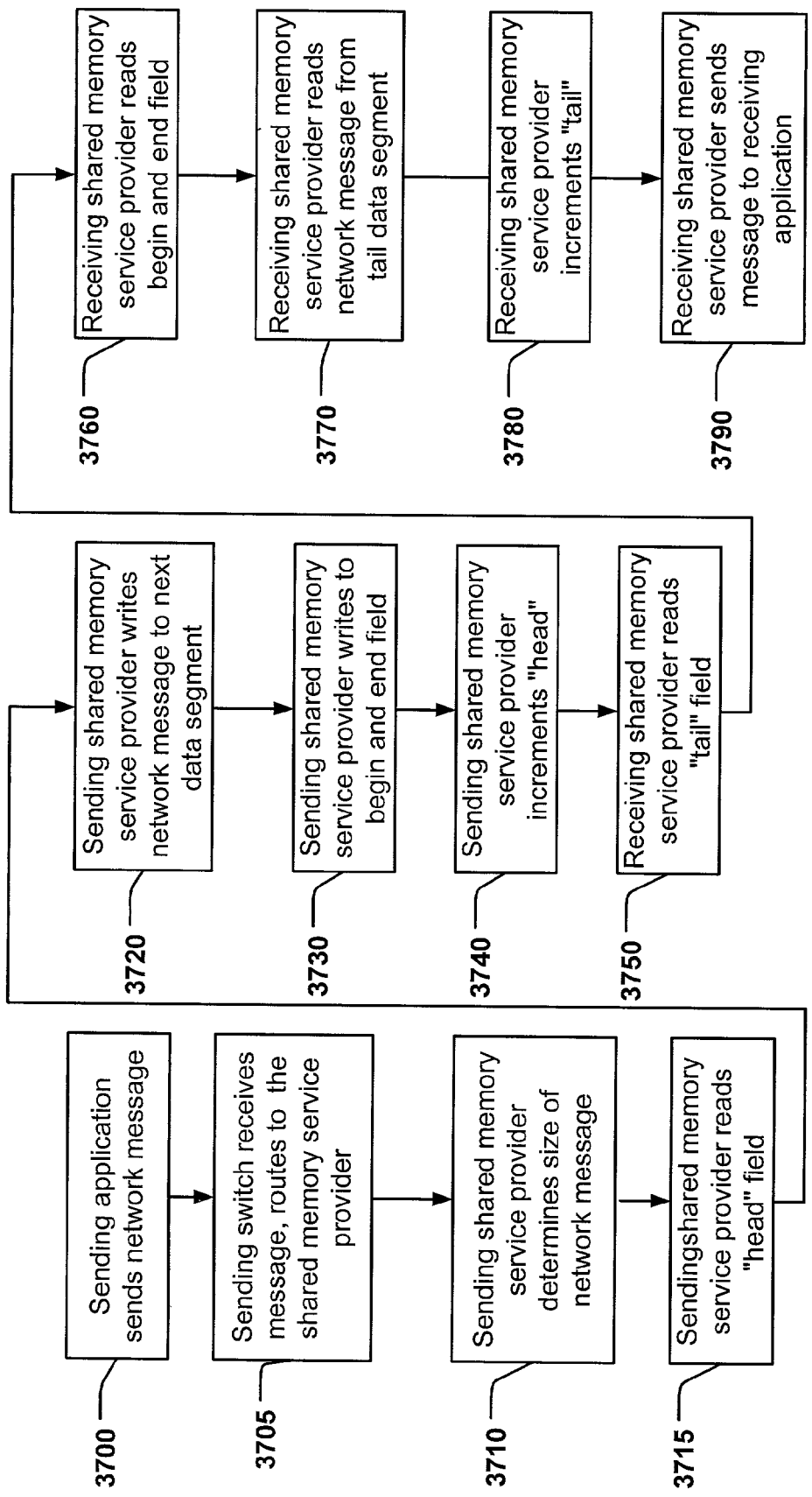
FIG. 37 is a flow diagram of a method for emulating network communications between partitions of a computer system and illustrating the use of the data structure of FIG. 36 and the system of FIG. 34, in accordance with the embodiment of those Figures.

FIG. 37 is a flow diagram illustrating the use of the data structure of FIG. 36, as implemented in data areas 3470 and 3480, by the respective shared memory service provider DLLs 3430a and 3430b, in accordance with an embodiment of the present invention. For purposes of illustration, the use of the data structure of FIG. 36 is described in the context of step 3550 of FIG. 35. Assume for purposes of illustration that application 3400a is sending a network message and that application 3400b is receiving the message.

As shown in FIG. 37, at step 3700, sending application 3400a sends a network message through WS2_32.DLL 3410a and switch 3420a, using the Winsock API in a conventional manner.

At step 3705, the switch 3420a receives the message and routes the message to sending shared memory service provider 3430a rather than to a physical network based on the destination IP address in the original Winsock API call.

At step 3710, sending shared memory service provider 3430a determines the size of the network message.

At step 3715, sending shared memory service provider 3430a reads head field 3600(a)1 of data area 3470 to determine where to write the network message. For example, if the head field contains a one (e.g., indicating the head index is at data segment 3610c), sending shared memory service provider 3430a writes the network to the next consecutive data segment (e.g., data segment 3610d).

At step 3720, sending shared memory service provider 3430a writes the network message to the next data segment (e.g., data segment 3610d) as determined in step 3715.

At step 3730, sending shared memory service provider 3430a writes to begin field 3620(d)1 and end field 3620(d)2. For example, if the network message is four kilobytes and the data segment is also four kilobytes, then sending shared memory service provider 3430a writes a zero to begin field 3620(d)1 and four kilobytes to end field 3620(d)2.

At step 3740, sending shared memory service provider 3430a increments the head index in head field 3600(a)1 to two. At this point, the network message is contained in shared memory the shared memory data area 3470, even though, from the perspective of the sending application 3400a, the message appears to have been sent via a conventional, physical network connection. Sending shared memory service provider 3430a either sends an interrupt to the receiving shared memory SPI client 3440b or the client 3440b may poll the shared memory data area 3470 to determine if a message is contained therein. The polled mode and interrupt mode are described in more detail below.

In either event, at step 3750, the receiving shared memory service provider 3430b reads tail field 3600(a)2 to determine where to read the network message. For example, if a network message is contained in data segment 3610c and 3610d, the tail field may contain a one. The receiving shared memory service provider 3430b uses this indication to locate the data in the data structure (e.g., data segment 3610c).

At step 3760, the receiving shared memory service provider 3430b reads begin field 3620(c)1 and end field 3620(c)2 to determine further the size and location of the network message within the data segment.

At step 3770, the receiving shared memory service provider 3430b reads the network message in the tail data segment (e.g., data segment 3610c) according to the values in the begin field 3620(c)1 and end field 3620(c)2.

At step 3780, the receiving shared memory service provider 3430b increments the tail index in tail field 3600(a)2.

At step 3790, the receiving shared memory service provider 3430b passes the message to the receiving application 3400b. From the receiving application 3400b's perspective, it receives a conventional network message, even though the message arrived via shared memory 3460 rather than a physical network.

In poll mode, each shared memory service provider 3430 regularly performs steps 3750 and 3760. If the head field 3600(a)1 and the tail field 3600(a)2 contain identical values, shared memory service provider 3430 does not read data from a data area 3470, 3480. If the head field 3600(a)1 and the tail field 3600(a)2 contain different values, shared memory service provider 3430 reads a data area 3470, 3480 in accordance with steps 3770 through 3790.

In interrupt mode, most of the processing of the data transfer is handled in user mode by the shared memory service providers 3430. Any processing done by the shared memory SPI clients in kernel mode is explicitly pointed out in the following description. There are two ways of sending data in the interrupt mode, designated "normal" and "RDMA," respectively. "Normal" send is typically used for shorter messages. A pool of buffers at the receiving switch 3420 buffers these shorter messages before forwarding them to the receiving application 3400. RDMA send is used for larger messages. In this case, the pool of buffers is bypassed and the data is copied directly into a data area of the receiving application 3400.

In the "normal" send case, if there is room in the shared memory send area (e.g., 3470 or 3480), the data is immediately copied into the data area 3470, 3480 and a successful status is returned to the sending application 3400. If there is not enough room in the data area, as much of the data as possible is copied into the data area. The send is then held until all of the data can be copied, at which point a delayed completion is returned to the sending application, which requires a transition into NT kernel mode to cause the event.

If the data fills the data area and there is more data to send, the sending shared memory service provider DLL will set a status in the data area 3470, 3480 and wait for the receiving shared memory service provider DLL 3430 to remove data and return an interrupt (via the shared memory SPI client device driver 3440) to wake up the sending shared memory service provider DLL 3430. The interrupt will be "ping-ponged" (exchanged repeatedly) between the sending and receiving sides until all of the data is copied. It is not expected that "normal" sends will "ping-pong" on a single message, as shared memory will typically be sufficiently available to handle such small messages.

If the status field in the data area 3470, 3480 indicates that the receiving side is waiting to read data, an interrupt is sent to the receiving side via the sending shared memory SPI client device driver 3440. At this point, the receiving side shared memory service provider DLL 3430 wakes up to read data from the shared memory data area 3470, 3480 into a waiting local buffer. If the status field in the shared memory data area 3470, 3480 indicates that the sending side is waiting to copy more data to the shared memory data area, an interrupt is returned via the shared memory SPI client device driver 3440.

On the receiving side, the shared memory service provider DLL 3430 copies received messages immediately into one of the receive buffers in a pool that is set up by the Switch 3420. If there are no available buffers in the pool, then the shared memory service provider DLL 3430 will keep the message in shared memory data area 3470, 3480 until a buffer becomes available. This method effects a back pressure flow control to the sending side if the shared memory area 3470, 3480 fills up.

The RDMA send is very similar to the "normal" send, with the added step of the Switch 3420 dynamically setting up a receive area and communicating the receive area address to the sender using normal send messages. The sending shared memory service provider DLL 3430 puts the receive area address into the shared memory data area 3470, 3480 for the receive shared memory service provider DLL 3430 to use in the copy process. Ping-ponging of interrupts and back pressure flow control are identical to the "normal" send case.

VI. CONCLUSIONS

It should be understood that embodiments of the present invention can be implemented in hardware, software or a combination thereof. In such embodiments, various components and steps can be implemented in hardware, firmware and/or software to perform the functions of the present invention. Any presently available or future developed computer software language and/or hardware components can be employed in such embodiments of the present invention.

While the invention has been particularly shown and described with reference to various embodiments thereof, it will be understood by those skilled in the art that various changes in form and details may be made therein without departing from the spirit and scope of the invention. For example, while in some of the described embodiments, the emulated network connection is a socket connection, in other embodiments other types of network connections can be emulated. Additionally, the present invention is by no means limited to use in the operating system environments discussed above, but rather, can be implemented in connection with any operating system that provides network communication facilities. Moreover, while the present invention has been described in the context of one example of a partitionable server or computer system, it is understood that the present invention can be employed in any partitionable server or computer system in which applications may execute in different partitions and wherein the computer system enables at least two partitions to have shared access to at least one region or window of memory.

What is claimed is:

1. A method for communicating between first and second applications executing on respective first and second independent partitions of a partitionable computer system, wherein each of said first and second partitions operates under the control of a separate operating system, and wherein said first and second applications are configured to communicate with each other via a physical network using standard network interfaces without the need for providing an external network connection therebetween; said method comprising:

receiving a request made by said first application for establishing a network connection with said second application for sending a message thereto; and in response to said request, establishing an emulated network connection between said first and said second applications through a shared memory region of the computer system shared by said first and said second partitions, wherein said establishing communication between said first and second applications includes:

creating a data structure in said shared memory region comprising a plurality of data segments for use in sending a message from said first application to said second application, wherein the data structure comprises:

a plurality of data segments, each of the plurality of data segments for storing network message data to be sent from a sending shared memory service provider to a receiving shared memory service provider;

a control segment for controlling reading and writing of data in the plurality of data segments, the control, segment comprising:

a first portion comprising:

a first field for storing an indication of the data segment containing the most recently written network message data; and a second field for storing an indication of the data segment containing the earliest written, but not read, network message data; and a plurality of second portions, each Second portion corresponding to one of the plurality of data segments for control of the data segment, each second portion comprising:

a first field for storing an indication of the beginning of network message data within the data segment; and a second field for storing an indication of the end of network message data within the data segment;

said establishing being such that said emulated network connection permits said first and second applications to communicate with each other via said emulated network connection using standard network interfaces even though there is no physical network therebetween;

said establishing also being such that the receiving of a message by said second application from said first application via said emulated network connection appears to said second application as having been sent via an external physical network even though there is no external physical network, wherein said emulated network connection requested by said first application comprises a network socket connection, and wherein the step of establishing a connection through the shared memory region comprises establishing a connection through the shared memory region that emulates a network socket connection.

2. The method of claim 1, wherein the step of establishing an emulated socket connection between the first partition and the second partition further comprises performing the following steps on the second partition:
(a) creating an emulated socket connection on behalf of the second application to listen for attempts to connect thereto;
(b) receiving a connect message from the first partition that identifies a memory location of the shred memory region at which the first partition has allocated a first data area to serve as a buffer for transferring data from the first partition to the second partition;
(c) matching the received connect message to the listening socket created in step(a);
(d) allocating a second data area in the shared memory region to serve as a buffer for transferring data from the second partition to the first partition;
(e) mapping both the first and second data areas into a process space of the listening socket;
(f) initializing the second data area; and
(g) returning a connected indication to the first partition and informing the application on the second partition that the emulated socket connection has been established.

3. The method of claim 2, further comprising performing the following steps on the first partition:
(a') receiving the request from the first application to establish the socket connection with the second application.
(b') creating an emulated connecting socket;
(c') allocating the first data area in the shared memory region;
(d') sending the connect message to the second partition that identifies the memory location of the shared memory region at which the first data area has been allocated; and
(e') upon receipt of the connected indication from the second partition, mapping the first and second data areas into a process space of the connecting emulated socket to establish the emulated socket connection between the first and second partitions.

4. The method recited in claim 1, wherein sending a message from said first application to said second application includes:
writing, from the first partition on behalf of the first application, a message to one or more of said data segments, as needed, and updating an indication of the data segment containing the most recently written portion of the message;
reading from the second partition on behalf of the second application, a message from said one or more data segments and updating an indication of which data segments have been read from the data structure; and
providing the message read from the data structure to the second application in accordance with an API associated with the requested network connection.

5. The method of claim 4, wherein said plurality of data segments form a circular buffer, and wherein updating an indication of the data segment containing the most recently written portion of the message comprises incrementing a head index.

6. The method of claim 5, wherein updating an indication of which data segments have been read from the data structure comprises incrementing a tail index.

7. The method of claim 6, further comprising polling, by the receiving partition, the shared memory region to determine if the message has been written to the shared memory region.

8. The method of claim 7, further comprising receiving, by the receiving partition, an interrupt initiated by the sending partition and indicating that the message has been written to the shared memory region.

9. The method of claim 1, further comprising:
creating in the shared memory region, a plurality of output queues, one for each of said first second partitions, the output queue for a given partition indicating whether that partition has placed in the shared memory region a message intended for any of the other partitions and if so, identifying a buffer containing the message, each partition polling the output queues of other partitions to determine whether those other partitions have placed any messages intended for it in the shared memory region;
receiving at the first partition from the first application, said request to send a message to the second application via the emulated network connection;
writing, in response to the received request, the message to an available buffer in the shared memory region and indicating in the output queue of the first partition that the message has been written thereto;
determining, at the second partition, from the output queue of the first partition, that the message has been placed in the available buffer and retrieving the message from the available buffer; and
providing the message read from the data structure to the second application in accordance with an API associated with the requested network connection.

10. A computer readable medium having program code store thereon for communicating between first and second applications executing on respective separate independent partitions of a partitionable computer system, wherein each of said first and second partitions operates under the control of a separate operating system, and wherein said first and second applications are configured to communicate with each other via a physical network using standard network interfaces, and wherein said program code, when executed, causes performance of the following:
receiving a request made by said first application for establishing a network connection with said second application for sending a message thereto; and
in response to said request, establishing an emulated network connection between said first and said second applications through a shared memory region of the computer system shared by both said first arid second partitions, wherein said establishing communication between said first and second applications includes:
creating a data structure in said shared memory region comprising a plurality of data segments for use in sending a message from said first application to said second application, wherein the data structure comprises:
a plurality of data segments, each of the plurality of data segments for storing network message data to be sent from a sending shared memory service provider to a receiving shared memory service provider;
a control segment for controlling reading and writing of data in the plurality of data segments, the control, segment comprising:
a first portion comprising:
a first field for storing an indication of the data segment containing the most recently written network message data; and
a second field for storing an indication of the data segment containing the earliest written, but not read, network message data; and a plurality of second portions, each Second portion corresponding to one of the plurality of data segments for control of the data segment, each second portion comprising:

a first field for storing an indication of the beginning of network message data within the data segment; and a second field for storing an indication of the end of network message data within the data segment;

said establishing being such that said emulated network connection permits said first and second applications communicate with each other using standard network interfaces even though there is no physical network therebetween;

said establishing also being such tat the receiving of a message by said second application from said first application via said emulated network connection appears to said second application as having been sent via an external physical network even though there is no external physical network, wherein said emulated network connection requested by said first application comprises a network socket connection, and wherein the step of establishing a connection through the shared memory region comprises establishing a connection through the shared memory region that emulates a network socket connection.

11. The method recited in claim 10, wherein sending a message from said first application to said second application includes:

writing, from the first partition on behalf of the first application, a message to one or more of said data segments, as needed, and updating an indication of the data segment containing the most recently written portion of the message;

reading from the second partition on behalf of the second application, a message from said one or more data segments and updating an indication of which data segments have been read from the data structure; and providing the message read from the data structure to the second application in accordance with an API associated with the requested network connection.

12. The method of claim 10, wherein establishing an emulated socket connection between the first partition and the second partition further comprises performing the following steps on the second partition:

(a) creating an emulated socket connection on behalf of the second application to listen for attempts to connect thereto;

(b) receiving a connect message from the first partition that identifies a memory location of the shared memory region at which the first partition has allocated a first data area to serve as a buffer for transferring data from the first partition to the second partition;

(c) matching the received connect message to the listening socket created in step (a);

(d) allocating a second data area in the shared memory region to serve as a buffer for transferring data from the second partition to the first partition;

(e) mapping both the first and second data areas into a process space of the listening socket;

(f) initializing the second data area; and (g) returning a connected indication to the first partition and informing the application on the second partition that the socket connection has been established.

13. The method of claim 12, wherein the step of establishing a connection further comprises performing the following steps on the first partition:

(a') receiving the request from the first application to establish the socket connection with the second application;

(b') creating a connection socket;

(c') allocating the first data area in the shared memory region;

(d') sending the connect message to the second partition that identifies the memory location of the shared memory region at which the first data area has been allocated; and (e') upon receipt of the "connected" indication from the second partition, mapping the first and second data areas into a process space of the connecting socket to establish the socket connection between the first and second partitions.

14. The computer readable medium of claim 10, wherein said plurality of data segments form a circular buffer, and wherein updating an indication of the data segment containing the most recently written portion of the message comprises incrementing a head index.

15. The computer readable medium of claim 10, wherein updating an indication of which data segments have been read from the data structure comprises incrementing a tail index.

16. The computer readable medium of claim 15, wherein the program code, when executed, further causes the processor to poll, by the receiving partition, the shared memory region to determine if the message has been written to the shared memory region.

17. The computer readable medium of claim 16, wherein the program code, when executed, further causes the processor to receive, by the receiving partition, an interrupt initiated by the sending partition and indicating tat the message has been written to the shared memory region.

18. The computer readable medium of claim 10, wherein the program code, when executed, further causes performance of the following:

creating, in the shared memory region, a plurality of output queues, one for each of said first and second partitions, the output queue for a given partition indicating whether that partition has placed in the shared memory region a message intended for any of the other partitions and if so, identifying a buffer containing the message, each partition polling the output queues of the other partitions to determine whether those other partitions have placed any messages intended for it in the shared memory region;

receiving at the first partition from the first application, said request to send a message to the second application via the requested type of network connection;

writing, in response to the received request, the message to an available buffer in the shared memory region and indicating in the output queue of the first partition that the message has been written thereto;

determining, at the second partition, from the output queue of the first partition that the message has been placed in the buffer and retrieving the message from the buffer; and providing the message read from the data structure to the second application in accordance with an API associated with the requested network connection.

19. A computer system comprising:

a plurality of processors, said plurality of processors being configured so as to provide at least first and second separate independent partitions within the computer system, each of said first and second partitions operating under the control of a separate operating system, said first partition providing for executing a first application and said second partition providing for executing a second application, each of said first and second applications being configured to communicate with the other application via a physical network using standard network interfaces;

a memory connected to each of the plurality of processors, said memory having defined therein at least one shared memory region to which at least said first and second ones of said partitions have shared access; and means for providing for a program code, executing on each of at least said first partition and said second partition of the computer system, said program code establishing a connection between a said first application on said first partition and said second application on said second partition through the at least one shared memory region, wherein the connection through the shared memory region emulates a network connection requested by one of said applications, such that said first and second applications communicate with each other using standard network interfaces even though there is no physical network therebetween, and also such that the receiving of a message by said second application from said first application appears to said second application as having been sent via an external physical network even though there is no external physical network; wherein said emulated network connection requested by one of said first application and said second application comprises a network socket connection, and wherein the step of establishing a connection through the shared memory region comprises establishing a connection through the shared memory region that emulates a network socket connection wherein said program code executing on each of said first and second partitions comprises a shared memory service provider that serves as an interface between a component of the computer system that provides an API through which said first application can make said request for a network connection and the shared memory region of the main memory through which the emulated network connection is established;

wherein the shared memory service provider on each of said first and second partitions establishes a data structure in the shared memory region through which data is transferred from that partition to the shared memory service provider on the other partitions.

wherein the data structure comprises:

a plurality of data segments, each of the plurality of data segments for storing network message data to be sent from a sending shared memory service provider to a receiving shared memory service provider;

a control segment for controlling reading and writing of data in the plurality of data segments, the control segment comprising:

a first portion comprising:

a first field for storing an indication of the data segment containing the most recently written network message data; and a second field for storing an indication of the data segment containing the earliest written, but not read, network message data;

and a plurality of second portions, each second portion corresponding to one of the plurality of data segments tin control of the data segment, each second portion comprising:

a first field for storing an indication of the beginning of network message data within the data segment; and a second field for storing an indication of the end of network message data within the data segment.

20. The computer system recited in claim 19, wherein the first portion further comprises:

a third field for storing an indication that the sending shared memory service provider is wailing to send the network message; and a fourth field for storing an indication that the receiving shared memory service provider is waiting to receive the network message.

21. The computer system recited in claim 19, wherein each second portion further comprises a third field for storing an indication of a length of network message data within the data segment.

22. The computer system recited in claim 21, wherein the plurality of data segments are linked to form a circular buffer, and wherein each second portion further comprises:

a fourth field for storing an indication of the next data segment in the circular buffer, and a fifth field for storing an indication that the data segments contain a last portion of a network message stored across a plurality of data segments.

23. The computer system recited in claim 19, wherein the computer system provides a resource through which the shared memory service provider can establish the data structure and control the transfer of data through it, the resource providing the ability to perform at least one of the following operations on the shared memory region: (i) allocate an area of the shared memory region; (ii) map and unmap an area of the shared memory region; deallocate an area of the shared memory region; (iii) send and receive signals to and from other partitions via the shared memory region; and (iv) receive status information about the shared memory region and about selected partitions.

24. The computer system recited in claim 19, wherein the shared memory service provider comprises:

a dynamic link library (DLL) that executes in a user mode of the operating system of its respective partition, there being an instance of the shared memory service provider DLL in a process space of each application in the partition that may request the establishment of a network connection; and a device driver that executes in a kernel mode of the operating system of the respective partition, there being only one instance of the device driver in each partition.

25. The computer system recited in claim 19, wherein the connection established through the shared memory region emulates a network socket connection.

26. The computer system recited in claim 24, wherein said program code executing on each of said at least first and second partitions comprises a shared memory service provider that serves as an interface between a component of the computer system that provides an API through which an application can make a request for a network socket connection and the shared memory region of the main memory through which the emulated network socket connection is established.

27. The computer system recited in claim 25, wherein the operating system in each partition comprises a MICROSOFT WINDOWS operating system, and wherein the component of the computer system that provides the API of the requested socket connection comprises a Winsock DLL and a Winsock Switch, the Winsock DLL forwarding a request for a socket connection made by an application in a given partition to the Winsock Switch, which Winsock Switch allows multiple service providers, each of which provide TCP/IP services, to service such a request, and wherein the shared memory service provider acts as a TCP/IP service provider so that a request from an application for a socket connection can be serviced by the shared memory service provider.

28. The computer system recited in claim 26, wherein the shared memory service provider on a first partition that represents the listening side of a requested socket connection performs the following steps:
   (a) creating an emulated network socket on behalf of first application executing in the first partition in order to listen for attempts to connect thereto;
   (b) receiving a connect message from the shred memory service provider on the second partition that identifies a memory location of the shared memory region at which the shared memory service provider on the second partition has allocated a first data area to serve as a buffer for transferring data from the second partition to the shared memory service provider on the first partition;
   (c) matching the received connect message to the listening emulated network socket created in step (a);
   (d) allocating a second data area in the shared memory region to serve as a buffer for transferring data from the first partition to the shared memory service provider on the second partition;
   (e) mapping both the first and second data areas into a process space of the listening socket;
   (f) initializing the second data area; and
   (h) returning a "connected" indication to the shared memory service provider on the second partition and informing the application on the first partition that a socket connection has been established.

29. The computer system recited in claim 27, wherein the shared memory service provider on the second partition performs the following steps:
   (a') receiving a request from an application on the second partition to establish an emulated network socket connection with the first application on the first partition;
   (b') creating an emulated network connection socket on the second partition;
   (c') allocating the first data area in the shared memory region;
   (d') sending the connect message to the first partition that identifies the memory location of the shared memory region at which the first data area has been allocated; and
   (e') upon receipt of the "connected" indication from the first partition, mapping the first and second data areas into a process space of the connecting socket to establish the emulated network socket connection between the first and second partitions.

30. The computer system recited in claim 19, wherein the program code implements a polling process by which each partition polls an area within the shared memory region to determine whether any communications intended for it have been placed in the shared memory region by another partition.

31. The computer system recited in claim 29, wherein the area comprises a plurality of output queues, one for each partition, the output queue for a given partition indicating whether that partition has placed in the shared memory region any communications intended for any of the other partitions, each partition polling the output queues of the other partitions to determine whether those other partitions have placed any communications intended for it in the shared memory region.

32. The computer system recited in claim 30, wherein for any communications placed in the shared memory region by a sending partition and intended to be received by another partition, the output queue of the sending partition specifies the location within the shared memory region of a buffer containing that communication.

33. The computer system recited in claim 31, wherein the program code executing on each of said first and second partitions further comprises a shared memory driver that receives a request to send a message to an application on another partition, the request having been made in accordance with the application programming interface (API) associated with the requested type of network connection, and that, in response to the request, causes the message to be placed in an available buffer in the shared memory region and causes an indication of the message to be placed in the output queue of the sending partition.

34. The computer system recited in claim 32, wherein the shared memory driver on each partition implements a same interface as a network device driver to enable application programs and the operating system on that partition to send communications to other partitions via the shared memory region in the same manner that communications are sent to other computer systems over a network via a network interface card.

* * * * *